US012070170B2

(12) United States Patent
Mingee et al.

(10) Patent No.: US 12,070,170 B2
(45) Date of Patent: Aug. 27, 2024

(54) FLOOR TREATMENT APPARATUS

(71) Applicant: KARCHER NORTH AMERICA, INC., Aurora, CO (US)

(72) Inventors: Michael William Mingee, Parker, CO (US); Daniel Venard, Centennial, CO (US)

(73) Assignee: KARCHER NORTH AMERICA, INC., Aurora, CO (US)

(*) Notice: Subject to any disclaimer, the term of this patent is extended or adjusted under 35 U.S.C. 154(b) by 0 days.

(21) Appl. No.: 18/160,131

(22) Filed: Jan. 26, 2023

(65) Prior Publication Data

US 2023/0240500 A1 Aug. 3, 2023

Related U.S. Application Data

(63) Continuation of application No. 16/751,657, filed on Jan. 24, 2020, now abandoned.

(Continued)

(51) Int. Cl.
*A47L 11/40* (2006.01)
*A47L 11/02* (2006.01)
(Continued)

(52) U.S. Cl.
CPC ........... *A47L 11/4041* (2013.01); *A47L 11/02* (2013.01); *A47L 11/14* (2013.01); *A47L 11/19* (2013.01);
(Continued)

(58) Field of Classification Search
CPC .......... A47L 11/00; A47L 11/02; A47L 11/03; A47L 11/10; A47L 11/14; A47L 11/16; A47L 11/19; A47L 11/145; A47L 11/20; A47L 11/24; A47L 11/28; A47L 11/32; A47L 11/282; A47L 11/283; A47L 11/292; A47L 11/293; A47L 11/302; A47L 11/305; A47L 11/40; A47L 11/4038;
(Continued)

(56) References Cited

U.S. PATENT DOCUMENTS 1,999,696 A 4/1935 Kitto
3,583,818 A 6/1971 Smyth et al.
(Continued)

FOREIGN PATENT DOCUMENTS

CN 101297267 10/2008
CN 104127156 11/2014
(Continued)

OTHER PUBLICATIONS

International Search Report and Written Opinion for International (PCT) Patent Application No. PCT/US2020/014967, dated Apr. 6, 2020, 16 pages.

(Continued)

*Primary Examiner* — Randall E Chin
(74) *Attorney, Agent, or Firm* — Sheridan Ross P.C.

(57) ABSTRACT

The present disclosure relates generally to an apparatus for cleaning or otherwise treating a floor or ground surface. Devices provided herein include various features to enhance the efficiency and efficacy of cleaning operations. Such devices includes, but are not limited to, bearing protector devices, cord and cable management devices, and ergonomic features useful with ride-on floor treating machines.

20 Claims, 45 Drawing Sheets

Related U.S. Application Data

(60) Provisional application No. 62/796,530, filed on Jan. 24, 2019.

(51) Int. Cl.

| | |
|---|---|
| ***A47L 11/14*** | (2006.01) |
| ***A47L 11/19*** | (2006.01) |
| ***A47L 11/20*** | (2006.01) |
| ***A47L 11/24*** | (2006.01) |
| ***A47L 11/282*** | (2006.01) |
| ***A47L 11/30*** | (2006.01) |
| ***A47L 11/32*** | (2006.01) |
| ***B08B 1/12*** | (2024.01) |
| ***B08B 1/32*** | (2024.01) |

(52) U.S. Cl.
CPC ............... *A47L 11/20* (2013.01); *A47L 11/24* (2013.01); *A47L 11/282* (2013.01); *A47L 11/302* (2013.01); *A47L 11/32* (2013.01); *B08B 1/12* (2024.01); *B08B 1/32* (2024.01)

(58) Field of Classification Search
CPC ............. A47L 11/4041; A47L 11/4044; A47L 11/4061; A47L 11/4063; A47L 11/4066; A47L 11/4072; A47L 11/4077; A47L 11/4091
See application file for complete search history.

(56) References Cited

U.S. PATENT DOCUMENTS

| | | | | |
|---|---|---|---|---|
| 3,892,003 | A * | 7/1975 | Peabody | A47L 11/4027 15/372 |
| 5,027,464 | A | 7/1991 | Knowlton | |
| 6,397,429 | B1 * | 6/2002 | Legatt | A47L 11/4052 15/340.1 |
| 6,442,789 | B1 * | 9/2002 | Legatt | A47L 11/4061 15/353 |
| 2002/0007529 | A1 | 1/2002 | Legatt et al. | |
| 2006/0064844 | A1 | 3/2006 | Venard et al. | |
| 2008/0276414 | A1 | 11/2008 | Wood et al. | |
| 2009/0306822 | A1 | 12/2009 | Augenbraun et al. | |
| 2014/0102476 | A1 | 4/2014 | Hall et al. | |
| 2016/0095489 | A1 | 4/2016 | Pedlar et al. | |
| 2016/0166127 | A1 | 6/2016 | Lewis | |
| 2017/0049288 | A1 * | 2/2017 | Knutson | A47L 11/4083 |
| 2017/0164804 | A1 | 6/2017 | Dickrell et al. | |
| 2017/0215667 | A1 | 8/2017 | Thorne et al. | |
| 2017/0360270 | A1 | 12/2017 | Dickrell et al. | |
| 2018/0070785 | A1 | 3/2018 | Udy et al. | |
| 2018/0110390 | A1 | 4/2018 | Pedlar et al. | |
| 2018/0338654 | A1 | 11/2018 | Kelsey | |
| 2020/0237177 | A1 | 7/2020 | Venard et al. | |

FOREIGN PATENT DOCUMENTS

| | | |
|---|---|---|
| CN | 204120958 | 1/2015 |
| EP | 2018821 | 4/2020 |
| JP | S62-217930 | 9/1987 |
| JP | H05-300863 | 11/1993 |
| JP | 2007-523698 | 8/2007 |
| JP | 2009-509220 | 3/2009 |
| JP | 2013-027558 | 2/2013 |
| JP | 2013-230199 | 11/2013 |

OTHER PUBLICATIONS

International Preliminary Report on Patentability for International (PCT) Application No. PCT/US2020/014967, dated Aug. 5, 2021, 10 pages.
Official Action for Australia Patent Application No. 2020211414, dated Jun. 29, 2022, 5 pages.
Official Action for Australia Patent Application No. 2020211414, dated Oct. 13, 2022, 5 pages.
Official Action for Australia Patent Application No. 2020211414, dated Jan. 31, 2023, 10 pages.
Official Action for Canada Patent Application No. 3125521, dated Oct. 17, 2022, 4 pages.
Official Action for China Patent Application No. 202080010196.6, dated Jan. 21, 2022, 25 pages.
Notice of Allowance (with English translation) for China Patent Application No. 202080010196.6, dated Aug. 26, 2022, 6 pages.
Extended European Search Report for Europe Patent Application No. 20744886.1, dated Sep. 1, 2022, 8 pages.
Official Action (with English translation) for Japan Patent Application No. 2021-538857, dated Aug. 30, 2022, 9 pages.
Official Action for Korea Patent Application No. 10-2021-7023269, dated Oct. 17, 2022, 4 pages.
Official Action for U.S. Appl. No. 16/751,657, dated Jun. 17, 2022, 15 pages.
Official Action for U.S. Appl. No. 16/751,657, dated Oct. 28, 2022, 12 pages.
Official Action (with English translation) for Korea Patent Application No. 10-2022-7044246, dated Jul. 19, 2023, 7 pages.

* cited by examiner (NEUTRAL POSITION)

(RIGHT POSITION)

FLOOR TREATMENT APPARATUS

This application is a Continuation of U.S. Non-Provisional patent application Ser. No. 16/751,657, filed on Jan. 24, 2020, now abandoned, which claims the benefit of priority from U.S. Provisional Patent Application Ser. No. 62/796,530, filed Jan. 24, 2019, the entire disclosures of which are hereby incorporated by reference.

This application is related to U.S. patent application Ser. No. 15/676,745, filed Aug. 14, 2017, which is a Continuation of U.S. patent application Ser. No. 15/248,560 which is a Continuation of U.S. patent application Ser. No. 15/245,488, filed Aug. 24, 2016, which is a Continuation of U.S. patent application Ser. No. 14/643,768, filed Mar. 10, 2015, which is a Continuation of U.S. patent application Ser. No. 13/964,046, filed Aug. 10, 2013, now U.S. Pat. No. 9,015,887, which is a Continuation of U.S. patent application Ser. No. 13/888,140, now U.S. Pat. No. 8,528,142, filed May 6, 2013, which is a Continuation of U.S. patent application Ser. No. 13/554,593, now U.S. Pat. No. 8,438,685, filed Jul. 20, 2012, which is a Divisional of U.S. patent application Ser. No. 11/868,353, now U.S. Pat. No. 8,245,345, filed Oct. 5, 2007, which is a Continuation of U.S. patent Ser. No. 11/059,663, now U.S. Pat. No. 7,533,435, filed Feb. 15, 2005, which claims the benefit of U.S. Provisional Patent Application Ser. Nos. 60/545,153 and 60/627,606, filed Feb. 16, 2004 and Nov. 12, 2004, respectively, and which is a Continuation-In-Part of abandoned U.S. patent application Ser. No. 10/737,027, filed Dec. 15, 2003, which is a Continuation-In-Part of abandoned U.S. patent application Ser. No. 10/438,485, filed May 14, 2003, the entire disclosures of which are incorporated by reference in their entirety herein.

This application is related to abandoned U.S. patent application Ser. No. 11/253,100, filed Oct. 17, 2005, which is incorporated by reference in its entirety herein.

This application is also related to U.S. patent application Ser. No. 13/589,321, now U.S. Pat. No. 8,397,333, filed Aug. 20, 2012, which is a Continuation of U.S. patent application Ser. No. 12/511,704, now U.S. Pat. No. 8,302,240, filed Jul. 29, 2009, the entirety of which are incorporated by reference herein.

FIELD OF THE INVENTION

The present invention relates to an apparatus for the treatment, such as cleaning, of a surface. More specifically, one embodiment of the present invention is an apparatus for surface cleaning that provides a standing or sitting location for the operator and is capable of operating in tight spaces.

BACKGROUND OF THE INVENTION

Cleaning machines are used extensively for cleaning flooring surfaces comprised of tile, stone, brick, wood, concrete, carpets and other common surfaces. Maintaining the cleanliness of these surfaces, especially in high volume areas in commercial, industrial, institutional and public buildings is an ongoing and time-consuming process. The present invention relates to a highly maneuverable floor cleaning or treatment apparatus (hereinafter "treatment apparatus") that supports an operator during use. More specifically, some embodiments of the present invention are adapted to clean, sweep, vacuum, burnish, wax, etc. (hereinafter "treat") a floored surface, wherein the operator is supported by the cleaning device, thus increasing efficiency and productivity of the cleaning operation. As used herein, A floored surface @, or more generally A surface@, encompasses areas covered by concrete, tile, carpet, wood, plastic, stone, turf or any other substance known in the art. The prior devices address many issues that arise with cleaning such floored surfaces. Unfortunately, prior to the present invention, there was no one device that could address many, if not all, of the issues that arise in cleaning various surfaces in various environments at any given point in time.

Mop & Bucket Cleaning Devices

In the past, building maintenance staff and others often treat surfaces, such as tiled hallways or restroom floors, using traditional mop and bucket techniques. The bucket may include a detachable mop ringer and may be positioned on caster wheels to facilitate easy movement. Depending on the cleanliness of the equipment, a worker may be able to make a good start in treating a floor using the mop and bucket approach. However, soon the mop and fluid in the bucket becomes soiled or otherwise contaminated by germs and/or bacteria. From that point on, each time the worker plunges the mop into the bucket and rings the mop, both the mop and cleaning fluid become more and more dirty/contaminated.

Manually Propelled Cleaning Devices

The basic cleaning problems associated with the prior art mop & bucket approach to cleaning a surfaces have generally been addressed in the art, as shown in U.S. Pat. No. 6,206,980 to Robinson, entitled A Multi-functional Cleaning Machine, @ which is fully incorporated herein by reference. This type of cleaning machine generally includes a manually propelled wheeled body with two tanks, one concentrated chemical receptacle, a vacuum and blower motor and a fluid pumping system. Typically, such equipment includes only a single motor used for both vacuuming soiled fluid and blowing air that can be used to dry a cleaned surface. While such equipment is generally maneuverable and is an improvement over the earlier mop and bucket technology, the system is still labor intensive and slow. As a result, productivity of cleaning professionals, when using these type of systems is generally decreased over what it might be with other type of systems that are available.

Self-Propelled Walk Behind Device

Productivity concerns have been addressed in the art by the creation of certain walk behind floor treatment apparatus. These apparatus typically have a scrub deck at the machine's front and a squeegee at its rear. The squeegee has the ability to "swing" or follow the path of the scrub deck as the machine changes direction. This type of equipment is generally more efficient in cleaning large surface areas than either the mop and bucket or the manually propelled devices. Unfortunately, however, the distance between the scrub deck and squeegee is relatively great. Also, walkbehinds typically have relatively wide squeegees. These characteristics limit such machine's maneuverability and limit the doorways they can easily pass through. Typical 3' doorway allows a machine with no more than a 33" squeegee to fit through without removal.

Small walk behind floor cleaning apparatus typically include a scrub deck in the middle of the machine and squeegees at the machine's rear. In this configuration the squeegee has little or no ability to swing or follow the path of the scrub deck as the machine changes direction. Small rider scrubbers typically have relatively narrow squeegees, and rely on "side squeegees" (unvacuumized squeegee blades) adjacent to the scrub deck to direct the water into the path of the main (vacuumized) squeegee. The problem with these side squeegees is that they do not perform very well for very long and tend to leave a film of water in turns because the vacuumized squeegee does not follow the true path of the scrub deck, only the path of the side squeegees (which leave the film of water). Finally, side squeegee are typically very heavy rubber blades and have significant down-pressure applied to them to direct the water—this makes them expensive and causes significant “drag” which increases the work for the propel unit and limits battery run-time. Thus, while more maneuverable than larger walk behind floor treatment machines, the small machines typically do not clean as well as the larger machines.

Storage Issues in Prior Art Devices

Further, known cleaning machines do not provide adequate onboard storage for cleaning supplies, tools, etc. Likewise, prior art machines do not often provide a flexible approach to adding storage facilities for trash and the like when the need for such arises. Machinery that addresses these issues is therefore needed.

Self-Propelled Ride-on Devices

Self-propelled cleaning devices are generally also well known in the field and are employed to treat large floored surfaces, such as tiled, concrete or carpeted floors found in hospitals, department stores, schools, gyms, etc. These devices generally provide the operator with seating from which he/she can control operation of the device. These devices are ideal for cleaning large, open areas because they are capable of containing large amounts of waste fluids and/or debris without having to repeatedly perform time consuming fluid replacement or debris removal. Moreover, because these devices provide the user with seating, the user does not become prematurely fatigued, increasing overall worker productivity. Unfortunately, these large ride-on machines are not particularly well-suited for cleaning smaller, more confined floor surfaces, which are often found in hallways, small rooms, or even large rooms which have many obstacles therein.

As is well known in the art, smaller self-propelled cleaning devices are also in existence that are ideal for cleaning the smaller rooms and hallways. However, smaller devices are usually pushed or pulled by an operator. Hence, the major drawback of these devices is that they often rely on operator strength to maneuver the device. Even if the device is self-propelled, it often employs manual steering. After a long shift of walking behind a treatment device, the operator is bound to become fatigued, wherein his or her attention will deviate from the task at hand, thereby possibly resulting in uneven treatment to the floored area. Thus, a subsequent crew may have to return and retouch certain areas that were not accurately treated during the first operation. In addition, human errors related to the amount of time a surface is exposed to a brush, may occur when the operator lingers over a single area for extended period of time. This situation is never good for a floor surface. The devices in the art are also difficult to maneuver and often are not adapted to operate around tight corners, wherein pre or post cleaning operations must be performed, thus increasing the time and expense of the entire task.

Thus, it is a long felt need in the field of floor cleaning or treatment to provide a device that allows the operator to ride thereon, and which is adapted to be used in small areas and/or around tight corners. The following disclosure describes an improved floor cleaning and treatment device that is adapted for use in small areas that includes a platform adapted to support the operator to ensure optimum floor cleaning or treatment.

SUMMARY OF THE INVENTION

It is one aspect of the present invention to provide a floor treatment apparatus that is easy to maneuver. More specifically, one embodiment of the present invention is constructed of a chassis section that includes an enclosure that houses at least a portion of the internal components of the treatment device and a location for installation of devices that are used during cleaning operations. In addition, one embodiment of the present invention provides a standing, leaning or sitting location for the operator. Another embodiment of the present invention is equipped with a powered steering device that allows for greater maneuverability in areas with tight corners, thereby ensuring that more of the flooring surface is treated without having to perform pre or post treatment operations. More specifically, one embodiment of the present invention is equipped with a self-propelled wheel and an easy to use steering device to provide increased maneuverability around obstacles. One embodiment of the present invention employs at least one wheel that provides thrust and/or steering capability. Yet another embodiment of the present invention employs wheels that are substantially centered under the chassis such that the entire apparatus is generally capable of 360E rotation without substantially traversing in any other direction, thus allowing it to treat tight corners of a surface. It is another aspect of the present invention to provide a cleaning apparatus that is cost effective to manufacture. Various aspects of the invention shall now be described in more detail.

Chassis

One embodiment of the present invention employs a chassis section that is designed to protect and house the internal workings of the apparatus and provide a location for interconnection of auxiliary treatment devices used therewith. One embodiment of the present invention employs a chassis that is constructed of rigid plastic, metal, or other common materials used in the art. The chassis of this embodiment also is equipped with a platform for the operator. Alternative embodiments of the present invention employ a foldable, removable or stationary operator seat. In addition, other safety features such as pads or belts may be employed to secure the operator into the cleaning device and thus his/her working environment.

It is yet another aspect of the present invention to provide a chassis with a small envelope. More specifically, one embodiment of the present invention is small enough to fit into and through tight spaces. Often facilities that employ the apparatus of the present invention include narrow doorways, aisles and elevators. In addition, especially in older buildings that have been retrofitted to comply with the Americans with Disabilities Act, elevators are of minimal volume and lifting capability. To fit into small elevators, the chassis is designed to have the smallest practical envelope, a distinct advantage over the prior art. Also, the apparatus of one embodiment of the present invention includes components that are easily removable or adjustable to reduce the profile of the apparatus. Thus, the embodiments of the present invention may be used in various structures.

Steering Mechanism

Another aspect of the present invention is to provide a cleaning apparatus that is easy to operate and maneuver. More specifically, one embodiment of the present invention is equipped with a steering mechanism that allows for inputs from the operator to be efficiently communicated to the steering wheels of the cleaning apparatus. Alternatively, other steering means may be used to facilitate maneuverability of the treatment apparatus, such as joy sticks, touch screens, buttons, remote control elements, etc.

It is still yet another aspect of the present invention to provide a cleaning apparatus that is adapted to efficiently clean areas with tight corners. More specifically, one embodiment of the present invention is adapted to generally perform 360E turns without appreciable lateral motion. This embodiment of the present invention is equipped with a turning mechanism generally under the center of the chassis with two powered exterior wheels adjacent thereto that provide power to the chassis to pivot around the centered wheel. The powered exterior wheels may be independently controlled by joy sticks, wherein movement thereof send directional inputs to each wheel. One embodiment of the invention is equipped with at least one joy stick wherein forward deflection will impart forward motion, rearward deflection will impart rearward motion, and a side-to-side deflection will cause the apparatus to turn. Alternatively, two joy sticks may be used in a similar manner, wherein rearward deflection of the left joy stick and forward deflection of the right joy stick will result in a left turn, and depending on the placement of the powered wheels, perhaps a 360E left hand turn.

Another embodiment of the present invention utilizes a steering wheel, handle bars, a yoke, or similar apparatus for steering. Embodiments may also include a power-assisted steering mechanism.

Power Plant

It is another aspect of the present invention to provide a treatment apparatus that is powered by commonly used power plants. More specifically, one embodiment of the present invention employs an electric motor to power the apparatus. The electric motor may be powered by batteries, solar energy or an electrical cord attached to a permanent power source. Alternatively, the present invention may be powered by an internal combustion engine. Other propulsion means may also be employed by the present invention without departing from its scope, as will be appreciated by one skilled in the art.

Floor Treatment Devices

One embodiment of the present invention employs a chassis that houses a fluid pump assembly and a vacuum assembly. The apparatus further includes at least two tanks, one for retaining a base cleaning fluid, such as water, and a second for retaining spent cleaning solution, dry debris, etc. The apparatus may also include one or more concentrated cleaning chemical receptacles designed to hold concentrated cleaning chemicals. The receptacles are preferably stored within a lockable structure, adding safety to the overall apparatus. These agents can be added to a base cleaning fluid just prior to application to a surface and as desired to facilitate cleaning of various surfaces.

Tanks

As briefly mentioned above, preferably at least one tank is provided that provides a solution that is directed towards the flooring surface to be cleaned to facilitate treatment. The tank may be constructed with multiple compartments wherein waste water from the surface is contained prior to disposal. More specifically, one embodiment of the present invention employs a tank that includes a movable membrane. In this configuration, the clean water and/or cleaning solution is deposited on a surface and agitated. Dirty water is next suctioned up and deposited back into a portion of the tank, thereby moving a membrane accordingly to accept the dirty water. Such a configuration is disclosed in U.S. Pat. No. 4,759,094, which is herein incorporated in its entirety by this reference. A similar selectively expandable fluid storage area can be created by utilizing a collapsible structure, which is placed inside of the primary fluid tank. This type of arrangement is disclosed in U.S. Pat. No. 4,196,492, which is also incorporated herein in its entirety by this reference.

Clean water can obviously come from an outside source such as a hose, rather than be stored on board the device. However, in order to facilitate maneuverability and usability of the present invention, it is envisioned that the chassis will house or hold at least one fluid tank and perhaps a plurality thereof.

Cleaning Solutions

In one type of treatment operation, fluid from the chemical receptacles flows through a tube to a chemical selector, which may include a metering valve. The selector preferably has a positive shut-off position, wherein fluid is prevented from flowing through the selector regardless of the fluid pressure in a fluid line. The selector is responsive to input from an operator selection of one of the several cleaning chemicals. Once a chemical is selected, it is free to flow through the chemical selector and appropriate amounts thereof may be provided to one of any number of inlets to a mixing tee. The amount of chemical allowed to flow may be adjusted by a metering valve built into the selector or separate from the selector, in a known fashion. A base cleaning fluid, such as water, may flow from a fluid tank and through a separate tube to a second leg of a mixing tee. The cleaning fluid and concentrated cleaning chemical then mix within the mixing tee to create a cleaning solution. That solution may then be passed through the selector outlet to a pressure pump, wherein the cleaning solution may be pressurized and communicated via appropriate tubing to a dispensing device. The pump, which draws fluid to and through the selector, also preferably includes a bypass system to facilitate regulation of pump pressure. Use of the pump to draw fluid is preferred as it does not create unwanted pressures in the fluid lines and the system, in general, is not subject to gravity feeding of fluid.

A solution may be applied to a surface using any type of dispensing device. In a preferred embodiment, the dispensing device or associated solution lines or tubes include an adjustable valve, which may be used to adjust the pressure and flow of solution allowed to exit the dispensing device. Because of the adjustability, the apparatus may be utilized as a pre-cleaner for various carpet treatments, including spotting or other treatments.

By use of the chemical selector, two or more receptacles of floor treatment chemicals may be fluidly connected to a mixing tee. In operation, a user is capable of creating any number of cleaning solutions without the need for adding receptacles or switching chemical feed lines from one receptacle to another or without changing metering tips that are easily misplaced, incorrectly interconnected, or damaged. Thus, the treatment process is safer because there is less chemical handling. Similarly, use of a metering valve will allow the operator to create a very precise floor treatment solution.

It is preferred that one-way check valves be used throughout the apparatus. For instance, check valves may be included in: delivery lines that supply cleaning chemicals to the metering tee; lines that supply water to the metering tee; lines that supply cleaning solution to the pump; lines that supply cleaning solution to the spray gun; or in the metering tee, itself. The check valves prevent reversal of fluid and prevent contamination of one fluid with another.

Blower

The treatment apparatus also may include a modular blower assembly. The blower assembly may be hand-held and operate completely apart from the overall cleaning machine. The blower assembly may be used to dry areas physically separate from where the apparatus is stored. Because the blower assembly possibly is separate from the apparatus, it may also be used for other blowing functions, such as blowing leaves, grass, dirt or other debris. The blower assembly may be used with a detachable hand nozzle, a flexible nozzle, an extension wand, etc., thereby increasing the overall flexibility of the blower assembly. The blower assembly may utilize an integrated on/off switch and be powered by electricity supplied by any typical extension cord, including the power source of the apparatus. The blower may be configured to be stored on the apparatus in one of any number of convenient ways. It will be appreciated by one skilled in the art that having a modular blower assembly of this type is very beneficial to the overall functionality of a multifunctional floor treatment apparatus.

Storage

Another aspect of one embodiment of the present invention is that the chassis includes bins, trays, bays and other storage devices preferably within easy reach of the operator. The storage devices provide the operator with substantial flexibility when cleaning a large building or area that has many types of surfaces that may need treatment. Also, the apparatus provides for modular trash/supply bins that may be added to or removed from the apparatus quickly and easily so that the machine can be configured for one of any number of floor treatment activities.

Primary Pump

It is yet another aspect of the present invention to provide an apparatus equipped with a secondary fluid pump that supplies fluid to the main fluid pump prior to ignition. More specifically, one embodiment of the present invention includes a secondary, or priming pump, which is activated prior to the activation of the main fluid pump. Often it is desirable to introduce fluid into a main fluid pump prior to that pump's activation, thereby expelling trapped air that may cause damage to the main fluid pump motor from vapor lock or cavitation, for example. This priming process may be conducted manually, but that is time consuming, wherein the user manually adds fluid to the pump or bleeds the air therefrom. Alternatively, and preferably, one embodiment of the present invention is equipped with a secondary pump that is activated for a brief moment when the fluid discharge apparatus is initially activated, thus ensuring that the main fluid pump will be substantially free of trapped air upon activation.

Squeegee

It is another aspect of the present invention to provide a device that includes a squeegee adjacent to the floor treatment device, both generally in the middle of the machine. The squeegee effectively swings, or follows the path of the floor and does not rely on unvacuumized side squeegees to channel water to the main vacuumized squeegee. Thus, it offers as good or better fluid pick-up when the apparatus is turning than is capable with a walk behind scrubber, and far superior than typical small riders since it does not rely on smearing side squeegees. One embodiment of the present invention, employs a squeegee that pivots about the steering axis with a linkage that is supported by a roller and track mechanism. The absence of side squeegees mean less drag and better use of available energy. In addition, some embodiments of the present invention include an adjustable squeegee, a skirt or a shroud that minimally contacts the floor, thus reducing drag and sparing battery charge. Alternatively, some embodiments of the present invention include stops that contact the floor, without marring the same.

Use of the Device

Various aspects of the inventions discussed briefly above combine to provide an effective and efficient tool, useful in the treatment of numerous areas in and around commercial, industrial, institutional and public buildings. Moreover, due to the various aspects of the present invention, a sanitation maintenance worker may clean a particular room or facility more efficiently than previously possible. The present invention may be used in various cleaning operations such as burnishing, vacuuming, scrubbing, sanding, waxing, sweeping, sealing, painting, polishing, etc. In order to accomplish these tasks, the present invention may be equipped with various combinations of floor treatment devices. More specifically, one embodiment of the present invention is equipped with a plurality of brushes and squeegees to agitate and collect debris from a flooring surface. In addition, suction mechanisms may be employed such that fluids and/or dry particulate matter are transferred into a container. It is also envisioned that one embodiment of the present invention include at least one solution applicator positioned adjacent to the scrub brushes, wherein solution is injected onto the surface after, or prior to, agitation by the brushes. The debris-entrained solution is then collected by the squeegee and subsequently vacuumed into the holding tank or expelled out of the chassis to an outside reservoir. The brushes and/or solution used in this embodiment may be adapted to clean, sweep, paint, burnish, sand, strip, varnish or wax a floor. It will be appreciated by one skilled in the art that any type of solution adapted to treat any flooring surface may be employed without departing from the scope of the present invention.

It is yet another aspect of the present invention provide a floor treatment apparatus that can be used in various floor maintenance operations. More specifically, one embodiment of the present invention is adapted for interconnection to a plurality of devices to perform a variety of floor treatment operations. It is envisioned that one embodiment of the present invention be capable of quick removal of certain treatment devices such that different devices may be then added to quickly change the scope of the apparatus, thereby providing a device adapted to scrub, clean carpets, wax floors, burnish floors, remove wax or varnish from floors, vacuum, etc. Thus, it is contemplated, that this system may be used for a plurality of cleaning or floor treatment operations.

Remote Control

It is yet another aspect of the present invention to provide a highly mobile floor treatment apparatus that can include a car washer assembly. As will be appreciated by those skilled in the art, if so configured, the device could include a car washer wand connected to appropriate pumps and could be utilized to pre-clean heavily soiled areas prior to final cleaning with use of the device.

It is still another aspect of the present invention to provide a floor treatment apparatus that does not require direct contact with an operator to perform its tasks. More specifically, one embodiment of the present invention is adapted to be remote controlled. This embodiment of the present invention is equipped with remote control mechanisms and software currently known in the art, such as taught by U.S. Pat. No. 6,625,843 to Kim et al., which is incorporated in its entirety herein. In addition, this embodiment of the present invention may be equipped with the plurality of cameras such that offsite monitoring and control may be performed. In a related embodiment of the present invention, software is installed in the cleaning apparatus such that human contact or monitoring is not required. More specifically, one embodiment of the present invention is adapted to learn its environment as it operates in an area such that remote controlling is not required. Alternatively, it is well within the scope of this invention to preprogram the dimension of floored surfaces into the smart treatment device, wherein the device is parameterized with the surface dimensions before the task is initiated. Apparatus of this type are known in the art, such as the RoombaJ device by iRobot Corporation, aspects of which are described in U.S. Pat. Nos. 6,594,844 and 6,535,793, which are both incorporated in their entirety herein.

Safety

It is another aspect of the present invention to provide a cleaning apparatus that is safe and comfortable to use. More specifically, one embodiment of the present invention includes an operator platform. This platform allows the operator to stand on the device during the treatment operation, thus increasing productivity and lowering the chances of injury or fatigue to the operator. It another embodiment of the present invention, a seat is provided wherein the operator may comfortably sit while completing his or her task. Other safety and comfort features such as rails, pads, and belts, may be provided depending on the needs of the operator.

Thus, it is one aspect of the present invention to provide a floor treatment apparatus which comprises:

a chassis with a lower surface, a front surface, an upper surface, a rear surface, a left surface and a right surface, wherein a platform is provided that is adapted to support the weight of an operator;

a powered wheel operably connected adjacent the lower surface of the chassis, the powered wheel being capable of at least one of transitioning and rotating the floor treating apparatus;

a steering mechanism adjacent to the upper surface that is accessible by the operator;

an operable floor treating device connected adjacent to the lower surface of the chassis;

an operable debris collection device connected adjacent to the lower surface of the chassis; and wherein an operator controls the floor treatment apparatus from the platform.

Platform & Ergonomics

In various embodiments of the present disclosure, a platform is provided on a rear portion of a cleaning device to receive a user. In preferred embodiments, the platform comprises an area that is operable to receive the feet of user in a standing position and wherein the user is acting as an operator of the device. In some embodiments, the center of the platform is offset from a centerline of the cleaning device.

Various embodiments of the present disclosure comprise at least one floor treating device (e.g. a rotary brush) that is biased or otherwise provided closer to a first side of the device than a second side. The platform of the device is offset or biased toward the first side of the device. It should be recognized, however, that embodiments of the present disclosure that comprise an offset platform are not limited to a corresponding or similarly offset floor treating device. For example, it is contemplated that devices are provided that comprises an offset platform but that do not comprise an offset, biased, or asymmetrical floor treating device.

In at least some embodiments, and as is shown and described herein, a user platform of the device is provided proximal to the side of the device that comprises the cleaning device. Applicant has determined that the provision of an offset platform improves the functioning of the device wherein users and users' line of sight is directed toward a portion of the device that comprises cleaning and floor or surface contact features. Such offset platforms and related features prevent users from directing their focus elsewhere, and thereby improve both cleaning functions and safety.

In some embodiments, other cleaning device features in addition to the platform are provided off-center. For example, certain embodiments of the present disclosure provide that a cleaning deck including a scrubbing pad and a squeegee is positioned off-center on the machine. Additionally, a drive wheel is provided off-center on the machine. As shown and described in more detail herein, certain embodiments of the present disclosure contemplate a pivotable trailing squeegee that is capable of rotating as the cleaning device turns. Device and squeegee performance has been optimized by the positioning of various components including, but not limited to a steerable drive wheel provided on a lower portion of the device.

In one embodiment, a floor treatment apparatus is provided that is operable to receive inputs from direct contact with an operator and without direct contact with an operator to perform tasks. The apparatus comprises a chassis comprising a front, a back, a lower surface, a front surface adjacent the front, an upper surface, a rear surface located behind a center point of the chassis, a left surface, and a right surface. The chassis comprises a centerline extending through a lateral midpoint of the left surface and the right surface. A platform is located partially between a portion of the right surface and the left surface and at least partially behind the rear surface, wherein the platform includes a top surface adapted to receive the feet of an operator. The platform comprises a midpoint that is offset relative to the centerline of the chassis and wherein the platform is provided closer to one side of the apparatus than the other.

Debris Management & Bearing Protection

In various embodiments of the present disclosure, cleaning devices are provided with one or more cleaning brushes. For example, in embodiments that comprise vacuum capabilities, at least one cleaning brush is provided that is rotatable about a horizontal axis (i.e. parallel to a floor or ground surface). Bearing members are provided on opposing ends of the brush and/or drive member to enable a rotation of the brush. Applicant has determined that a cleaning motion of the brush (i.e. rotation of the brush coupled with a vacuum force) causes debris including but not limited to hair strands to migrate along the length of the brush to the periphery of the brush where such debris can become entrained in or otherwise enter the bearing(s). This has been found to degrade the seals of the bearing(s) and may cause lubricant to escape from the bearings while also allowing debris to enter the bearings. Various embodiments of the present disclosure comprise at least one bearing protector. In some embodiments, the bearing protector(s) comprise a stationary brush provided proximal to the bearing. In certain embodiments, the stationary brush comprises bristles that are substantially perpendicular to the horizontal axis of the rotary brush. The stationary brush acts as a barrier to keep hair and fibers from breaching the bearings, and thereby preserves the life of certain critical components of the device. In some embodiments, at least one stationary brush is provided that is selectively removable and wherein a user may remove the stationary brush for cleaning and/or replacement. In various embodiments, cleaning brushes are provided that comprise selectively removable brushes that selectively attach and detach from drive members of the device. It will be recognized, however, that stationary bearing-protector brushes of the present disclosure are contemplated as being employed on various different machines and are not limited to any particular embodiment or type of cleaning device. For example, it is contemplated that such stationary brushes are provided on conventional floor vacuums that employ rotatory cleaning brushes.

In one embodiment, a floor treatment and cleaning device is provided. The device comprises a first roller and a second roller, wherein the first roller and the second roller each comprise a longitudinal axis. The first roller is spaced apart from the second roller, and the longitudinal axis of the first roller extends parallel to the longitudinal axis of the second roller. The first roller and the second roller each comprise a plurality of bristles extending therefrom. At least one of the first roller and the second roller is rotatably connected to a bearing assembly. A stationary brush is provided proximal to the bearing assembly, wherein the stationary brush is operable to contact and deflect debris provided on at least one of the first roller, the second roller, the plurality of bristles, and the bearing assembly to prevent ingress of the debris into the bearing assembly.

Cable Management

In various embodiments of the present disclosure, at least one wire and cable management device is provided. In various steered or steerable floor cleaning devices, cables and wired connections to power and control a motor (for example) are provided. Such cables and wires are often wrapped around a steering column, or otherwise poorly secured to the device. Over time, these cables and wires can become caught or entangled on various components of the device as the device is steered, which may further lead to breakage of the wires and inoperability of critical elements such as a drive motor.

Embodiments of the present disclosure provide a containment system for wires and cables. In some embodiments, a containment system is provided that comprises a wire storage member provided adjacent or proximal to a rotatable drive motor, and wherein the wire storage member is fixed at least relative to the rotatable motor. Cables and wires are operable to extend and retract as the device is steered, thereby allowing cables and wires to be rigidly fixed to anchor points, minimize slack, and protect such wiring and cabling from damage and breakage.

In one embodiment, a floor treatment apparatus is provided that is operable to receive inputs from direct contact with an operator and without direct contact with an operator to perform tasks. The apparatus comprises a chassis comprising a front, a back, a lower surface, a front surface adjacent the front, an upper surface, a rear surface located behind a center point of the chassis, a left surface, and a right surface. A motor is rotatably secured to a lower surface of the chassis. The motor is coupled to a cable housing member that is operable to receive and house a length of cable. The cable housing member is fixed to the lower surface of the chassis and comprises an aperture for receiving at least one of a wire and a cable extending between an interior volume of the cable housing member and an electrical component of the apparatus.

The Summary of the Invention is neither intended nor should it be construed as being representative of the full extent and scope of the present invention. Some aspects of the present invention are set forth in various levels of detail in the Summary of the Invention, as well as in the attached drawings and the Detailed Description of the Invention. No limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

Figure 1:
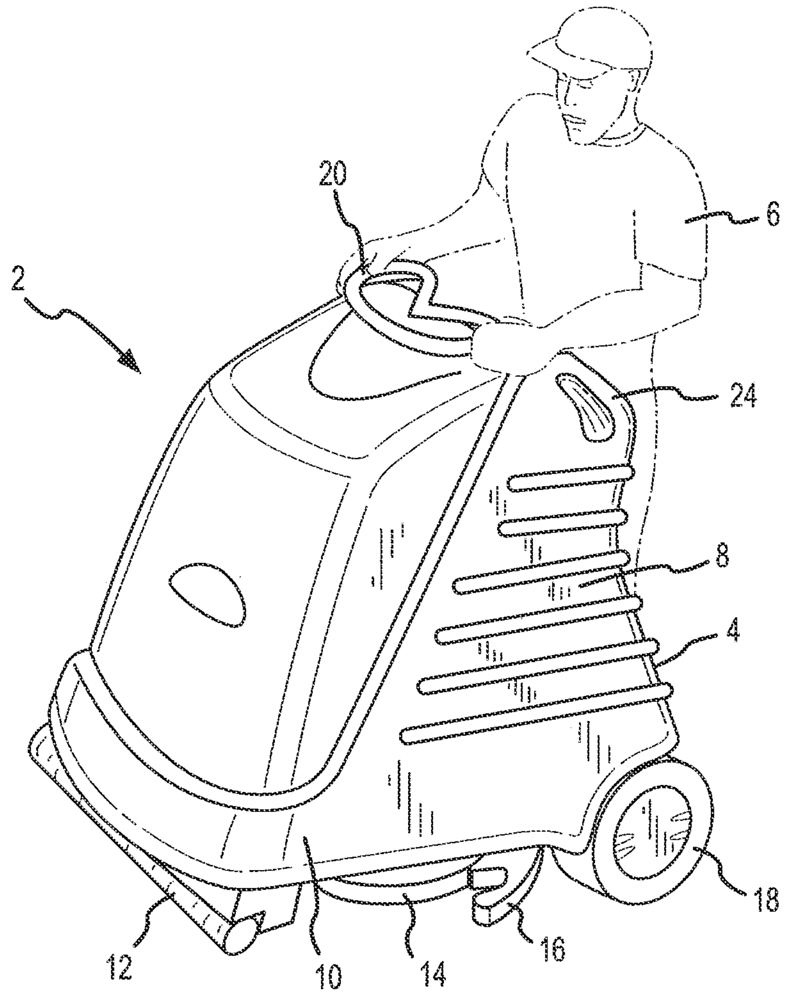
FIG. 1 is a perspective view of one embodiment of the present invention showing an operator standing on the platform thereon.

To assist in the understanding of the present invention the following list of components and associated numbering found in the drawings is provided herein:

| Component | # |
|---|---|
| Floor treating apparatus | 2 |
| Platform | 4 |
| Operator | 6 |
| Chassis | 8 |
| Bottom surface of chassis | 10 |
| Brush | 12 |
| Rotating brush | 13 |
| Scrubber | 14 |
| Squeegee | 16 |
| Wheel | 18 |
| Steering wheel | 20 |
| Joy stick | 22 |
| Handle Grip | 24 |
| Powered wheel | 26 |
| Burnishing pad | 28 |
| Swinging brush | 30 |
| Wand | 32 |
| Hose | 34 |
| Swing arm | 36 |
| Bearing | 38 |

-continued

| Component | # |
|---|---|
| Track | 40 |
| Pivot point | 42 |
| Handle | 44 |
| Cam | 46 |
| Strainer basket | 48 |
| Waste tank cover | 49 |
| Waste fluid intake | 50 |
| Main Storage Tank | 51 |
| Clean fluid intake | 52 |
| Fitting | 54 |
| Flange | 56 |
| Waste fluid bag | 58 |
| Mandrill | 60 |
| Drain hose | 62 |
| Band Clamp | 64 |
| Rear housing | 66 |
| Battery | 68 |
| Tray | 70 |
| Drink holder | 72 |
| Housing pad | 74 |
| Control panel | 76 |
| Fastener | 77 |
| Operator presence switch | 80 |
| Throttle | 82 |
| Seat | 84 |
| Adjustment Mechanism | 85 |
| Hook | 86 |
| Front housing | 88 |
| Light | 89 |
| Vacuum fan | 92 |
| Vacuum exhaust channels | 94 |
| Waste H2O return hose | 96 |
| Hose channel | 98 |
| Tip over stops | 100 |
| Primary housing | 104 |
| Floor treatment apparatus | 110 |
| Cleaning deck | 112 |
| Trailing wheel | 114 |
| Trailing end | 116 |
| Lidar window | 118 |
| Platform | 120 |
| Centerline of platform | 122 |
| User-receiving area | 124 |
| Drive wheel | 125 |
| Lip | 126 |
| Drive wheel | 130 |
| Cleaning pad | 132 |
| Trailing squeegee | 134 |
| Center of cleaning pad | 136 |
| Centerline of apparatus | 138 |
| Vacuum brush | 140 |
| Bristles | 142 |
| Roller | 143 |
| Female drive member | 144 |
| Aperture | 145 |
| Stationary brush | 146 |
| Base | 147 |
| Bristles | 149 |
| Cleaning deck | 150 |
| Housing | 151 |
| Male drive member | 152 |
| Debris | 154 |
| Guard | 155 |
| Fastener | 157 |
| Sidewall | 160 |
| Female drive member | 162 |
| Aperture | 164 |
| First receiving area | 166 |
| Second receiving area | 168 |
| Cable management device | 170 |
| Cable housing | 172 |
| Motor | 174 |
| First cable | 176 |
| Second cable | 178 |
| Aperture | 180 |
| Upper plate | 182 |
| Lower plate | 184 |

-continued

| Component | # |
|---|---|
| Mounting member | 186 |
| Axis | 189 |
| Central aperture | 190 |
| Lip | 192 |
| Annular ring | 194 |
| Mounting ring | 196 |
| Internal area | 197 |
| Key way | 198 |
| Cord aperture | 199 |
| Stop | 200 |
| Mounting ring | 202 |
| Annular ring | 203 |
| Central aperture | 204 |
| Internal area | 205 |
| Lip | 207 |
| Cord aperture | 209 |
| Tooth | 211 |
| Stop | 213 |

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

Referring now to FIGS. 1-20 an apparatus 2 for cleaning or otherwise treating a floor surface is shown. More specifically, one embodiment of the present invention includes a chassis 8 with a platform 4 that is adapted to support the weight of an operator 6, thus increasing the efficiency of the entire floor treatment operation. In addition, various cleaning or floor treatment components may be interconnected to the bottom surface 10 of the chassis, such as brushes 12, scrubbers 14, squeegees 16, vacuum shoes, etc.

The chassis 8 also includes a plurality of wheels 18 operably interconnected to the bottom surface 10 to enable steering and provide stability. It is contemplated that the operator 6 will stand on the platform 4 and steer the apparatus 2 with either a steering wheel 20 or other type of steering mechanism, such as a joy stick 22. Such an embodiment of the present invention enables the floor surface to be cleaned or otherwise treated more efficiently, since the operator 6 does not have to push or pull an often heavy apparatus 2. In addition, since the human component of powering or otherwise moving the apparatus 2 is omitted, more consistent flooring treatment is achieved, thereby saving materials and reducing costs of the entire operation.

Referring now to FIG. 1, one embodiment of the present invention is shown. More specifically, the chassis 8 which includes the platform 4 adapted to support the operator 6 during the floor treatment operation is shown. The operator 6 preferably stands on the platform 4 that is generally parallel to the flooring surface. Preferably, the platform 4 is tilted, rear edge higher than the front edge, between about 3 to 8 degrees to increase ergonomics. However, as it will be appreciated by one skilled in the art, other support devices, such as seats, which may be operably folded into the chassis 8, may be provided to increase the comfort level of the operator 6. In addition, the embodiment of the present invention shown in FIG. 1 is equipped with a steering mechanism, such as a wheel 18, that allows the operator 6 to easily maneuver the apparatus 2 around the flooring surface.

The chassis 8 is constructed of any material, but preferably hard plastic will be used to reduce the weight of the apparatus 2. As shown herein, a plurality of wheels 18 are operably interconnected to the rear of the apparatus 2 to provide stability and perhaps power for locomotion. In addition, a squeegee 16 is included that is adapted to extract or funnel water or debris to a location where it is extracted via vacuum into a container generally, but not always, located at least partially inside the chassis 8. Further, this embodiment of the present invention includes a brush 12 that is used to agitate the flooring surface to loosen dirt, wherein spray nozzles may be employed situated behind the brush 12 to treat the flooring and capture the dirt so that it can be gathered by the squeegee 16 and suction system of the apparatus 2.

Figure 2:
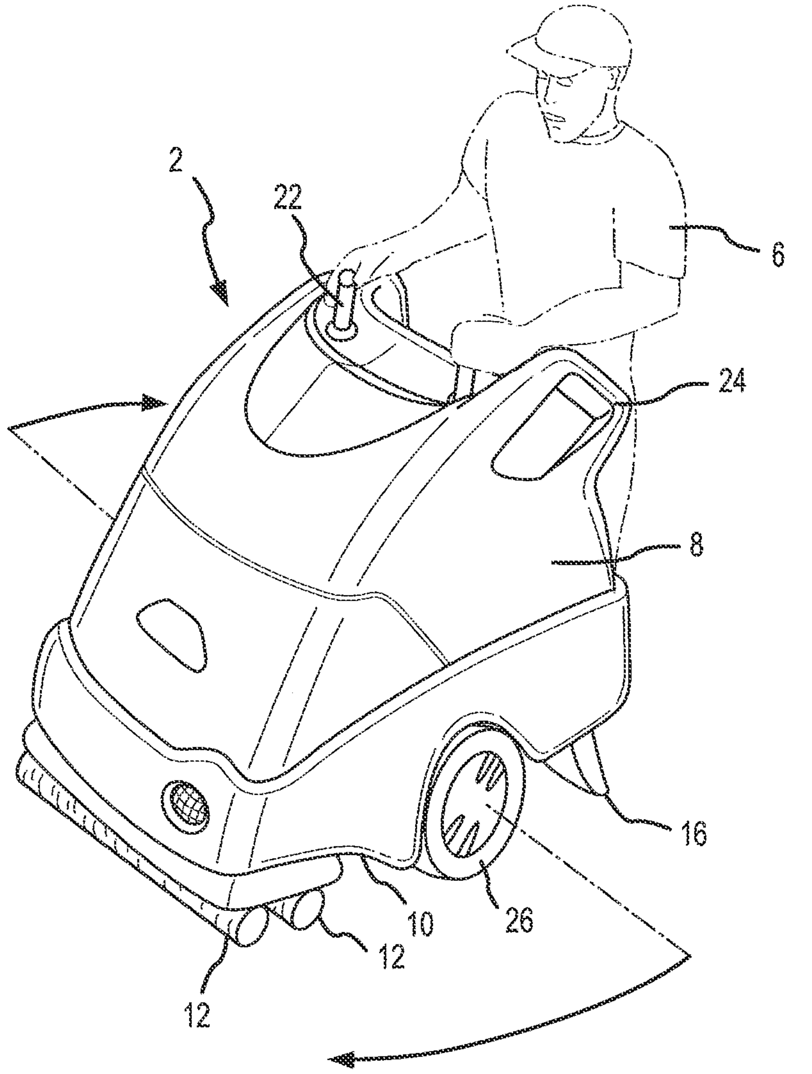
FIG. 2 is a perspective of an alternate embodiment of the present invention that is configured for fluid extraction, and which is controlled by at least one joy stick.

Referring now to FIG. 2, an alternate embodiment of the present invention that is used mainly for fluid extraction is shown. This embodiment of the present invention is similar to the apparatus described above, however alternate components are interconnected to the bottom surface 10 of the chassis 8 such that the apparatus is adapted to efficiently capture fluids or debris deposited on a floored surface. More specifically, this embodiment of the present invention is equipped with at least one brush 12 adapted to agitate water and/or debris and a squeegee 16 that is positioned adjacent to the rear surface of the chassis 8 that contains fluid and debris as the apparatus 2 moves forward. In one embodiment of the present invention, a suction device, such as a vacuum shoe, is positioned near the squeegee 16 such that dirty water is vacuumed from the surface and transferred back into a tank situated inside or adjacent to the chassis 8. Alternatively, another embodiment of the present invention is provided with a squeegee 16 with a plurality of suction holes that are the terminus of conduits that transport waste water to the storage tank.

In the illustrated embodiment, the operator 6 is able to control the apparatus 2 with a plurality of j oy sticks 22. In addition, hand grips 24 are provided on the sides of the operator 6 to increase safety. Further, this embodiment of the present invention employs powered wheels 26 that allow the entire system to rotate on a single vertical axis without substantially transitioning in other directions. More specifically, this embodiment of the present invention is capable of performing a 360E turn, which aids cleaning of tight spaces.

Figure 3:
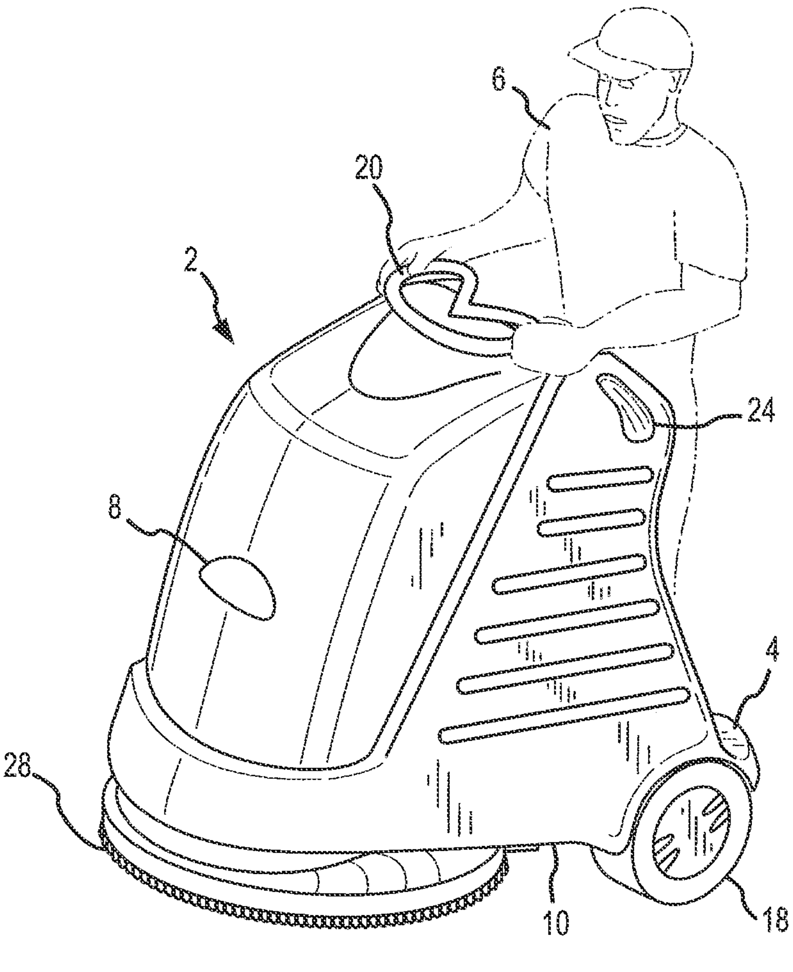
FIG. 3 is a perspective view and alternative embodiment of the present invention that is configured for burnishing operations.

An alternate embodiment of the present invention that is used for burnishing is shown in FIG. 3. This embodiment of the present invention includes a burnishing pad 28 operably interconnected to the bottom surface of the chassis 10. As before, the operator 6 stands on a platform 4 built into the chassis 8. One skilled in the art will appreciate that this embodiment of the present invention may also include a device for suctioning debris left over from the burnishing process, such as dust or wax particulates, for example.

Figure 4:
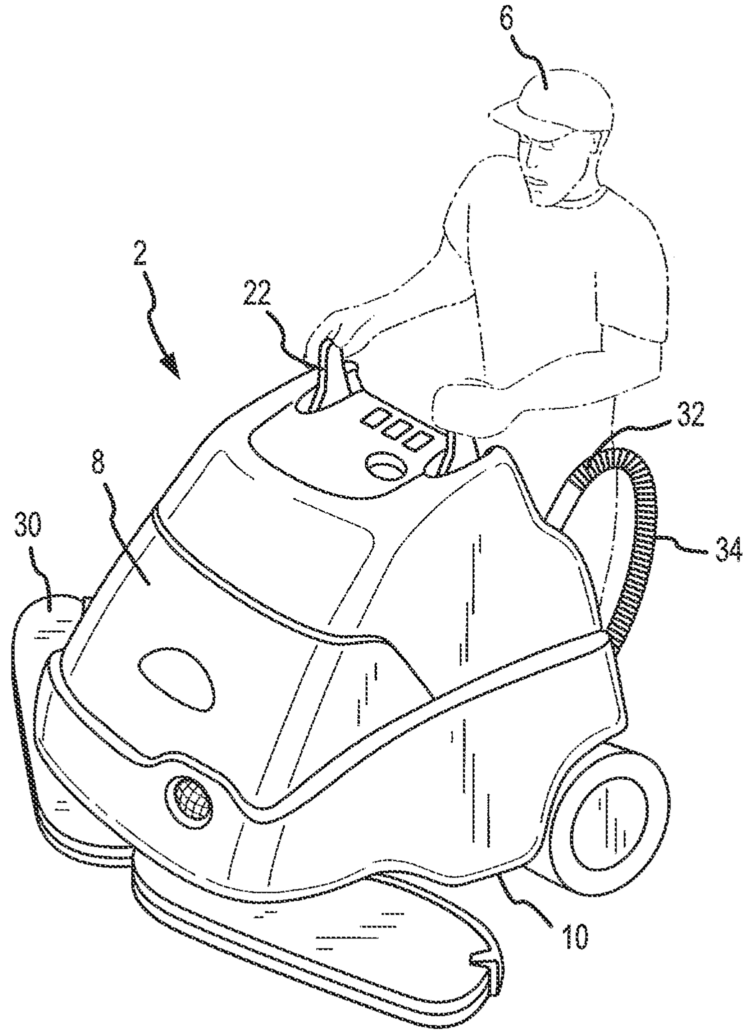
FIG. 4 is a perspective view of an alternative embodiment of the present invention that is equipped with moveable brushes that are adapted to swing out to more efficiently treat a floor surface, and which also includes a wand for selectively cleaning difficult to reach areas.

Referring now to FIG. 4, an alternate embodiment of the present invention that employs swinging brushes 30 is shown. This embodiment of the present invention is very similar to those described above, however the brushes 30 used to agitate, scrub, or burnish are rotatably interconnected to the bottom surface 10 of the chassis 8. More specifically, the brushes 30 of this embodiment are capable of independently folding inwardly, thereby efficiently cleaning the interior portion of a floor when the apparatus is operating near a vertical surface such as a wall. As shown herein, the brushes 30 are independently movable and preferably spring loaded outward such that contact with a vertical surface causes the brush 30 to fold under the chassis 8. Alternatively, as one in the art will appreciate, the orientation of the brushes may be controlled by the operator. In addition, a wand 32 interconnected to a hose 34 may also be employed with this embodiment of the present invention to allow for selective application of cleaning solution or suction.

Figure 5:
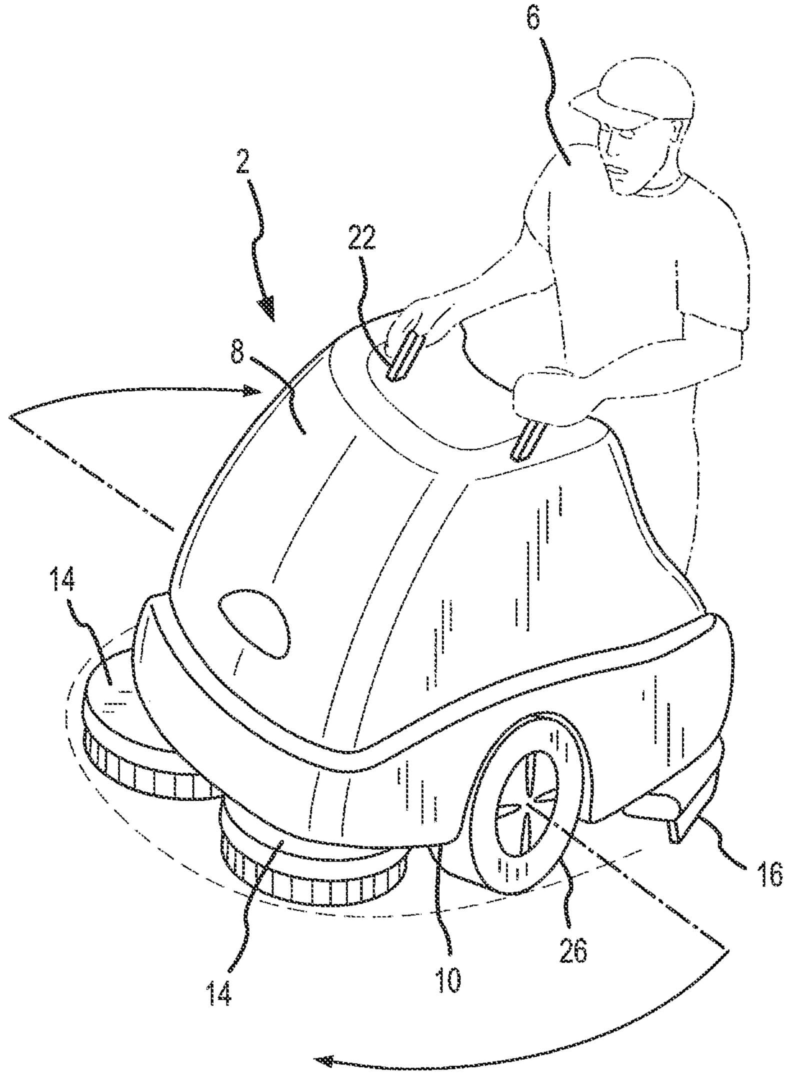
FIG. 5 is a perspective view of an alternative embodiment of the present invention that is designed to rotate about an 360E axis without significantly traversing in other directions.

Referring now to FIG. 5, another embodiment of the present invention that utilizes centered powered wheels 26 is shown. More specifically, this embodiment of the invention is similar to those described above, however it is equipped with a plurality of wheels 26 that allow a 360E turning capability. This embodiment of the present invention is also similarly adapted for cleaning the surface of a floor with a brush 12 or a plurality thereof that is used to agitate the dirt wherein a squeegee contains and suctions debris into a container.

Figure 6:
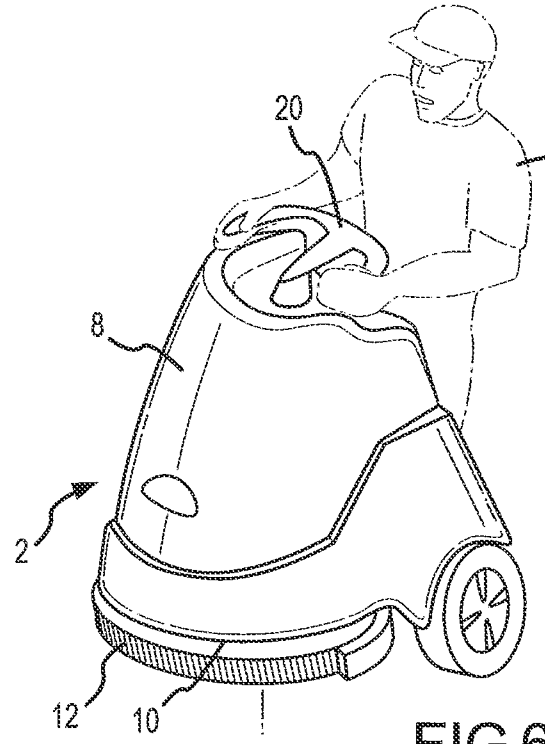
FIG. 6 is a perspective view of an alternative embodiment of the present invention that is designed to reach tight areas of floor surface.
Figure 7:
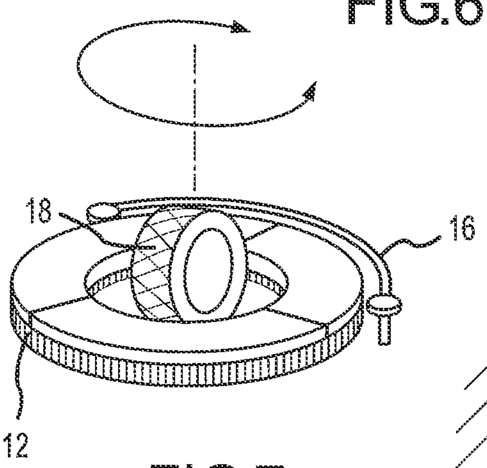
FIG. 7 is a detailed perspective view of the embodiment shown in FIG. 6, showing the steering wheel, brush, and squeegee assembly used therewith.
Figure 8:
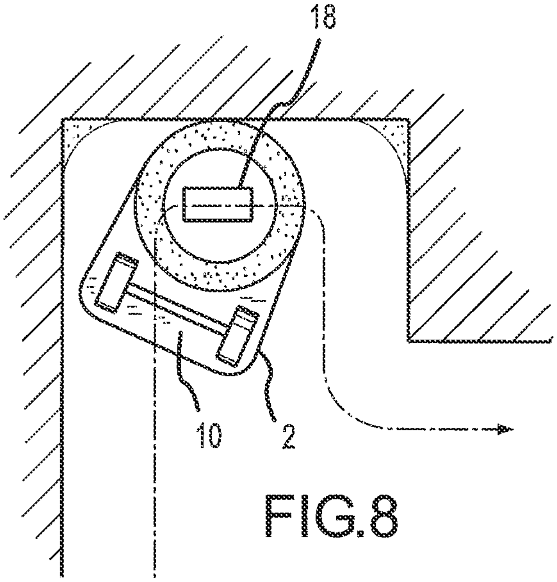
FIG. 8 is a top plan view of a flooring surface.

Referring now to FIGS. 6-8, an alternate embodiment of the present invention is shown that is equipped with a wheel 18 with brushes 12 therearound for cleaning in all directions. This embodiment of the present invention is equipped with brushes 12 that allow for cleaning or agitation of the flooring surface in any direction the apparatus 2 is moving, thus efficiently cleaning flooring without having to make multiple passes over the surface.

Figure 9A:
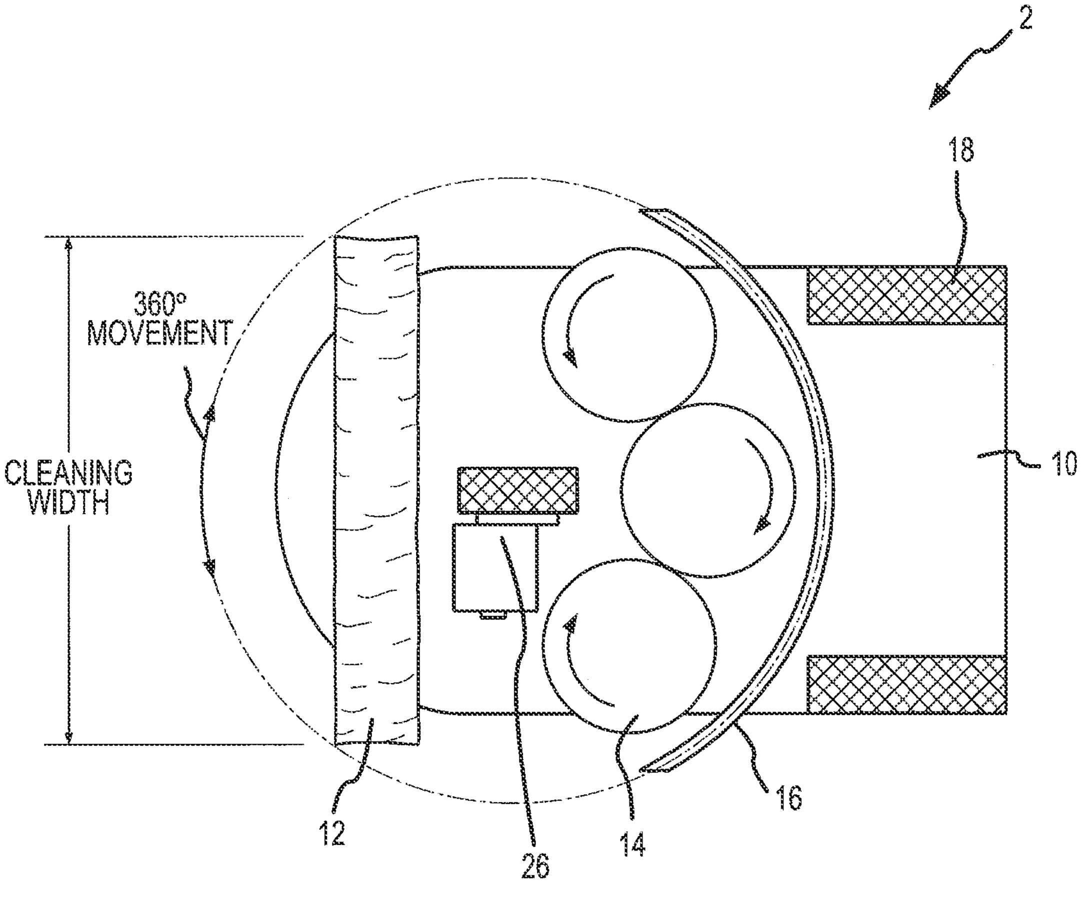
FIGS. 9A-B are bottom plan views showing configurations of steering, cleaning, and power mechanisms.
Figure 9B:
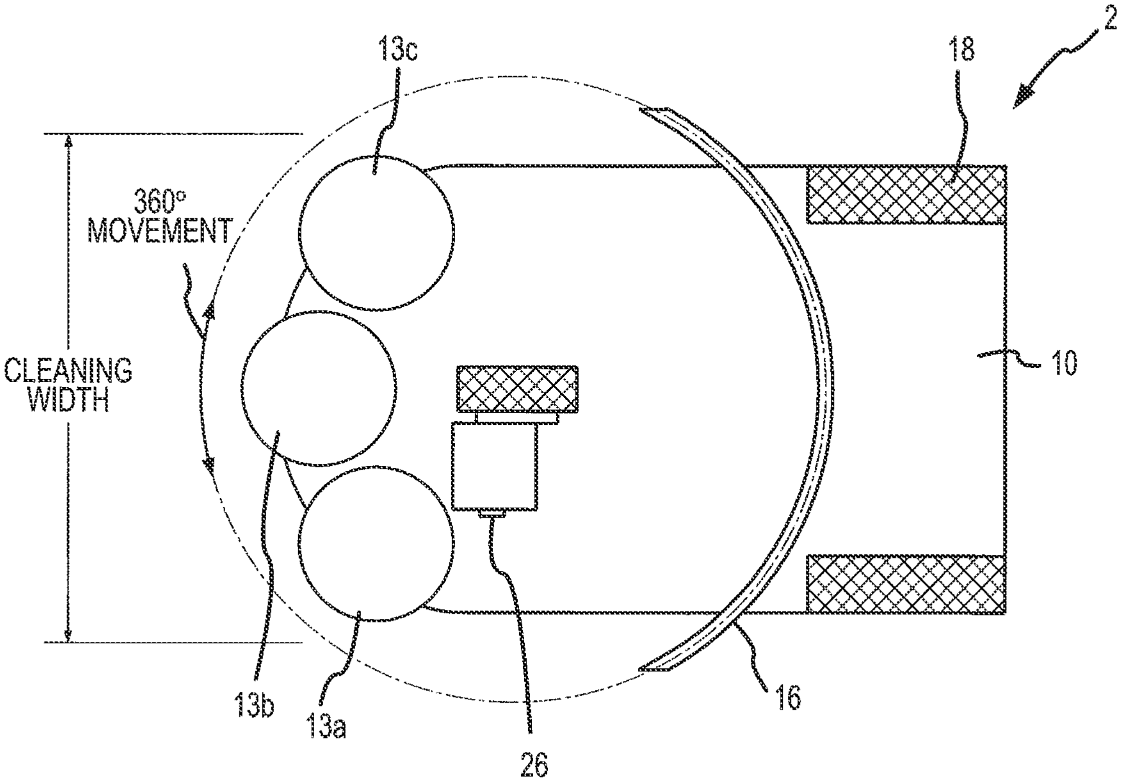

Referring now to FIG. 9A-B, one configuration of cleaning components interconnected to the bottom surface 10 of the chassis 8 is shown. More specifically, one embodiment of the present invention is adapted to either sweep or clean a floor. In the illustrated embodiment, a presweeping brush 12 agitates the carpet or hardwood floor to loosen debris. Next, rotating scrubbing brushes further agitate the surface and perhaps add fluid and cleaning solution thereto to help loosen and contain any loose debris. Finally, a squeegee 16 and preferably a suction system is provided that captures the dirty water and as the apparatus is moved forward. As shown herein, the drive unit is the center wheel 26, which is also adapted to selectively rotate upon steering commands from the operator 6.

FIG. 9B shows a configuration of cleaning components interconnected to the bottom surface 10 of the chassis 8 similar to what was shown in FIG. 9A. The difference, however, is that the pre-sweeping brush 12 has been replaced by three scrub brushes or three rotating brushes, 13A, 13B and 13C that may be used to either sweep, burnish or combinations thereof a floor surface. The brushes can rotate at speeds desired by the operator or at preselected speeds and in directions selected by the operator or in pre-selected directions.

Figure 10:
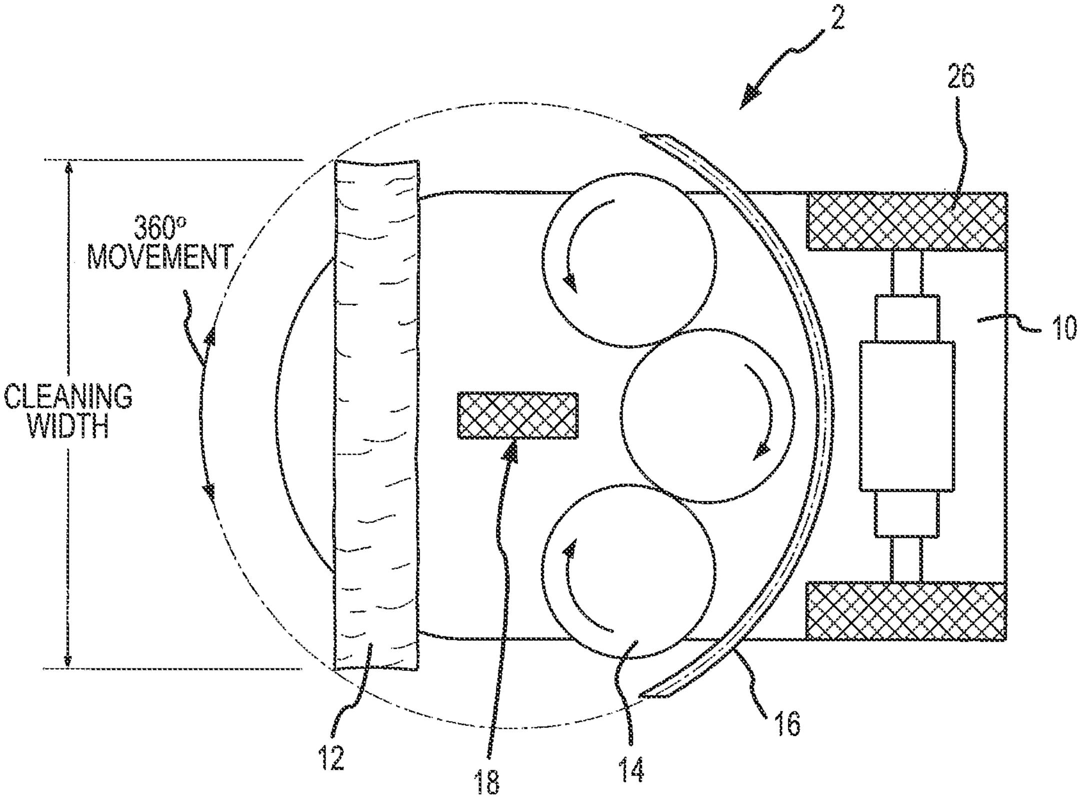
FIG. 10 is a bottom plan view of an alternate embodiment of the present invention showing an alternate configuration of steering, cleaning, and power mechanisms.

Referring now to FIG. 10, an alternate configuration of the cleaning components interconnected to the bottom surface 10 of the chassis 8 is shown. More specifically, this configuration is substantially similar to that shown above in FIG. 9, however, the drive mechanism of the apparatus is a transaxled power plant that provides power to the rear wheels 26, wherein the steering is performed by a front wheel. In one embodiment of the present invention the drive mechanism is an electric monowheel drive. In another embodiment, the drive mechanism comprises rear wheels that are independently driven by drive motors.

Figure 11:
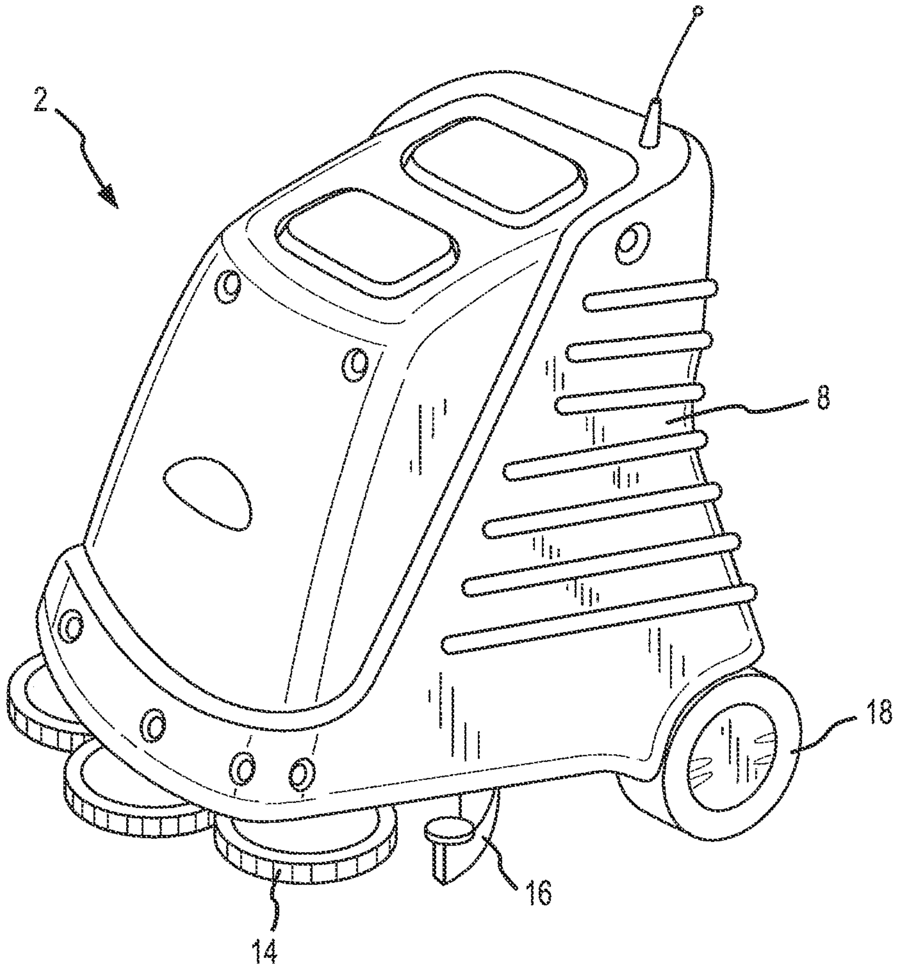
FIG. 11 is a perspective view of an alternative embodiment of the present invention that is adapted to be remotely controlled.

Referring now to FIG. 11, yet another embodiment of the present invention performs a floor treatment operation without the need of physical human contact is shown. More specifically, this embodiment of the present invention is remote controlled or otherwise intelligent such that it cleans a floor surface without the direct contact of an operator. This embodiment of the present invention may be configured for any task, such as scrubbing, sweeping, vacuuming, burnishing, carpet cleaning, waxing, surfacing, cleaning, etc. It is envisioned that the operator be in a separate location, perhaps offsite from the actual cleaning operation, and aided by remote viewing devices. Alternatively, one embodiment of the present invention is programmed with the ability to automatically treat a floor surface, wherein the dimensions of the surface are either programmed into or learned as the apparatus is in use, thereby alleviating any need for human contact with the apparatus. This embodiment of the present invention may be deployed from a storage location automatically wherein quick disconnects to fluid sources or waste receptacles are remotely joined to it such that filling and emptying tanks or waste containers inside the chassis 8 is done without the need of a human operator as well. This embodiment of the present invention may be used in areas where it is dangerous for humans to operate, such as nuclear power plants, areas where asbestos exposure is likely, etc.

Figure 12A:
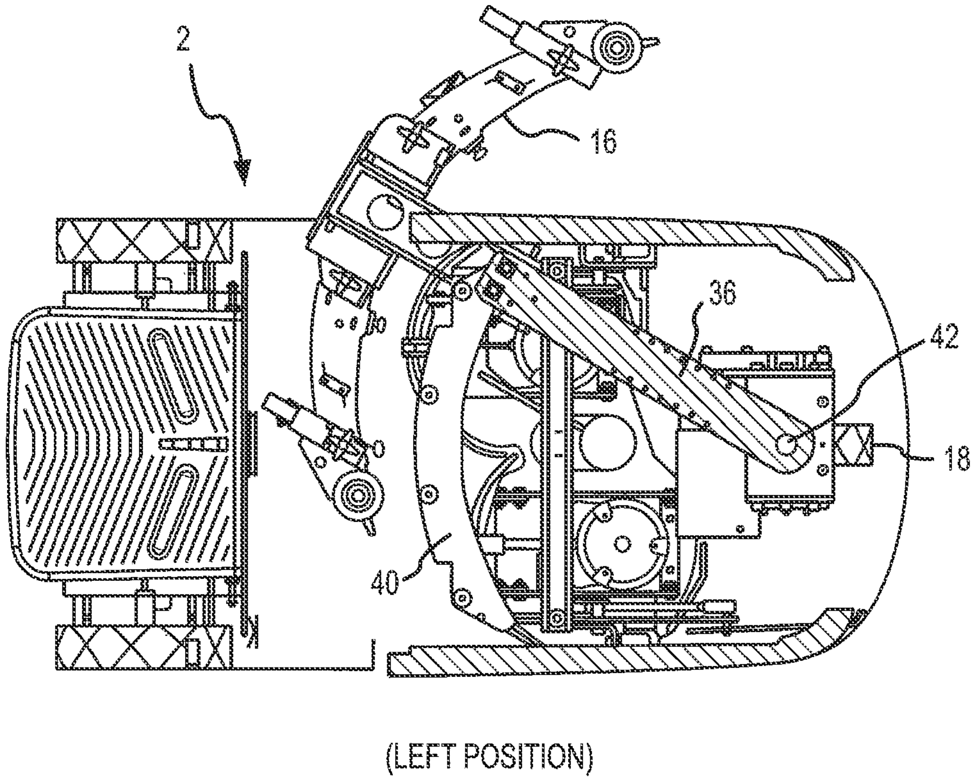
FIGS. 12A-H are views of a rotatable squeegee for use in one embodiment of the present invention.
Figure 12B:
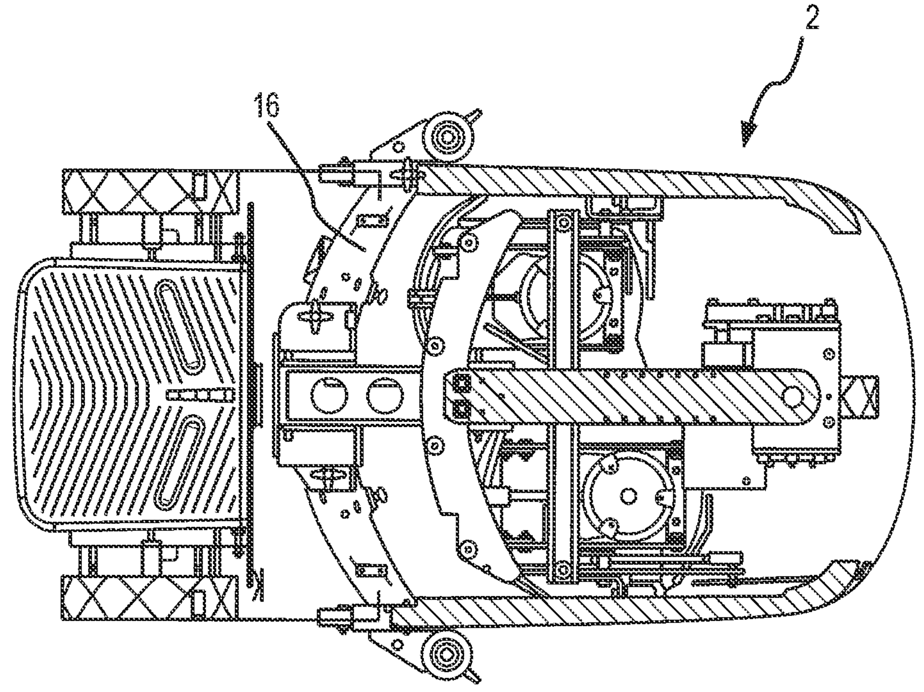
Figure 12C:
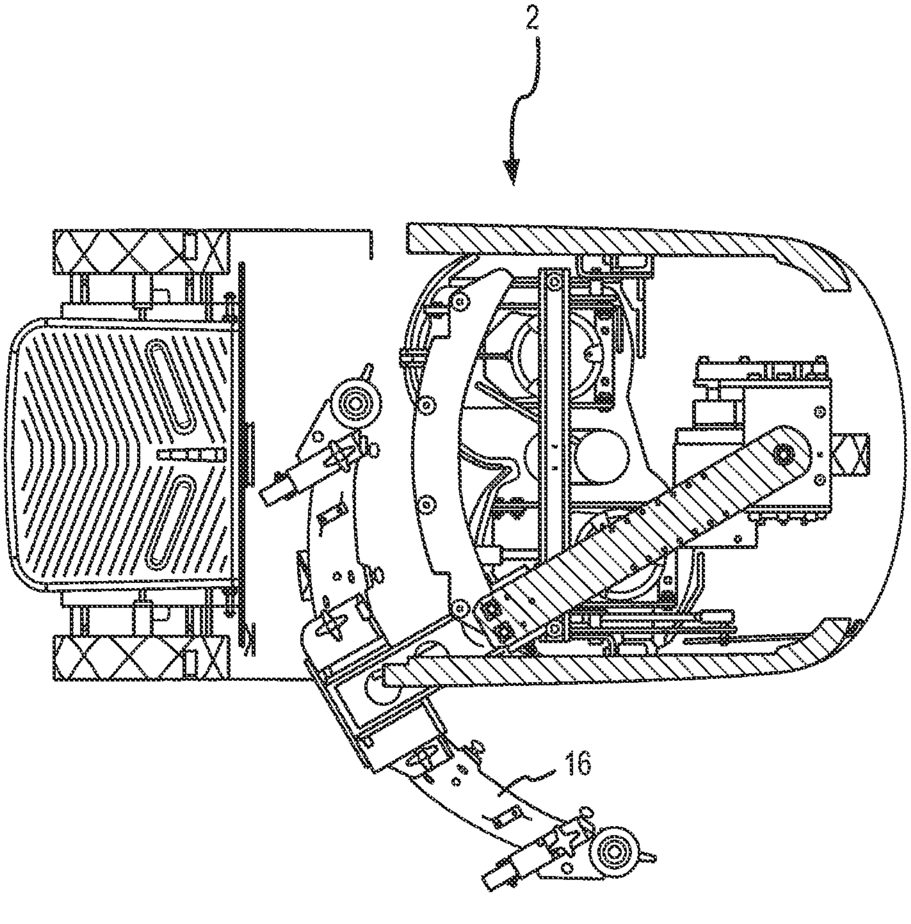
Figures 12D, 12H:
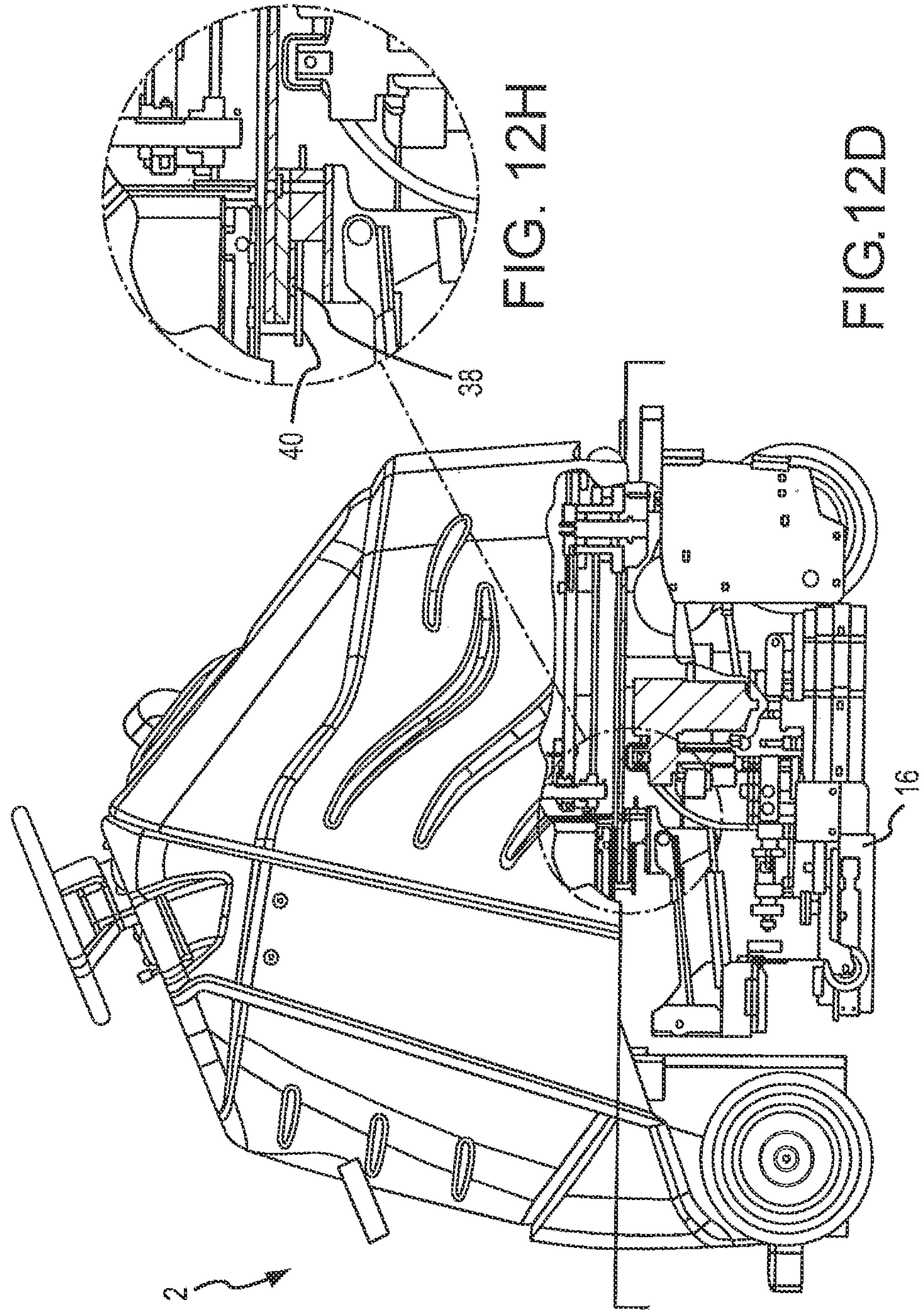

Referring now to FIG. 12A-G, a squeegee 16 for use in one embodiments of the present invention is shown. More specifically, some embodiments of the present invention include a pivot mechanism that allows the squeegee 16 to remain in place when the floor treating apparatus 2 is turning. Thus, the amount of fluid extracted when the apparatus 2 is making a tight turn is increased. In the illustrated embodiment, the squeegee 16 is connected to a swing arm 36 that pivots about a point adjacent to the front wheel 18 of the apparatus. The swing arm 36 is supported via rollers or bearings 38 on a track 40 that maintain the squeegee's 16 vertical position relative to the floor. Upon making a right or left hand turn, friction will tend to keep the squeegee 16 in a straight line, following the original path of the vehicle. Once a new line of travel is established, the squeegee 16 will fall back in place substantially under the apparatus 2. FIG. 12A shows the squeegee 16 in its upmost left position, while FIG. 12C shows the squeegee in its upmost right position. FIG. 12B shows the squeegee in a neutral position while FIG. 12D shows the squeegee in a neutral position but from a side view.

The squeegee 16 of one embodiment of the present invention is provided with a plurality of wheels that interface with the floor to maintain the vertical clearance of the squeegee assembly. In addition, side rollers may be provided that prevent the squeegee 16 from contacting a vertical surface, such as a wall. These wheels and various portions of the squeegee assembly may be selectively adjustable such that the width of the squeegee 16 and the placement of the wheels (squeegee height) may be altered at will.

As shown herein, the swing arm 36 connects to a pivot 42 that utilizes the momentum of the squeegee 16 to swing it from the apparatus 2. However, one skilled in the art will appreciate other methods of transitioning the squeegee 16 from the floor treatment apparatus 2 may be utilized without departing from the scope of the invention. More specifically, a motorized system may be employed that is in communication with the steering system of the vehicle such that rotation of the steering wheel will swing the squeegee 16 away from the apparatus 2 in a predetermined manner.

Figure 12E:
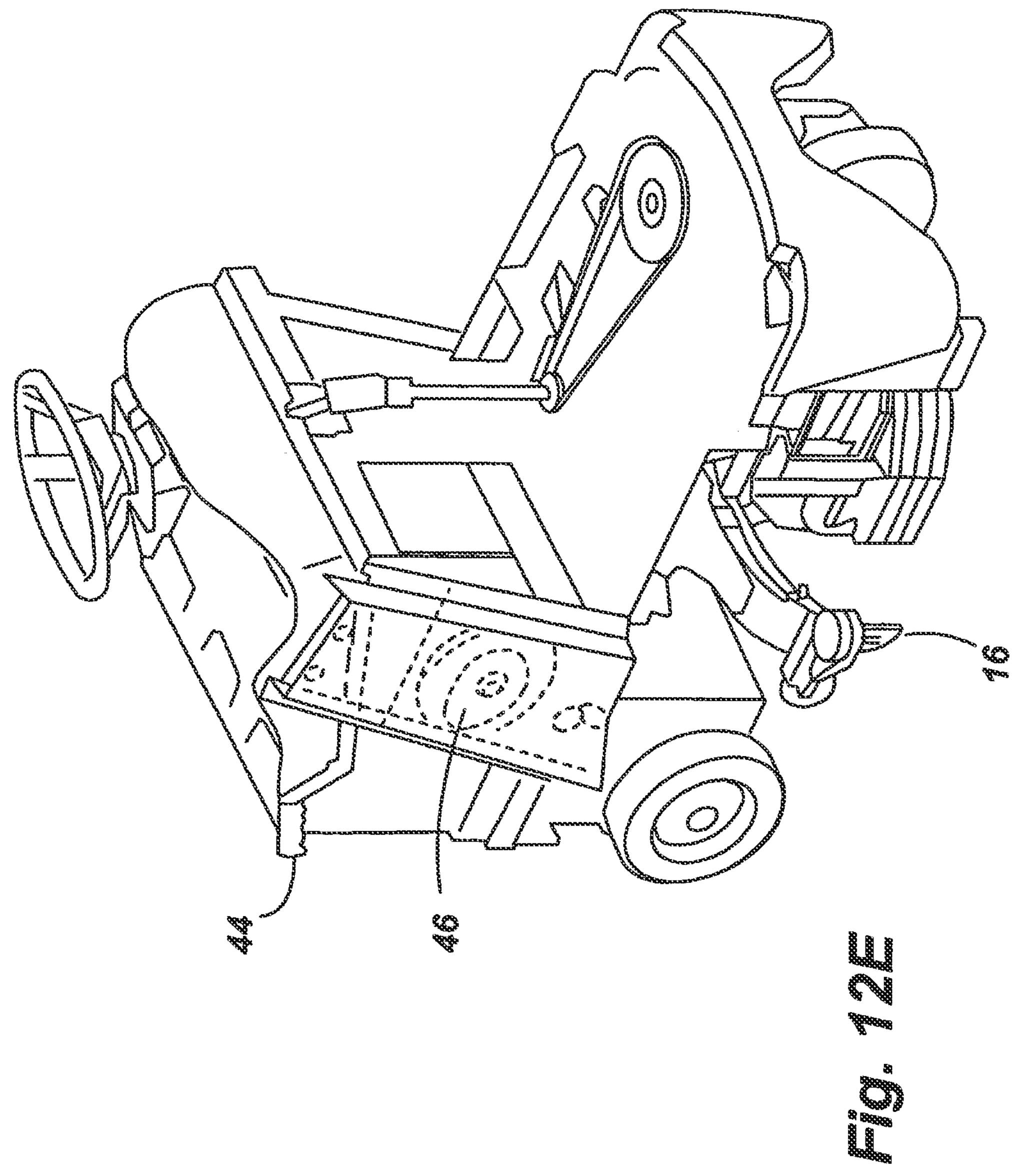
Figure 12G:
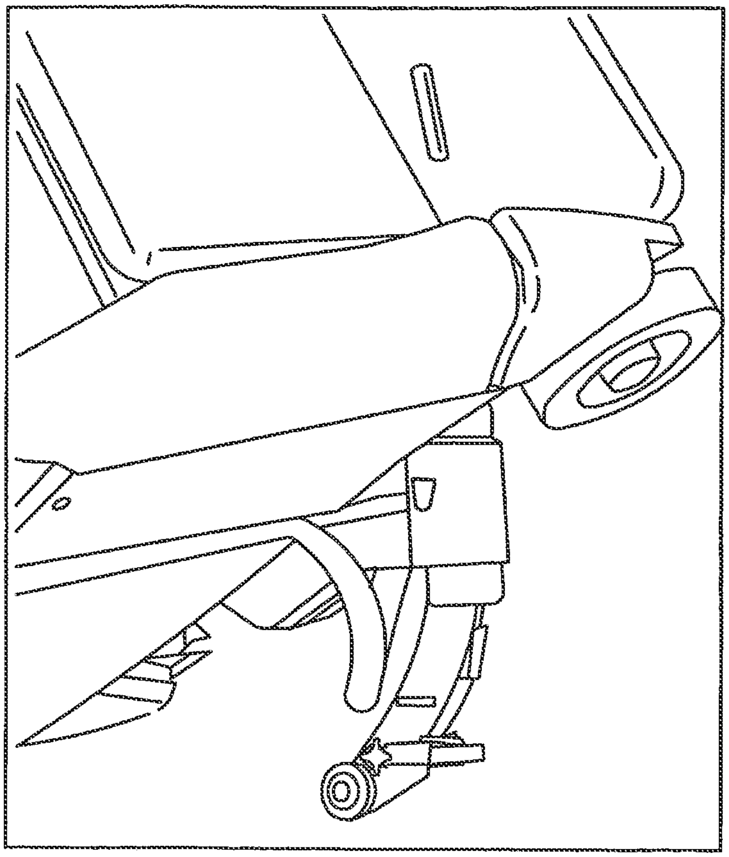
Figure 12F:
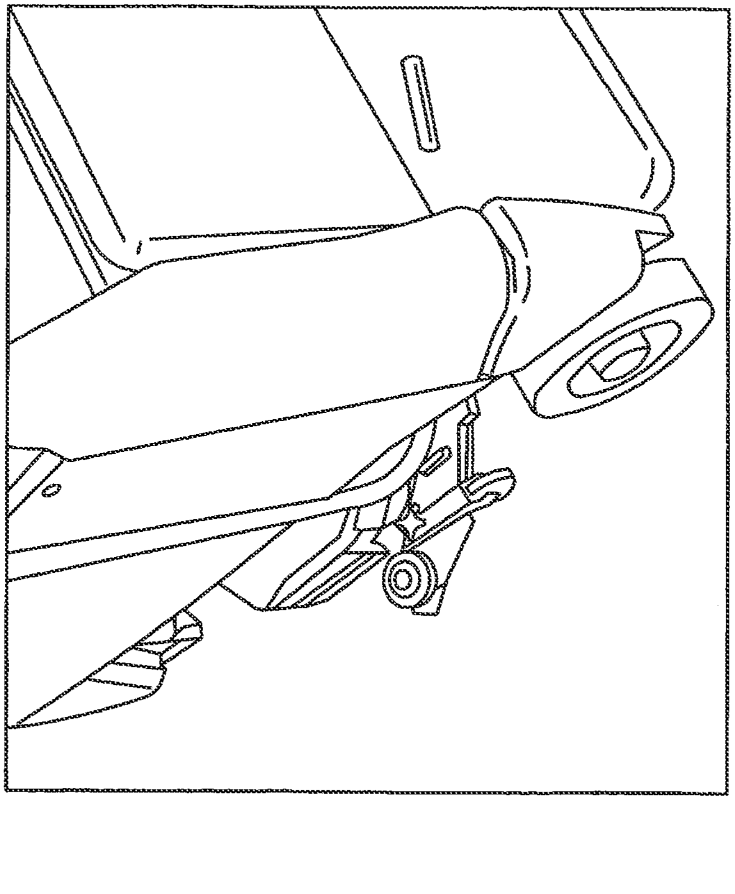

An actuation system that selectively raises the squeegee 16 from the floor may also be included as shown in FIG. 12E. In accordance with some embodiments of the present invention, a handle actuated leverage system 44 is used and is in mechanical communication with a cam 46. The cam allows the user to apply minimal force to the handle 44 adjacent to the control panel to raise and lower the squeegee 16. One skilled in the art will also appreciate that this function may be performed alternatively with a motor.

FIG. 12H is a blow-up of a section of FIG. 12D showing positioning of the track 40 in relation to bearing 38.

Referring now to FIG. 13A-D, a recovery tank strainer basket 48 of one embodiment of the present invention is shown. Recovery tanks of some embodiments of the present invention are constructed out of resiliently deflectable material, such as a plastic bag. The bag is inserted into the clean fluid tank 51 of the apparatus. Once the clean fluid is transferred to the floor treatment tool of the apparatus, waste water may be suctioned into the waste fluid tank, thus expanding the bag and occupying the space once occupied by now dispensed clean fluid. Often, small metal shavings, wood splinters, glass, etc., may be suctioned with the waste fluid and deposited into the waste fluid tank, which may produce rips or tears in the bag and ultimately lead to leakage and contamination of the cleaning fluid. Thus, it is desirable to have a system that captures any dangerous debris such that it does not come in contact with the waste fluid tank. One embodiment of the present invention thus includes a strain basket 48 connected to the cover 49 of the waste fluid tank. In the illustrated embodiment, a generally rectangular straining device constructed of a rigid material with a plurality of apertures therethrough is provided. As the waste water is deposited into the tank through the cover, any large debris is captured by the strain basket 48. One skilled in the art will appreciate that any sized aperture may be employed to dictate the size of debris that is captured. Also, it should be specifically understood that any shape of strain basket 48 may be used without departing from the scope of the invention.

Figure 13A:
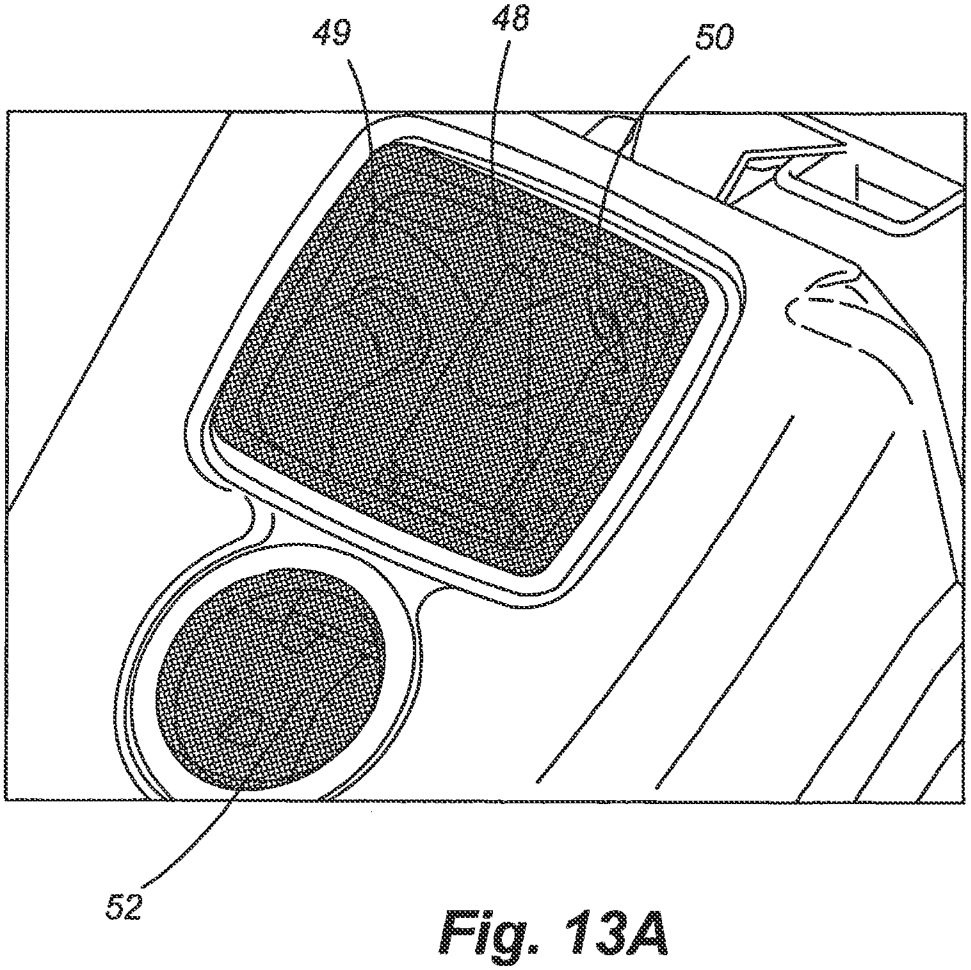
FIGS. 13A-D are views of a waste fluid system showing a strain basket and a drainage port of one embodiment of the present invention.
Figure 13B:
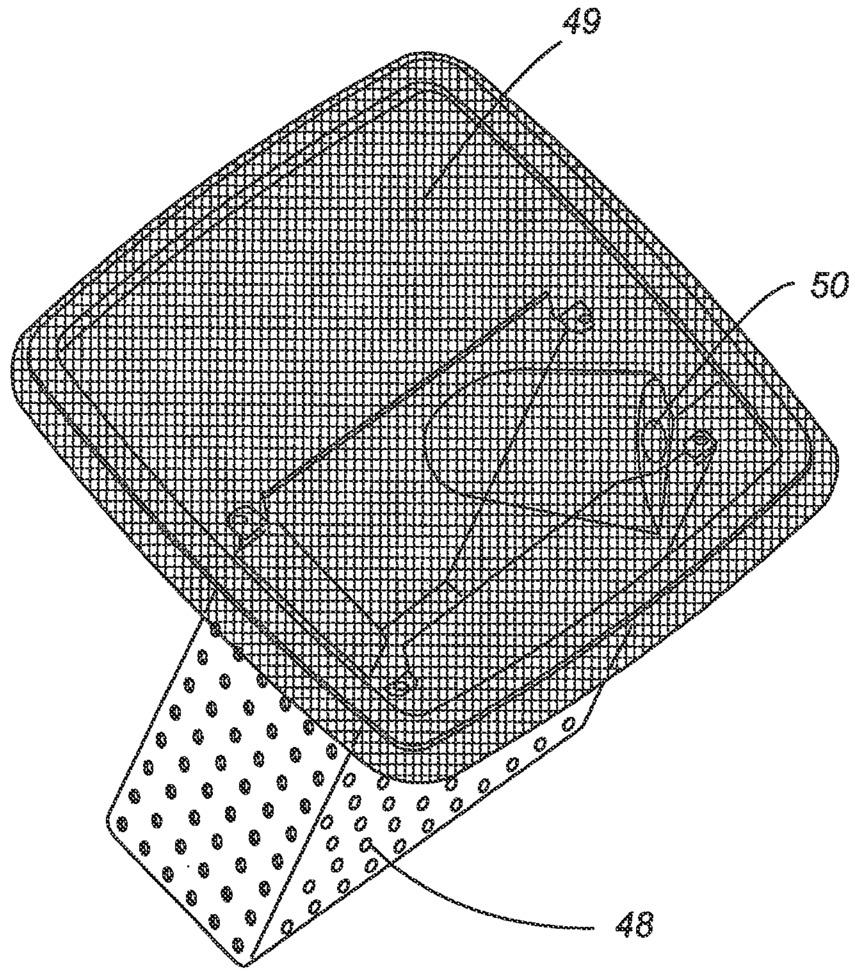
Figure 13C:
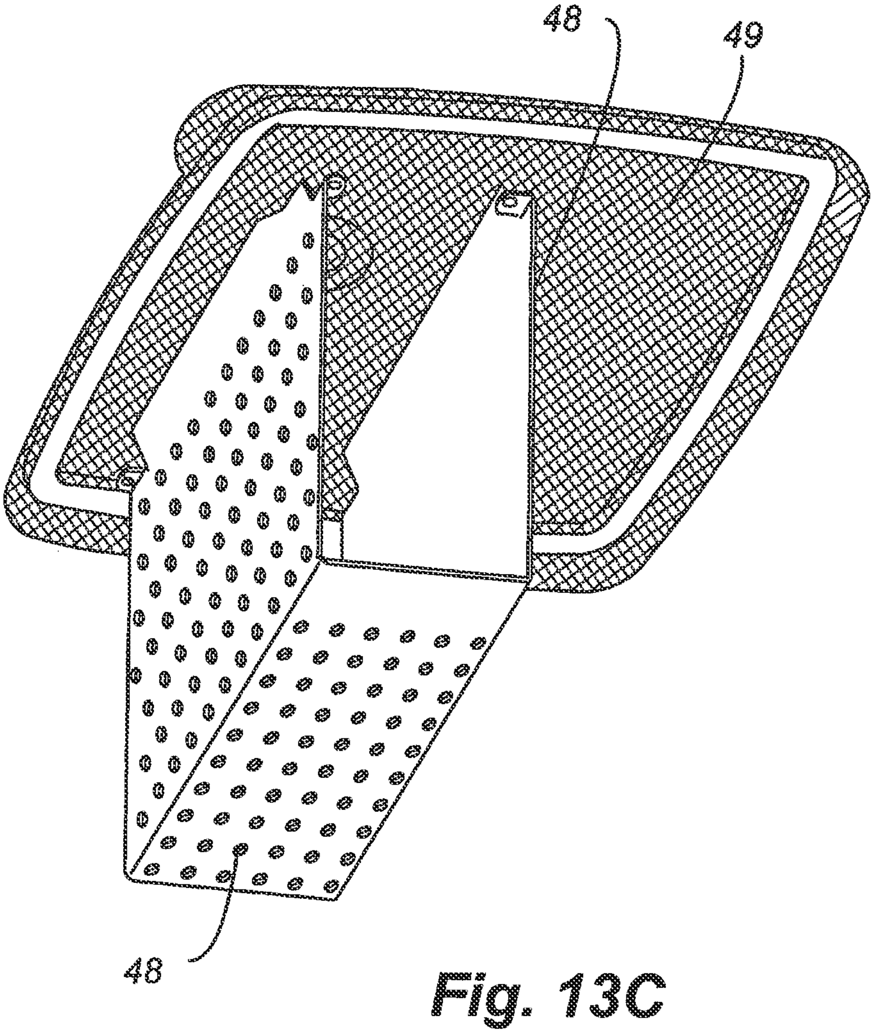
Figure 13D:
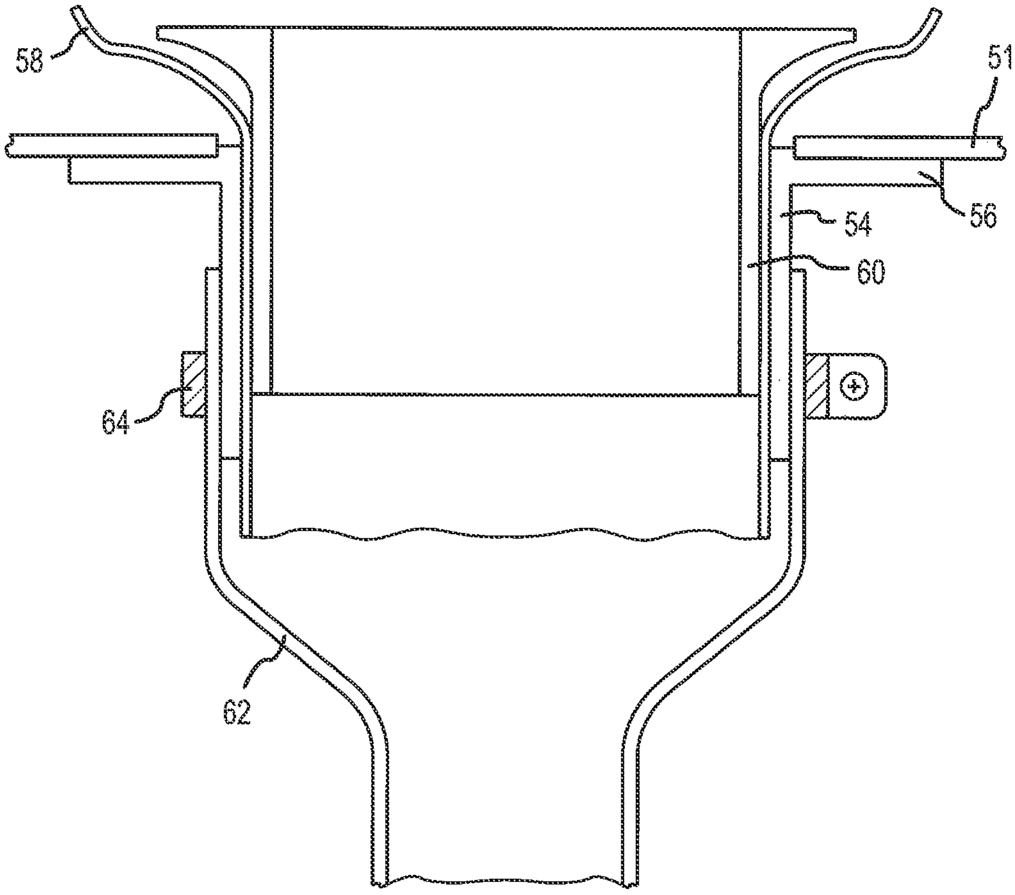
Figure 14A:
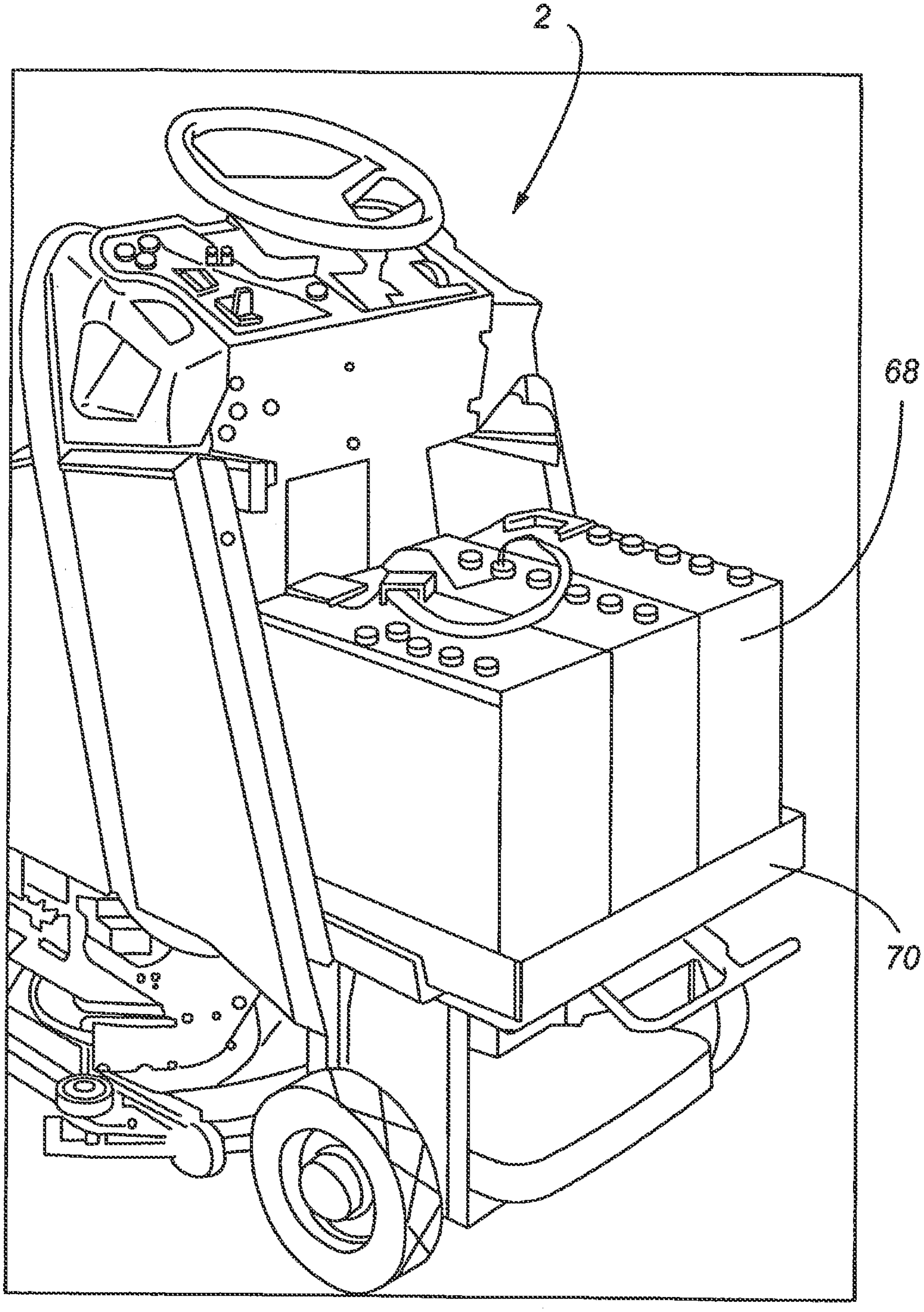
FIGS. 14A-D are views of the rear housing and battery tray of one embodiment of the present invention.
Figure 14B:
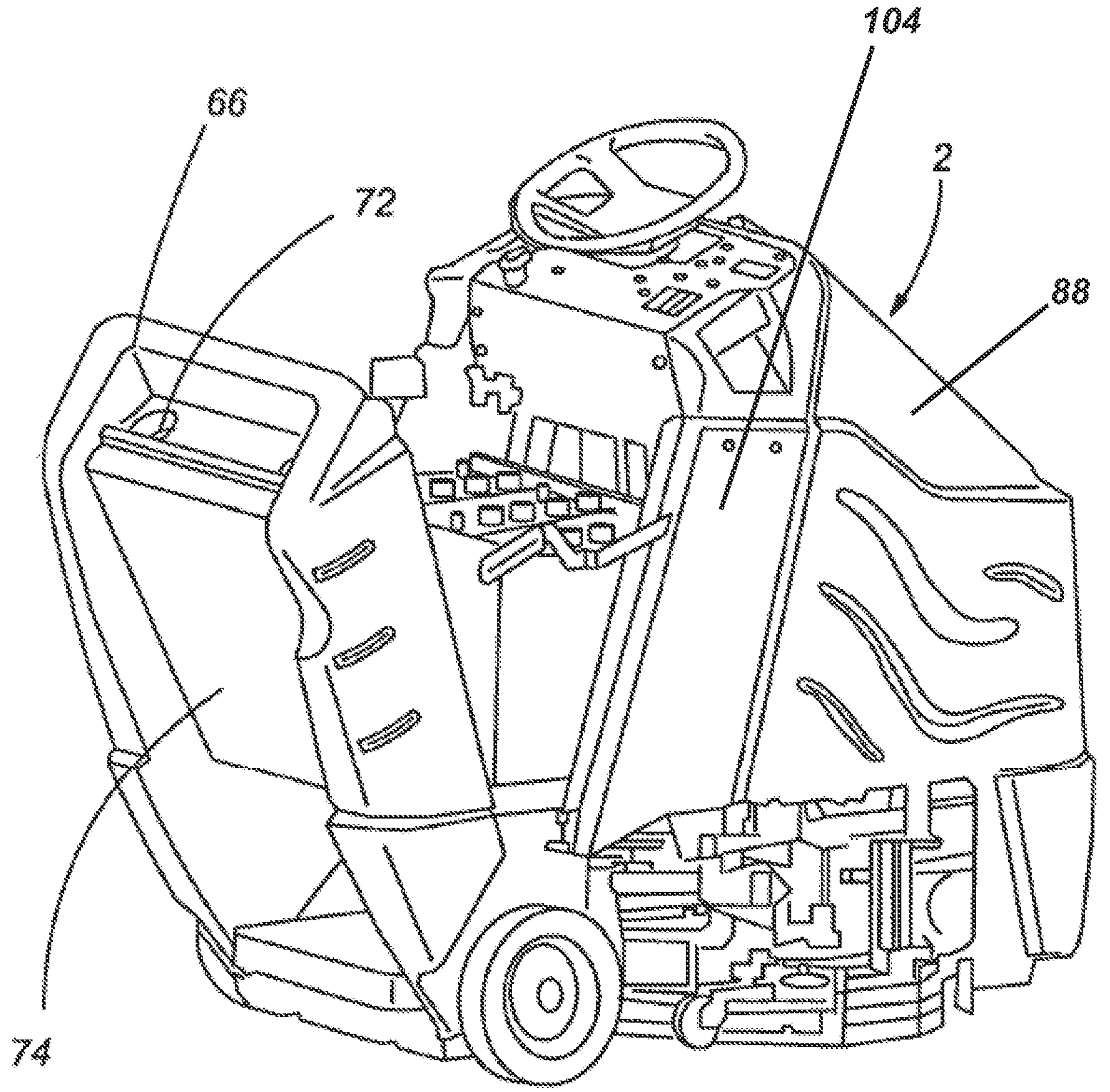
Figure 14C:
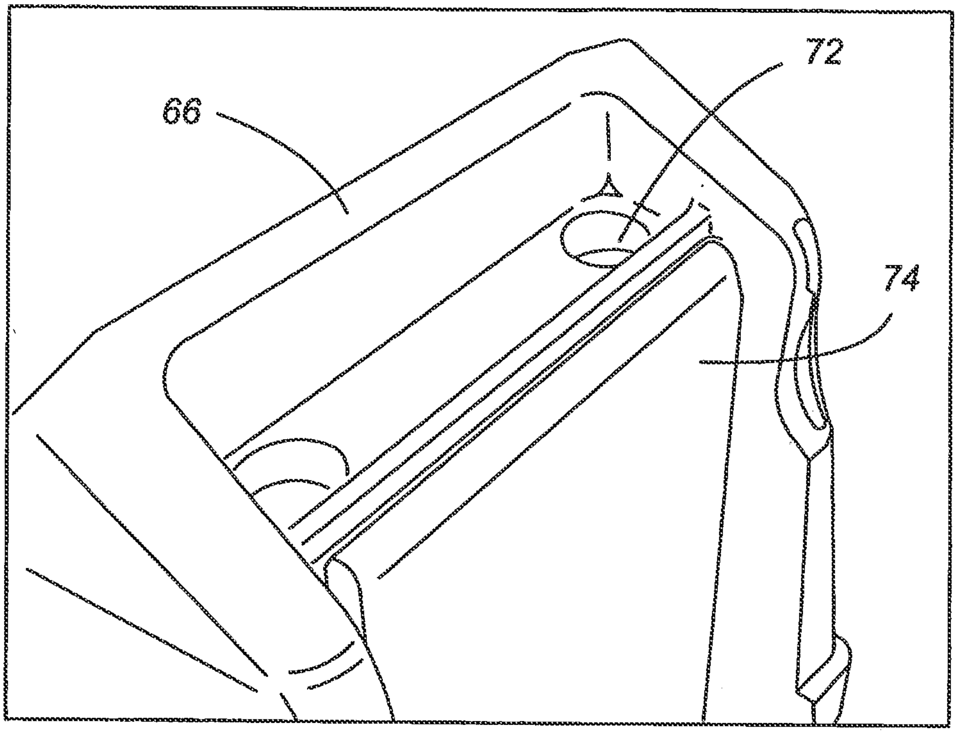
Figure 14D:
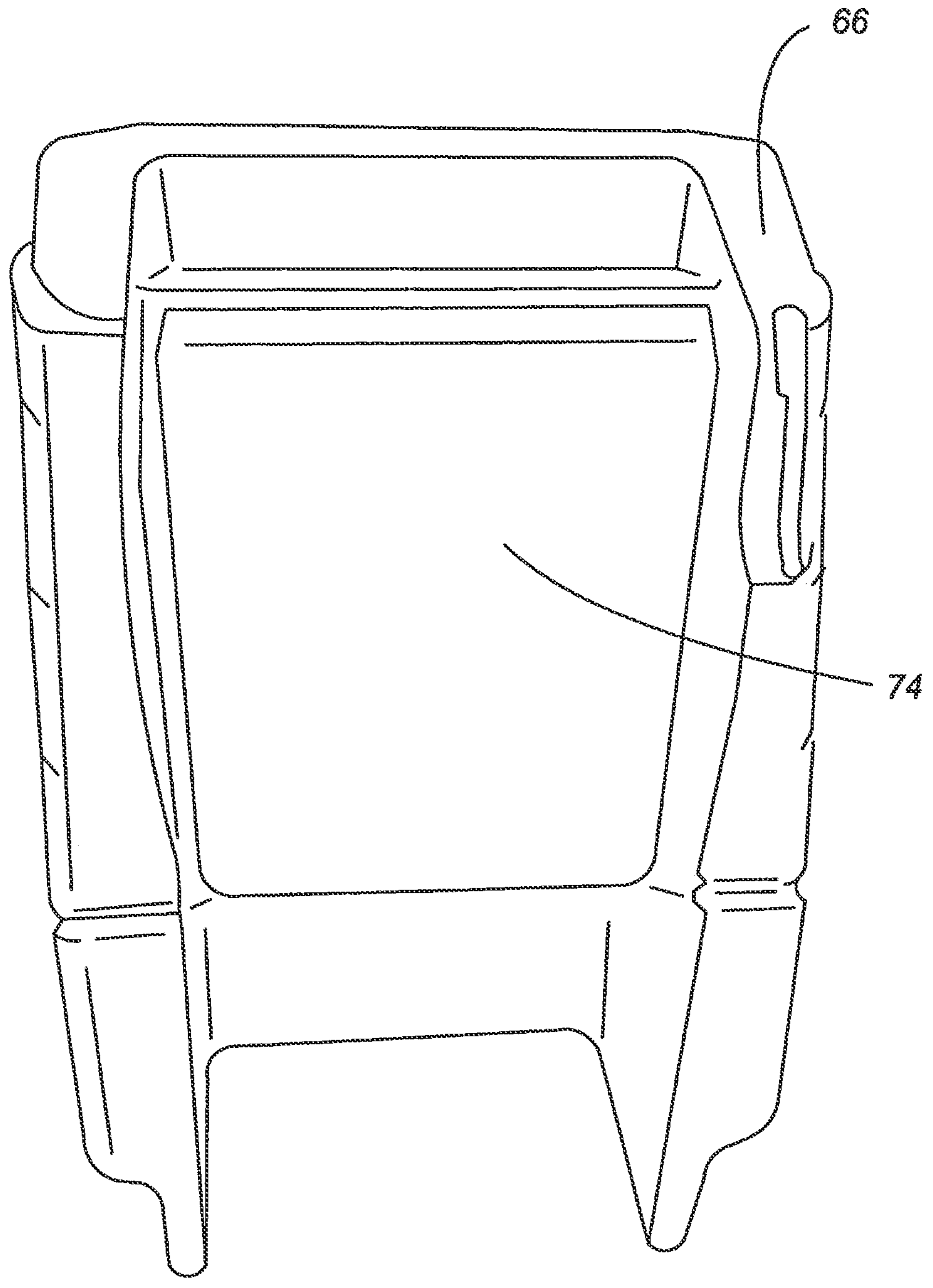

Referring now specifically to FIG. 13D, a fluid discharge system that is connected to the waste water tank 58 of one embodiment of the present invention is shown. More specifically, a fitting 54 with a flange 56 may be used that is connected to the main storage tank 51 of the apparatus. Preferably, the fitting 54 is spun at a high rate of speed and engaged with an aperture in the tank 51, thus creating friction induced heat between the two surfaces and welding them together. The opening of the waste water bag 58 is then fed through the fitting 54 and a mandrill 60 is added to sandwich the waste water bag 58 therebetween. The mandrill 60 is made out of a rigid material, such as aluminum to ensure an open flow path. A drain hose 62 is slid over the outer surface of the fitting 54 and is secured with a clamp 64. One skilled in the art will appreciate that the drain hose 64 is generally capped during use, wherein the user disconnects the cap to drain the waste water from the bag 58. To ensure that the bag 58 is entirely empty, a new solution may be added to the tank, thus squeezing the bag 58 to expel all the waste water contained therein.

Referring now to FIG. 14A-D, the rear portion of the floor treatment apparatus 2 is shown. More specifically, the rear of the apparatus 2 includes a removable housing 66. The housing 66 of the present invention is capable of selective rotation away from a primary housing 104 about an axis parallel to the rear axle of the apparatus 2. Alternatively, the rear housing 66 may be completely removable. This aspect of the present invention provides the ability to access batteries 68 that may provide power to the apparatus 2. The batteries 68 may reside on a removable tray 70 that is slidingly engaged to the apparatus 2, thus providing easy access for maintenance. The tray 70 resides on tracks that interface with a plurality of wheels, bearings, etc. The tray also includes a locking feature that securedly maintains the batteries 68 inside the vehicle. The rear housing 66 also includes other features, such as a cavity for securing various items and drink holders 72. A pad 74 may also be included that provides greater protection and comfort to the user.

Figure 15:
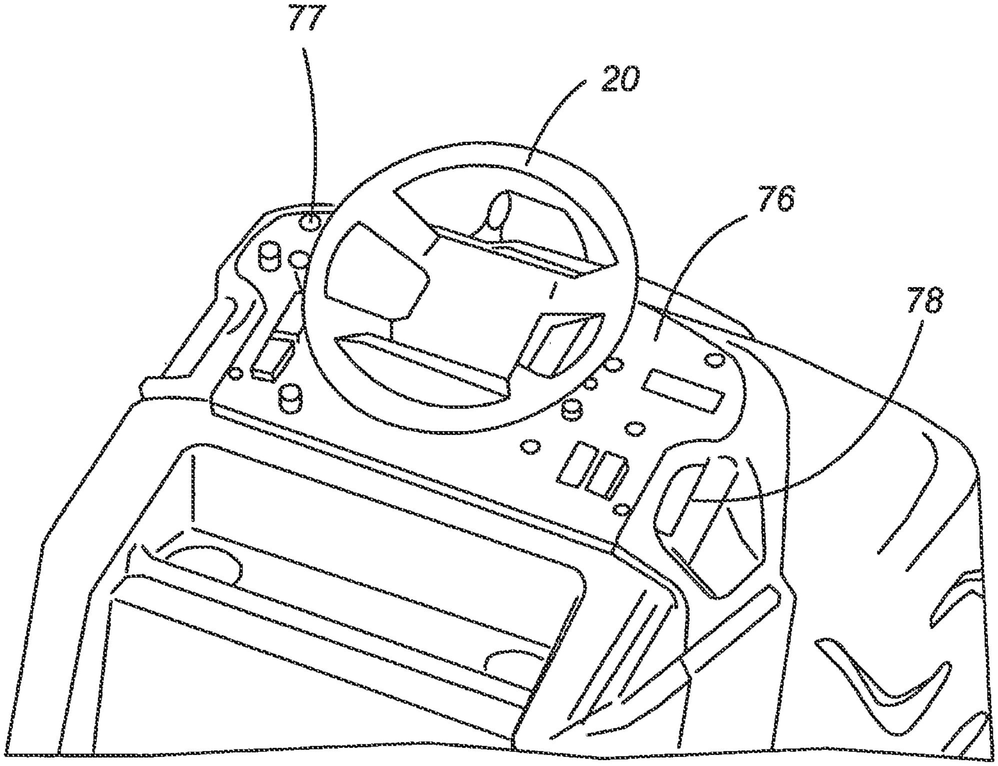
FIG. 15 is a perspective view of a control panel and handles of one embodiment of the present invention.

Referring now to FIG. 15, a control panel 76 and associated structure of one embodiment of the present invention is shown. Embodiments of the present invention include a control panel 76 that includes minimal fasteners 77 for interconnection to the floor treatment apparatus 2. That is, thumb screws, or similar type of fasteners may be included such that quick and easy removal of the control panel 76 may be achieved to facilitate repair.

Embodiments of the present invention also include hand grips 24 adjacent to the control panel 76 to provide support for the operator. More specifically, during tight turns the inertial forces acting upon an individual may cause an operator to fall. Hand grips 24, which may be integrated onto the chassis of the apparatus, will give the operator a place to hold onto the device for added comfort and provide an additional safety feature. In addition they provide support when operating control switches located adjacent to handle grip 78.

Figure 16:
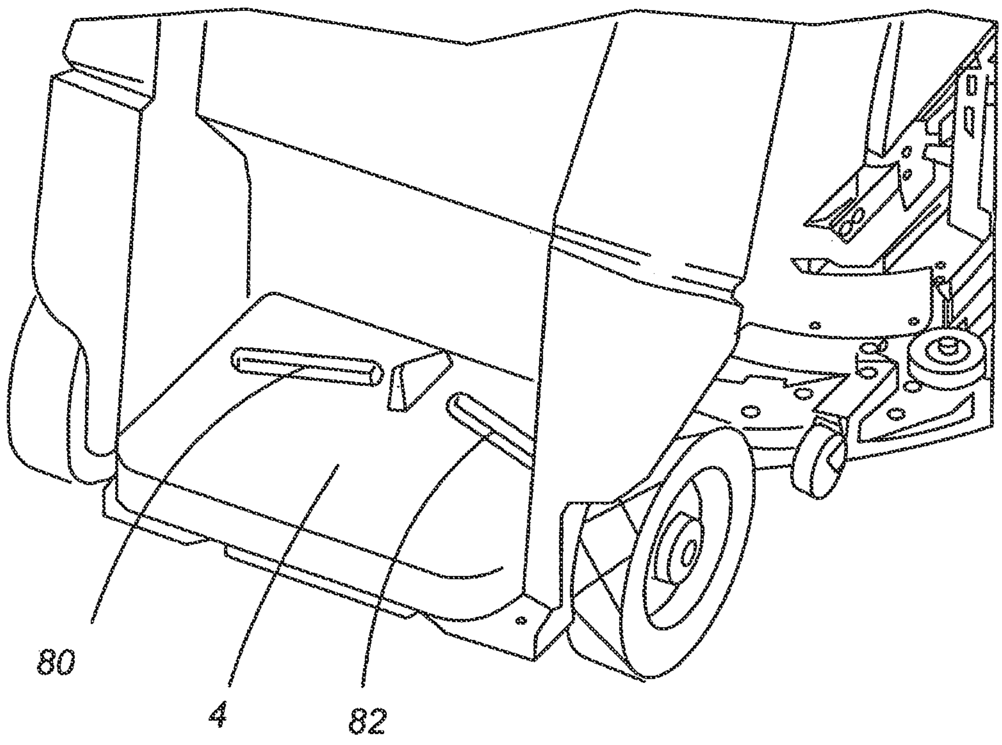
FIG. 16 is a perspective view of an operator platform with a plurality of switches of one embodiment of the present invention.

Referring now to FIG. 16, the platform 4 of one embodiment of the present invention is shown. More specifically, one embodiment of the present invention includes a platform 4 with an operator presence switch 80, a platform switch and a throttle 82. The platform 4 also may include a suspension system and be cushioned to increase operator comfort. In addition, the platform 4 may be foldable such that the envelop of the apparatus may be selectively reduced. In some embodiments of the present invention the platform 4 is located above an axis defined by the centers of the wheels located near the rear of the floor cleaning machine, as specifically shown at least in FIGS. 12A-12D, and 19A. In some embodiments of the present invention, the platform 4 is located below an axis defined by the centers of the wheels located near the rear of the floor cleaning machine, as specifically shown at least in FIG. 14B. In some other embodiments of the present invention, the outer surface of the wheels located near the rear of the floor cleaning machine define a cylindrical volume, and the platform 4 is located such that a portion thereof penetrates the volume defined by the wheels, as specifically shown at least in FIGS. 12A-12D, 14A, 14B, 16 and 20. In some embodiments of the present invention, the platform 4 is located below an uppermost point of the wheels located near the rear of the floor cleaning machine. As shown in FIG. 16, one embodiment of the present invention includes a platform with a left sidewall and a right sidewall that extend above the surface that receives the operator's feet. Embodiments of the present invention may also include a front wall extending from a front, inner surface that receives the operator's feet. Further, as shown in FIG. 9B, the platform may be associated with rear wheels that are not interconnected.

The operator presence switch 80 of one embodiment of the present invention is designed to act as a safety feature that interrupts the throttle pedal when not depressed. This ensures that the operator has both feet positioned on the platform when the machine is in use. Upon deactivation of the switch, for example if the operator removes a foot from the switch, a neutral mode may be engaged such that no power or forward or rearward motion of the device is possible. In addition, the operator presence switch 80 may ensure that sufficient weight is maintained on the platform at all times as a safety feature.

In the typical use, the platform switch is in operable connection with the platform, such that it is activated when the operator stands on the platform. The operator must then engage a reset device, preferably on the control panel, to initiate motion. The purpose of the platform switch and reset switch is to act as a safety feature such that the machine does not immediately move when the operator steps on to the peddle platform. Upon deactivation of the switch, for example if the operator steps from the apparatus, a neutral mode may be engaged such that no power and forward or rearward motion is possible.

The throttle 82 of some embodiments of the present invention is adapted to selectively increase or decrease the speed of the apparatus depending on the desires of the operator. More specifically, various speed ranges may be included: neutral, first, second, third, reverse, etc. (or slow, medium, fast, etc.). In some embodiments, cleaning operations are performed at slow speeds, while transportation from location to location is performed at higher speeds. When the operator sets the speed range to first, for example, the activation of the throttle 82 will propel the apparatus within that speed range, such that it cannot transition from the first range to the second range without a manual shift of the range. Thus, embodiments of the present invention include a hand speed range selector, wherein the throttle 82 simply turns the desired speed range to an activated mode. The neutral mode may also be set by the operator, wherein no amount of throttle 82 engagement will increase the speed of the apparatus. In addition, as mentioned briefly above, when the operator removes his or her foot from the operator presence switch 80, the apparatus automatically disengages the throttle. One skilled in the art will appreciate however, that a throttle 82 may be provided that provides selective speed increments, such as employed on an automobile, without departing from the scope of the invention.

It is likewise known that a throttle used on an electric motor drive device could operate by switches which regulate power delivered from batteries to a motor. For instance, and referring now to FIG. 10 from incorporated by reference U.S. Pat. No. 4,196,492: "batteries 240 are connected through a manually operable switch 117 to a solenoid operated switch 134. Switch 134 has two sets of normally open contacts 132 and two sets of normally closed contacts 133. All the contacts 132 and 133 are mechanically coupled together by means of a rod 135 for simultaneous ganged operation when coil 136 is energized. In the operation of cleaning machine 202, when the manually operable switch 117 is closed by the operator, coil 136 is energized causing the contacts 132 to close. This feeds power through to a potentiometer 131. Potentiometer 131 may be used to vary the voltage there through to adjust the speed of drive motor 108. From the potentiometer 131, the power passes through a forward and reverse switch 120. Forward and reverse switch 120 is identical to that disclosed in FIG. 7 and has for its purpose the changing of the polarity of the voltage applied to drive motor 108 to drive that motor in forward or reverse directions. However, indicator lights generally indicated as 260 and 262 are wired into the forward and reverse switch 120. When the motor 108 is being driven in a forward direction, the green indicator light 260 will light. Conversely, when the motor 108 is being driven in a reverse direction, the red indicator light 262 will be lit."

Embodiments of the present invention also include a braking mechanism. For example, when an operator removes his or her foot from the operator presence switch 80, throttle, or disengages the platform switch, a braking mechanism may be employed such that any motion of the apparatus automatically or gradually ceases. The braking mechanism may be electro mechanical, mechanical or hydraulic. Alternatively, the foot brake may be provided adjacent to the throttle 82 or operator presence switch 80 that provides the same halting capability. Further, hand or emergency brakes may be employed adjacent to the control panel of the apparatus.

Figure 17B:
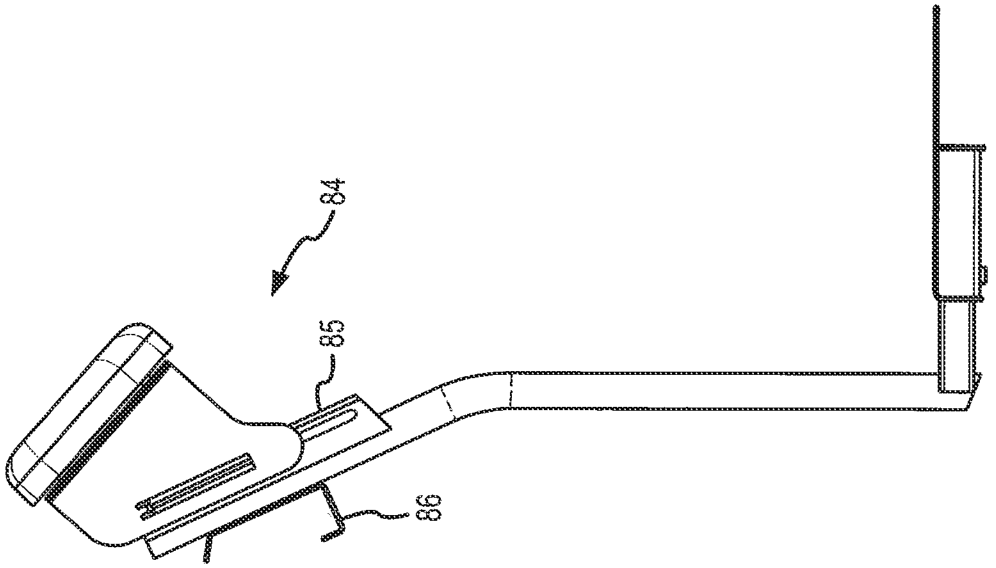
FIGS. 17A-B is are views of a seat of one embodiment of the present invention.
Figure 17A:
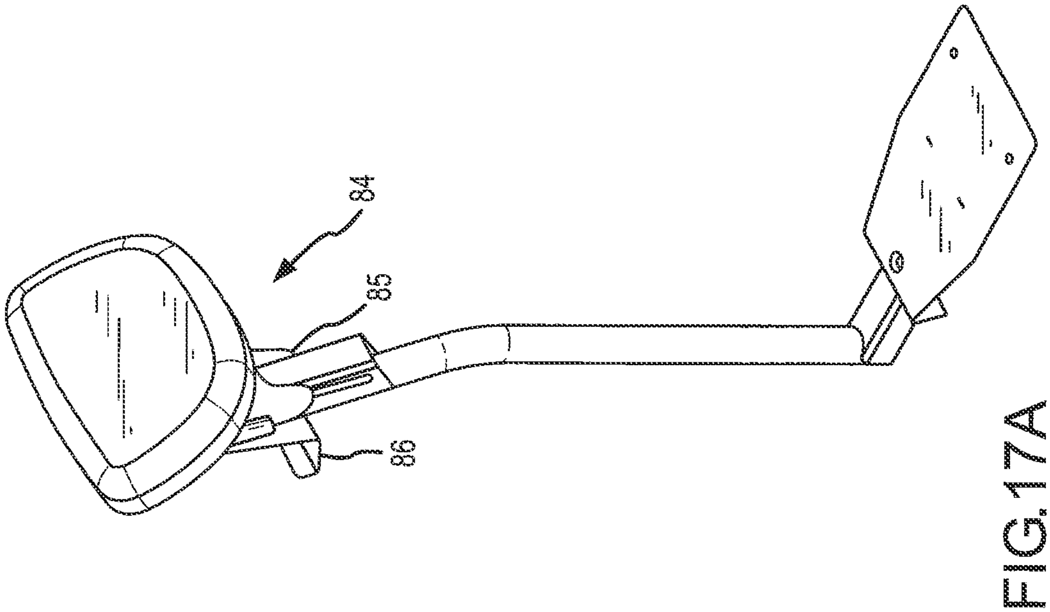
Figure 18A:
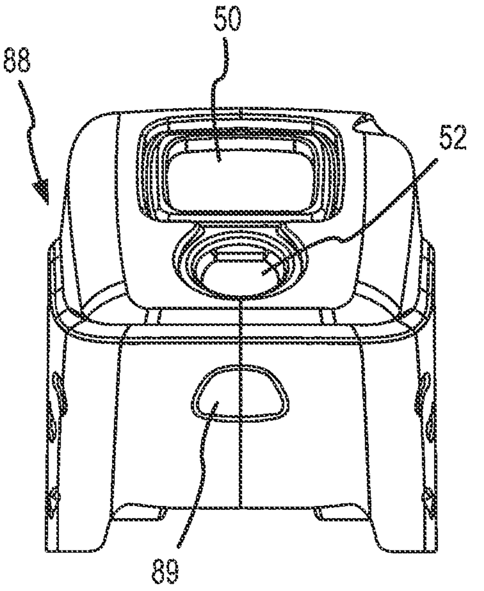
FIGS. 18A-D are views of a tank and front housing of one embodiment of the present invention.
Figure 18B:
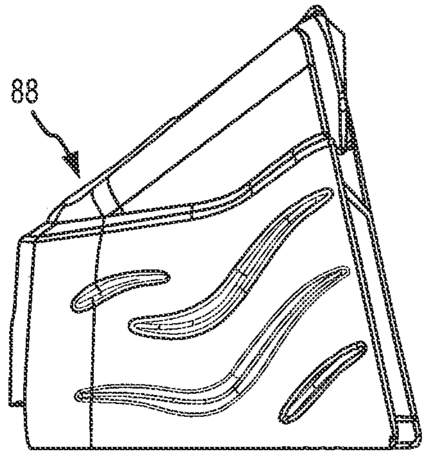
Figure 18C:
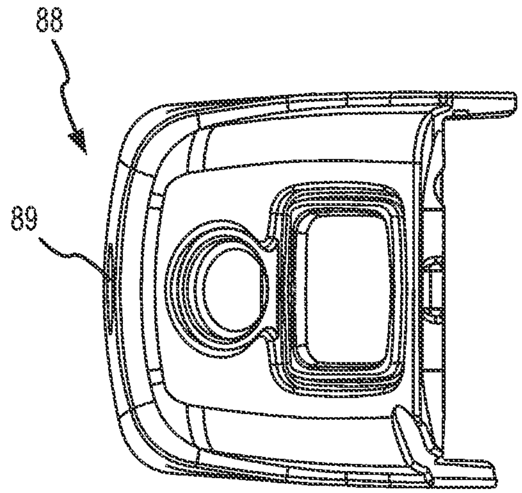
Figure 18D:
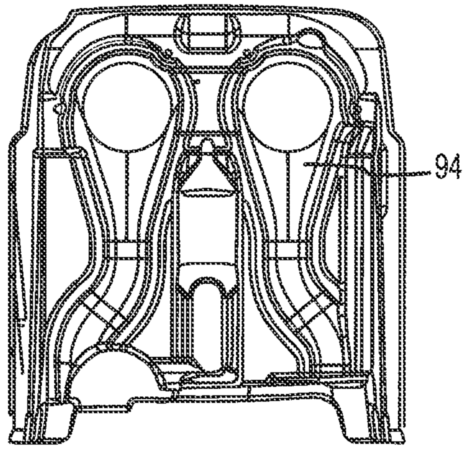

Referring now to FIG. 17A-B, a seat 84 of one embodiment of the present invention is shown. More specifically, embodiments of the present invention include a selectively connectable seating device 84 for engagement with the chassis to increase the operator comfort. Seats 84 of some embodiments of the present invention are selectively adjustable 85, thus making them easy to accommodate any sized individual. In operation, a receiver hitch, or similar connection mechanism, is connected to the rear portion of the platform 4 and a mating device for interconnection to the receiver hitch, or other device, is provided on the seat 84. The seat 84 may also include a plurality of hooks, shelves, cup holders, etc. for the securement of cords, bags, or any other type of cleaning or comfort related item. Further, the receiver hitch may be used when the seat 84 is engaged or not engaged, for example, to transport other items such as a supplemental wheeled device that may accommodate extra power sources, cleaning supplies, tanks, etc.

Referring now to FIG. 18A-D, a tank 50 of one embodiment of the present invention is shown. Some embodiments of the present invention include a tank 50 that is equipped with a plurality of lights 89 and/or horns that facilitate cleaning and/or act as additional safety features. Alternatively, lights may be integrated into bumpers positioned adjacent to the tank 50 or on the sides of the apparatus.

Although not shown, a filter may be provided in fluid communication with the fluid pump. This filter is designed to capture any debris that may adversely affect the operation of the pump. Unfortunately, on many cleaning machines, the filter is placed in a hard to access location, such that repair or monitoring thereof is very difficult. Thus, one embodiment of the present invention includes a filter that is situated on the outer surface of the housing, perhaps on the control panel. Thus, the operator has ample opportunity to monitor the integrity of the filter and make quick repairs when necessary.

Figure 19B:
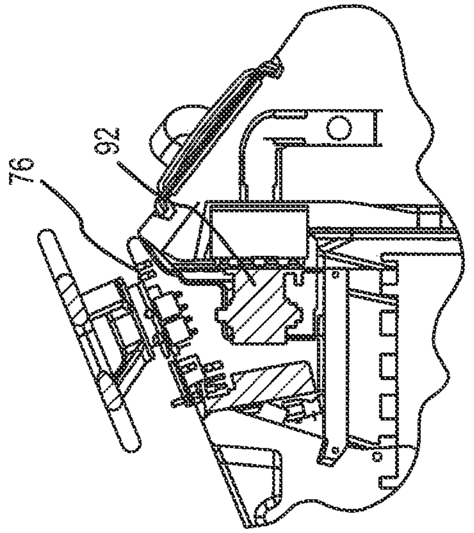
FIGS. 19A-B are views of a vacuum fan interconnected to the front housing of one embodiment of the present invention.
Figure 19A:
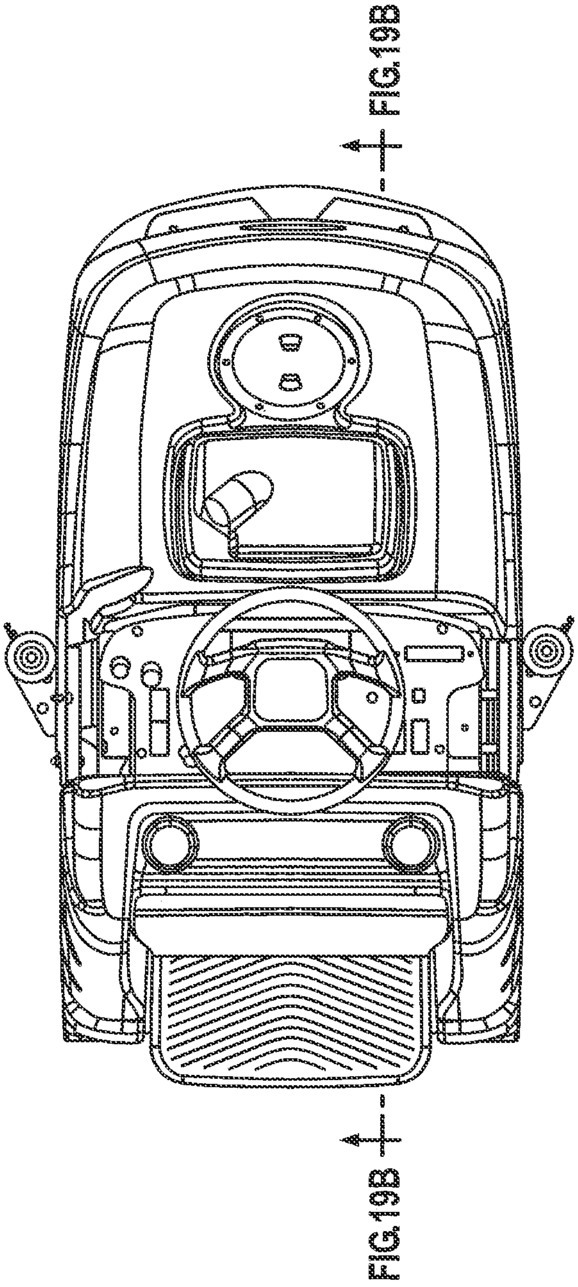

Referring now to FIG. 19A-B, a vacuum fan 92 which is connected to the front housing 88 of one embodiment of the present invention is shown. More specifically, a vacuum fan 92 provides suction to remove debris filled fluids from the floor. The fan 92 is preferably situated under the control panel 76 of the vehicle, such that the intake cooling air that is drawn in by the vacuum fan 92 is channeled adjacent to the control panel 76 to cool componentry associated therewith.

In addition, the tank 50 may be made out of a formable material such that exhaust channels 94 may be machined or molded into the tank 50. The channels 94 direct the exhaust air from the vacuum 92 to an exit muffler of the apparatus. The channels 94 also act as a baffle to remove noise energy from the exhaust gases, thus making the entire system quieter.

Figure 20:
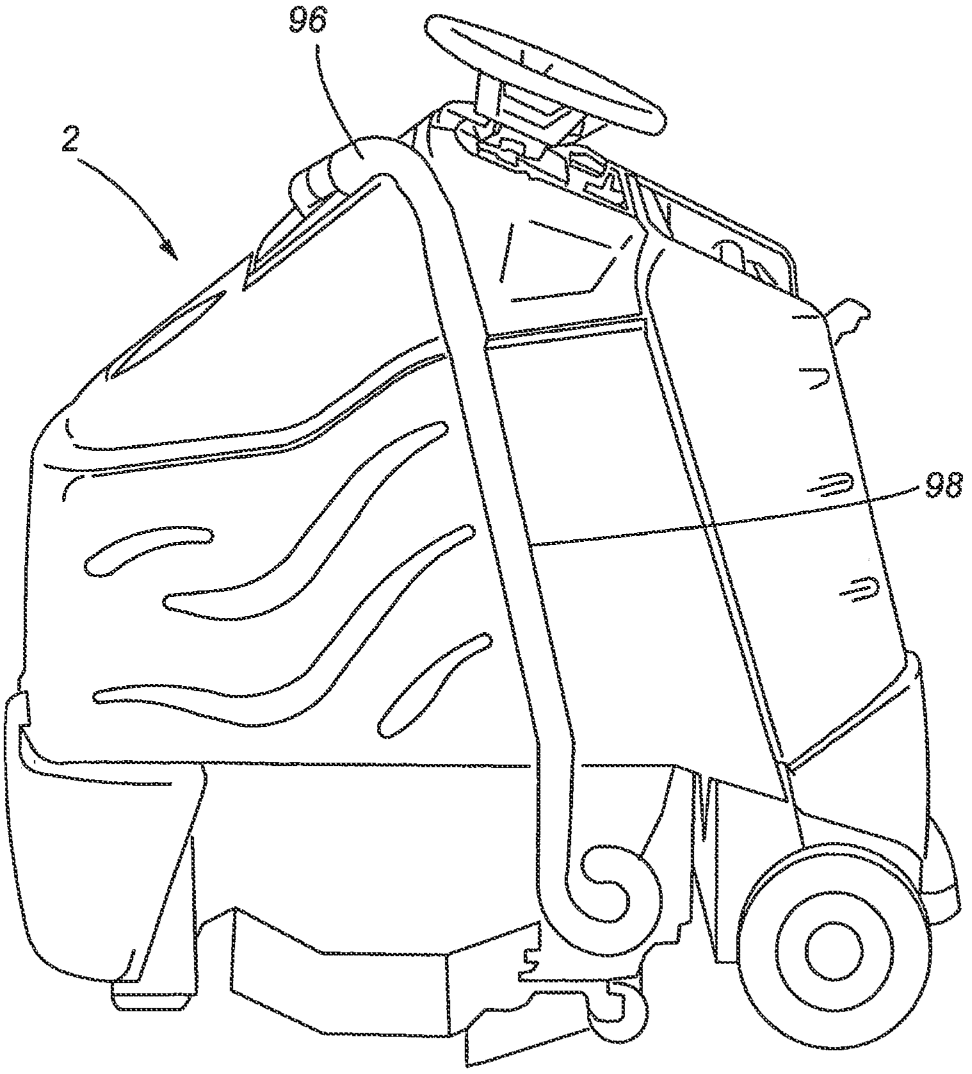
FIG. 20 is a right elevation view of one embodiment of the present invention showing the waste water return hose.

Referring now to FIG. 20, a waste fluid return hose 96 is shown. More specifically, one embodiment of the present invention decreases its profile by inserting the waste water hose 96 into a hose channel 98 that is integrated into the outside surface of the apparatus 2. The hose 96 being situated on the outside also has the added advantage of making it very accessible, such that it can be removed and inspected for clogs or breaches.

Further, some embodiments of the present invention are provided with tip over stops adjacent to the front corners of the apparatus. The stops may be replaceable and ensure that the apparatus does not tip over during tight turns. The tip over stops are generally constructed out of a material that is harmless to flooring, such as Teflon, silicone, rubber, plastic, etc. In addition, one skilled in the art will appreciate that rollers may be employed that are situated a predetermined distance from the floor to perform the same function.

Referring now to FIGS. 1-20, a manner of making the present invention is shown and described herein. As has been explained, the present invention is generally similar to the floor treatment devices used in the art. However, unlike many prior art devices, the present invention provides a location for which the operator can stand or sit, thus enabling him or her to more efficiently perform their tasks. In addition, instead of using brute strength to perform the task of steering the cleaning device, a steering mechanism and associated hardware are provided to aid in the smooth transition from one direction to another. Also, the present invention device has a compact profile and mechanism which allows for 360E cleaning of tight spaces. Further, to construct the remote control version of the system, software that is known in the art may be installed in the chassis 8 to allow for the system to be either remotely controlled or learn the cleaning surface as it operates. In addition, a series of cameras may be interconnected to the chassis 8 to provide remote viewing to an operator offsite.

Figure 21:
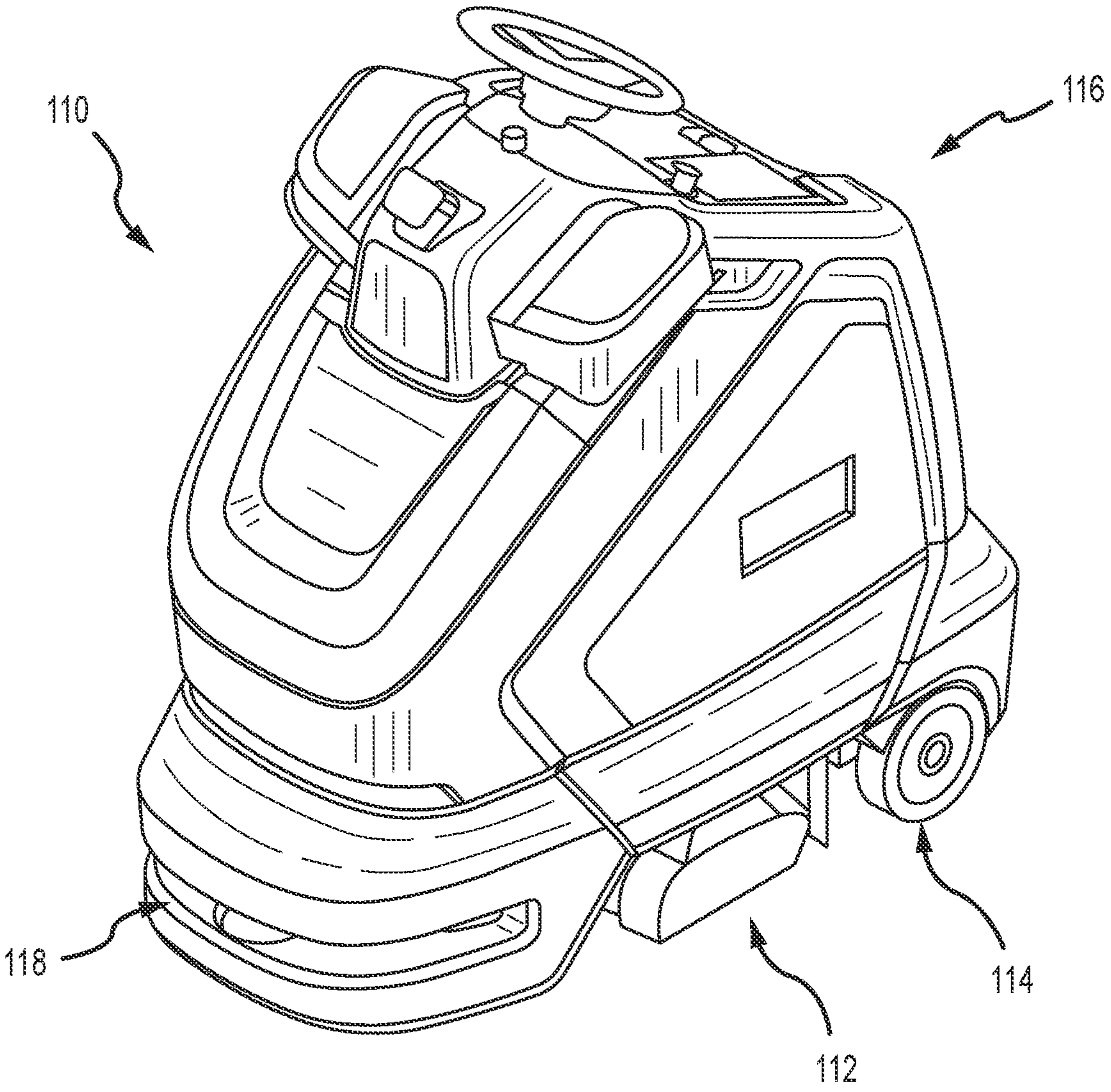
FIG. 21 is a perspective view of a floor cleaning device according to one embodiment of the present disclosure.

FIG. 21 is a perspective view of a floor cleaning device 110 according to another embodiment of the present disclosure. As shown, the device 110 comprises a ride-on or stand-on device that is operable to clean floors and ground surfaces. The device 110 comprises a cleaning deck 112. In various embodiments, the device 110 and cleaning deck 112 comprise vacuum features, while other embodiments comprise a cleaning deck 112 with scrubbing features that do not necessarily comprise vacuum capabilities. Accordingly, no limitation with respect to type of cleaning and floor treatments are provided. A pair of trailing wheels 114 are provided proximal to a rear or user-end 116 of the device. The user-end 116 comprises an area for receiving a user or operator. The device 110 is operable to be driven, steered, operated, etc. by a user, and is further operable to perform cleaning functions in an autonomous or semi-autonomous mode wherein no user is provided in contact with the device. A forward end of the device 110 comprises a window 118 extending along at least a front portion of the chassis, and which preferably extends or wraps around the sides of the device. The window 118 comprises a cut-out or void in the chassis body that enables a Lidar component provided within the device 110 to detect objects and surfaces external to the device.

Figure 22B:
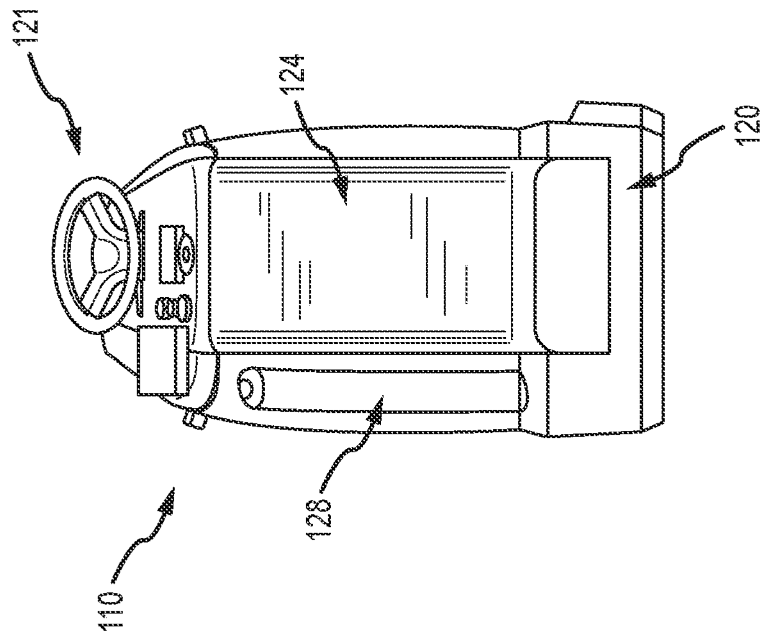
FIG. 22*b* is a rear elevation view of a floor cleaning device according to one embodiment of the present disclosure.
Figure 22A:
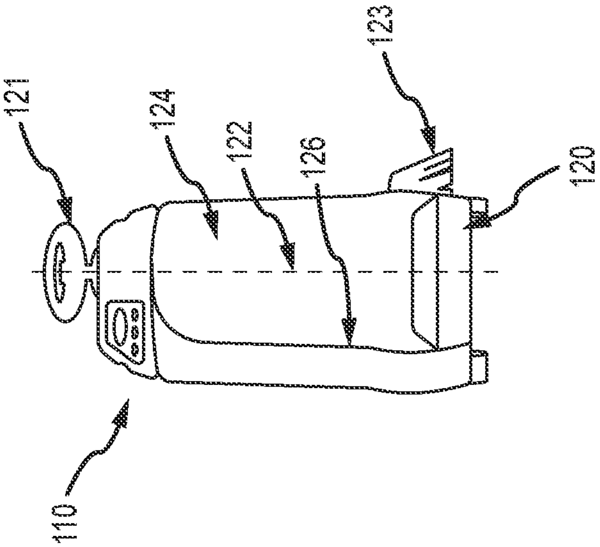
FIG. 22*a* is a rear elevation view of a floor cleaning device according to one embodiment of the present disclosure.

FIG. 22*a* is a rear elevation view of a cleaning device 110 showing the user-end of the device and a platform 120 for receiving a user. As shown, the platform 120 and a steering wheel 121 are provided off-center on the device 110. Specifically, a centerline 122 of the platform is positioned closer to a starboard side of the device (right side in FIG. 22*a*). A cleaning brush 123 is provided on one side of the device such that a cleaning path or cleaning area is off-center relative to the device. The depicted embodiment provides that a user platform 120 is shifted off-center such that a user's gaze is directed over or at least proximal to a portion of the device that comprises the cleaning brush 123. A lip 126 is provided on at least one side of the user area 124 to contain a user and generally provide safety and comfort.

FIG. 22*b* is a rear perspective of a cleaning device 110 according to an embodiment of the present disclosure and wherein the platform 120 is shifted as shown and described in FIG. 22*a*. In addition to providing ergonomic advantages and directing a user's vision and sight lines to the appropriate region of the device, the positioning of the platform 22*b* provides for a more efficient use of space on the device 110. Specifically, and as shown in FIG. 22*b*, a storage compartment 128 is provided adjacent to the off-center platform 120. The storage compartment 128 is operable to receive various components including, for example, vacuum wands, cleaning tools, and/or internal components such as electrical connections, pump, fluid conduits, etc. Additionally, the provision of the off-center platform and the storage compartment 128 provides for an overall smaller cleaning machine without reducing the effective cleaning area. Greater compaction and packing efficiency is created by the arrangement shown in FIG. 22*b* (for example) such that the device comprises a smaller envelope or volume than existing devices and is therefore easier to maneuver, store, etc.

Figure 22C:
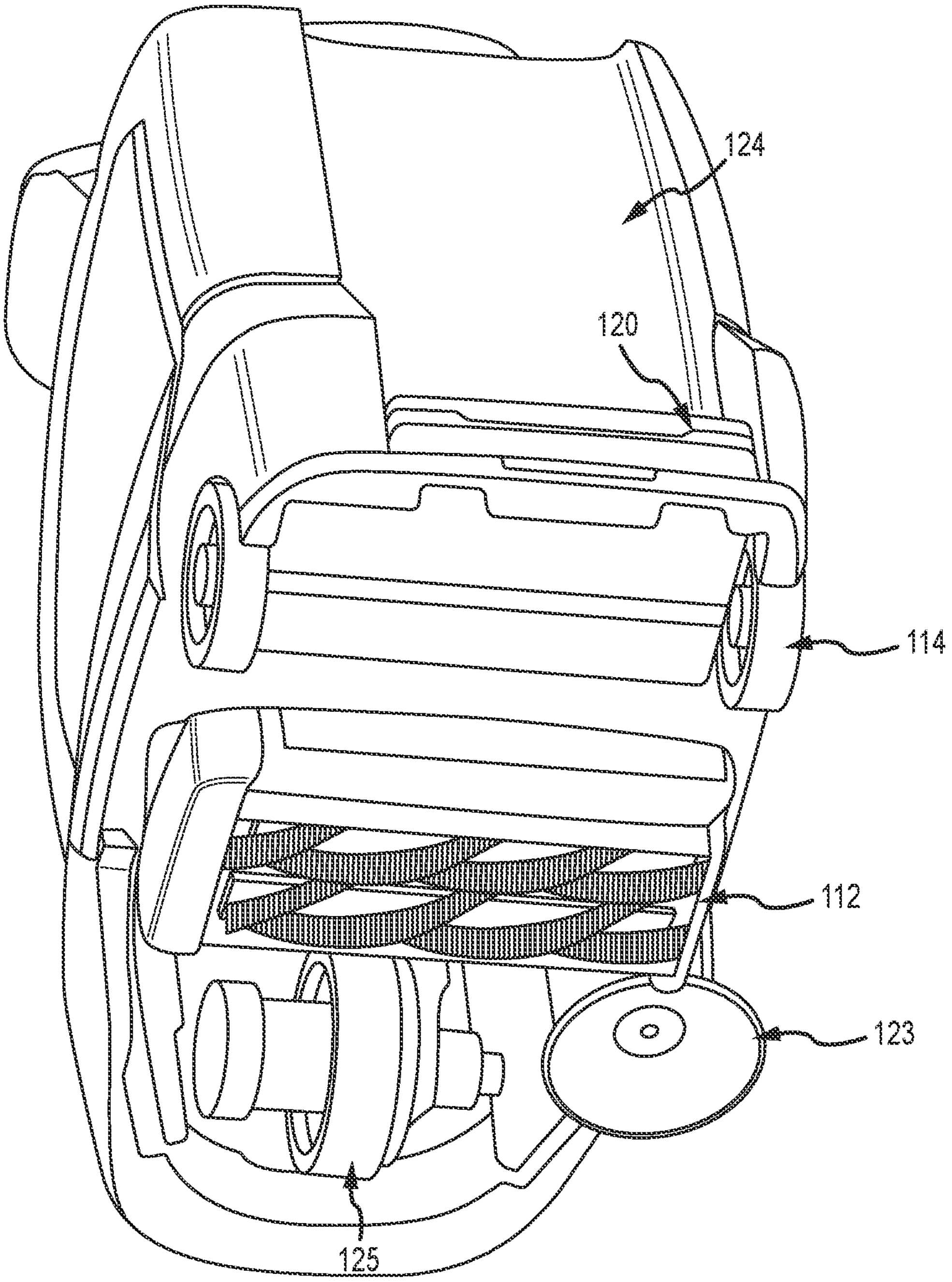
FIG. 22*c* is a bottom perspective view of a floor cleaning device according to one embodiment of the present disclosure.

FIG. 22*c* is a bottom perspective view of a floor cleaning device according to one embodiment of the present disclosure. As shown, the device comprises a cleaning deck 112, support wheels 114, a platform 120, a cleaning brush 123, a user area 124, and a drive wheel 125. The drive wheel 125 comprises a powered and steerable monowheel that is operable to be provided in contact with a floor surface and provide locomotive functions to the device. In the embodiment shown in FIG. 22*c*, the drive wheel 125 is centered in a lateral direction of the device. In alternative embodiments, it is contemplated that the drive wheel 125 is provided off-center as is described herein.

Figures 23A, 23B:
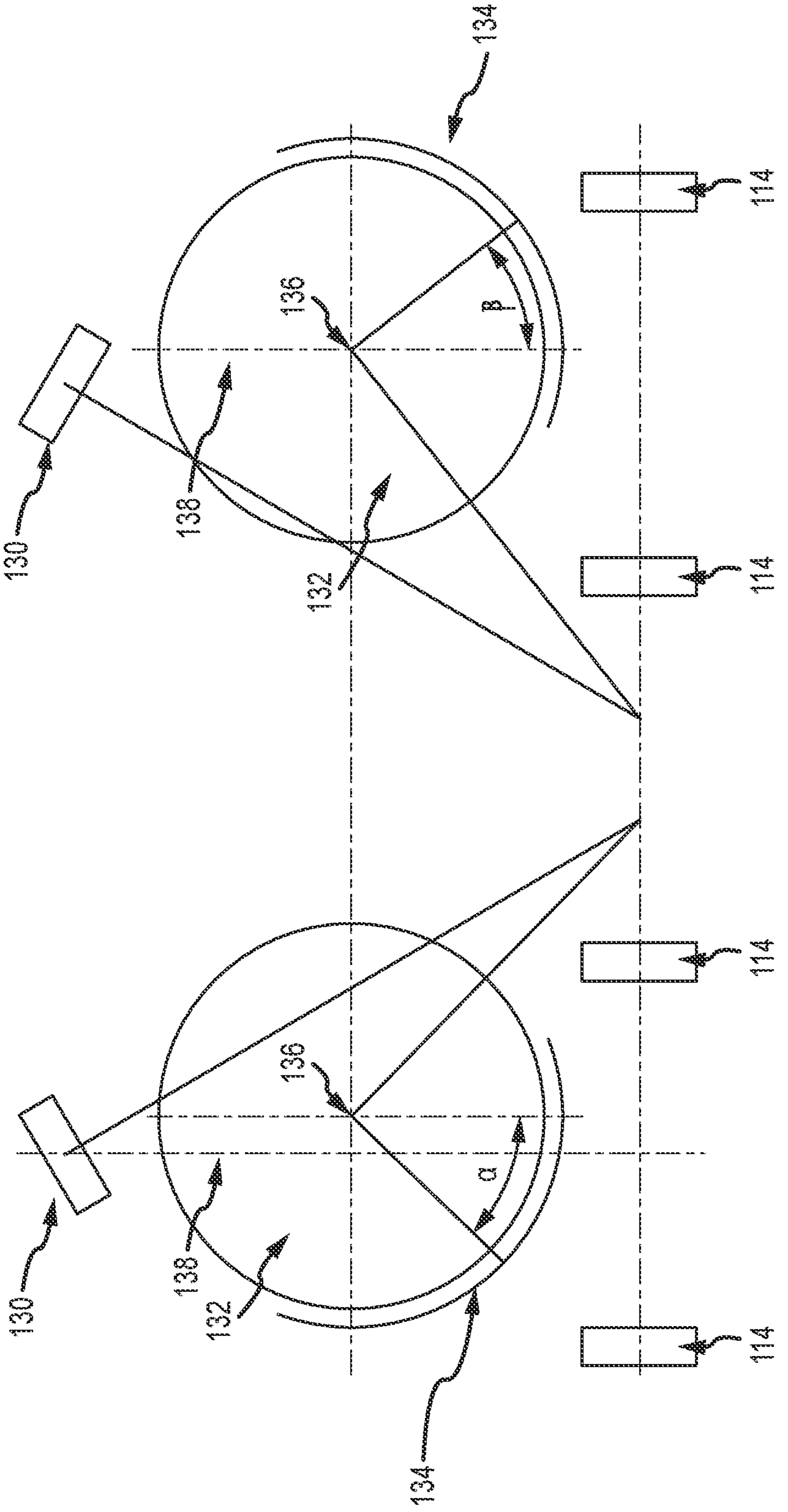
FIG. 23*a* is an illustration of certain components of a cleaning device during a turning operation and according to one embodiment of the present disclosure.
FIG. 23*b* is an illustration of certain components of a cleaning device during a turning operation and according to one embodiment of the present disclosure.

FIG. 23*a* illustrates the layout of certain components of a known cleaning device, and their impact on the device's operation. As shown, a drive wheel 130 of the device is provided at an angle that causes a right turn of the device. The angle in FIG. 23*a* is approximately 60 degrees. A pair of trailing wheels 114 are provided proximal to a rearward portion of the device, and wherein the trailing wheels 114 are non-steerable wheels. The primary function of the trailing wheels 114 is to support the weight of the device and an associated user. A cleaning pad 132 is provided. The cleaning pad is provided on a lower portion of a cleaning apparatus proximal to a floor or ground surface to be cleaned. For illustrative purposes, the cleaning pad 132 is shown as a circular pad, but may comprise various different cleaning devices. A trailing and pivotable squeegee 134 is provided. The squeegee 134 is contemplated as comprising a rubber squeegee blade, and in some embodiments comprises additional features such as vacuum features, pick-up orifices, cleaning pads, etc. The squeegee is rotatable about a vertical axis extending through the mid-point 136 of the cleaning pad 132.

As shown in FIG. 23*a*, the squeegee 134 rotates outwardly while the device is turning. In FIG. 23*a*, a right turn of the device effects a left-ward movement of the squeegee 134 such that the squeegee is appropriately positioned to handle liquids and other materials left behind during a cleaning operation. The squeegee 134 comprises a mass that "swings" or pivots relative to a reminder of the device during turning. FIG. 23*b* illustrates a left turn of the device, and a corresponding right-ward movement of the squeegee 134. In FIGS. 23*a* and 23*b*, the drive wheel is rotated by about 60 degrees about a vertical axis. The center 136 of the cleaning pad 132 and squeegee 134 is offset from a centerline of the device 138. In the depicted embodiment, the center 136 of the cleaning pad 132 is offset from the center of the device by about 2 inches. This offset is provided to focus cleaning functions of the device toward one lateral side of the device and allow a user to reliably and accurately clean along a wall or other physical limit, for example.

Based in part on the lateral offset of the cleaning pad 132 toward the right of the machine (at least with respect to FIGS. 23*a*-23*b*), the squeegee is caused to deflect or rotate by different amounts during left and right turns. Specifically, and as shown in FIGS. 23*a*-23*b*, a 60 degree rotation of the drive wheel 130 during a right turn requires an angular deflection α of the squeegee of approximately 44.2 degrees to provide the center of the squeegee in line with the travel path of the pad 132. An opposite rotation of the wheel by the same amount to cause a left turn requires an angular deflection β of the squeegee 134 of approximately 37.8 degrees to maintain alignment. Accordingly, the squeegee response time and overall effectiveness is reduced during right turns as compared with left turns. To account for this, embodiments of the present disclosure provide that a drive wheel 130 is provided that is offset from the centerline of the device. Specifically, in some embodiments, the drive wheel 130 is provided in-line with a center of the cleaning pad 132 (or similar device) and wherein the cleaning pad 132 and the drive wheel are both offset from the centerline of the device by substantially the same amount. In such embodiments, a squeegee associated with the cleaning deck or cleaning pad 132 rotates an equal amount during turning operations.

Figure 24:
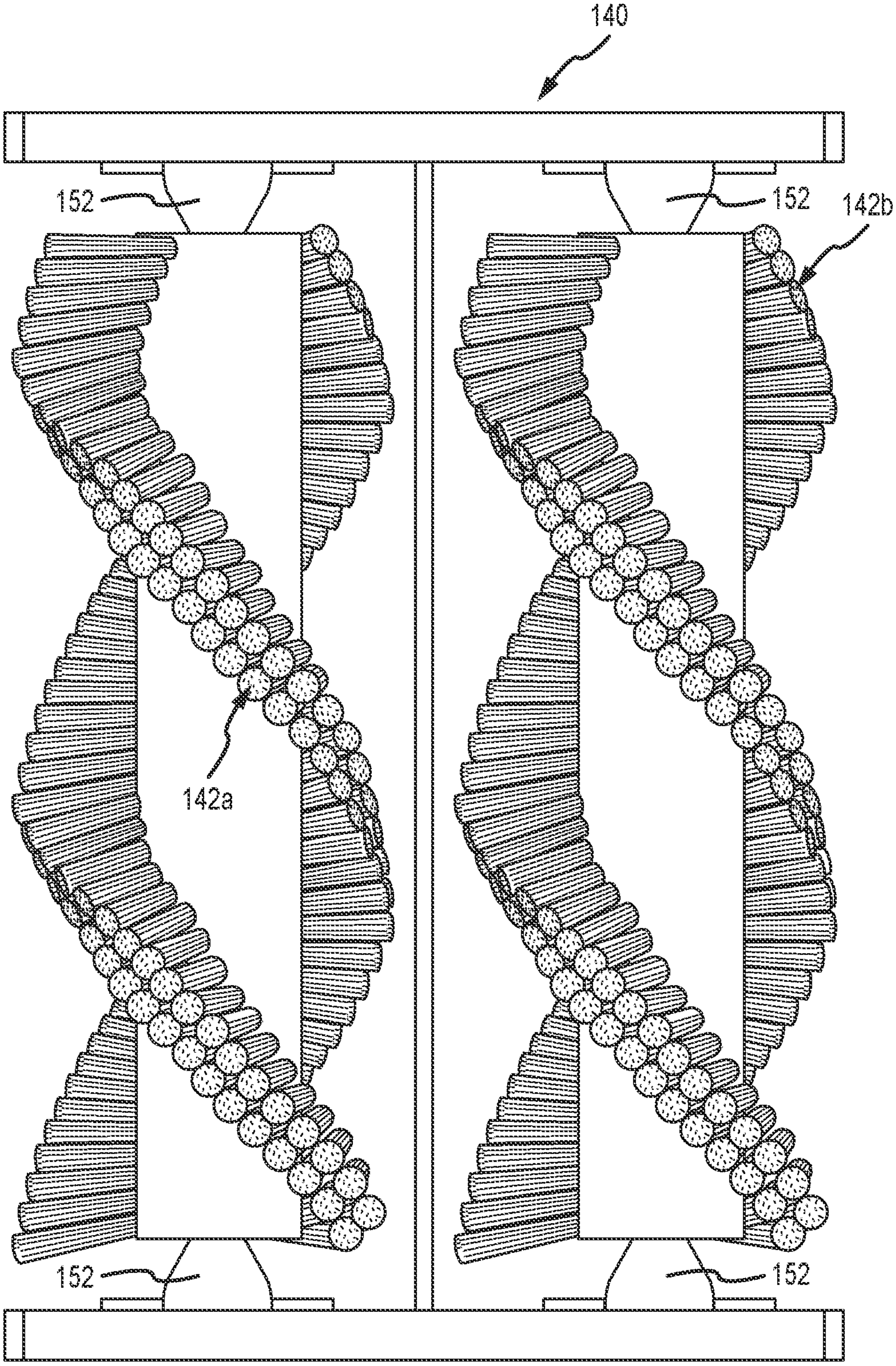
FIG. 24 is a perspective view of a rotatable cleaning device according to one embodiment of the present disclosure.
Figure 25:
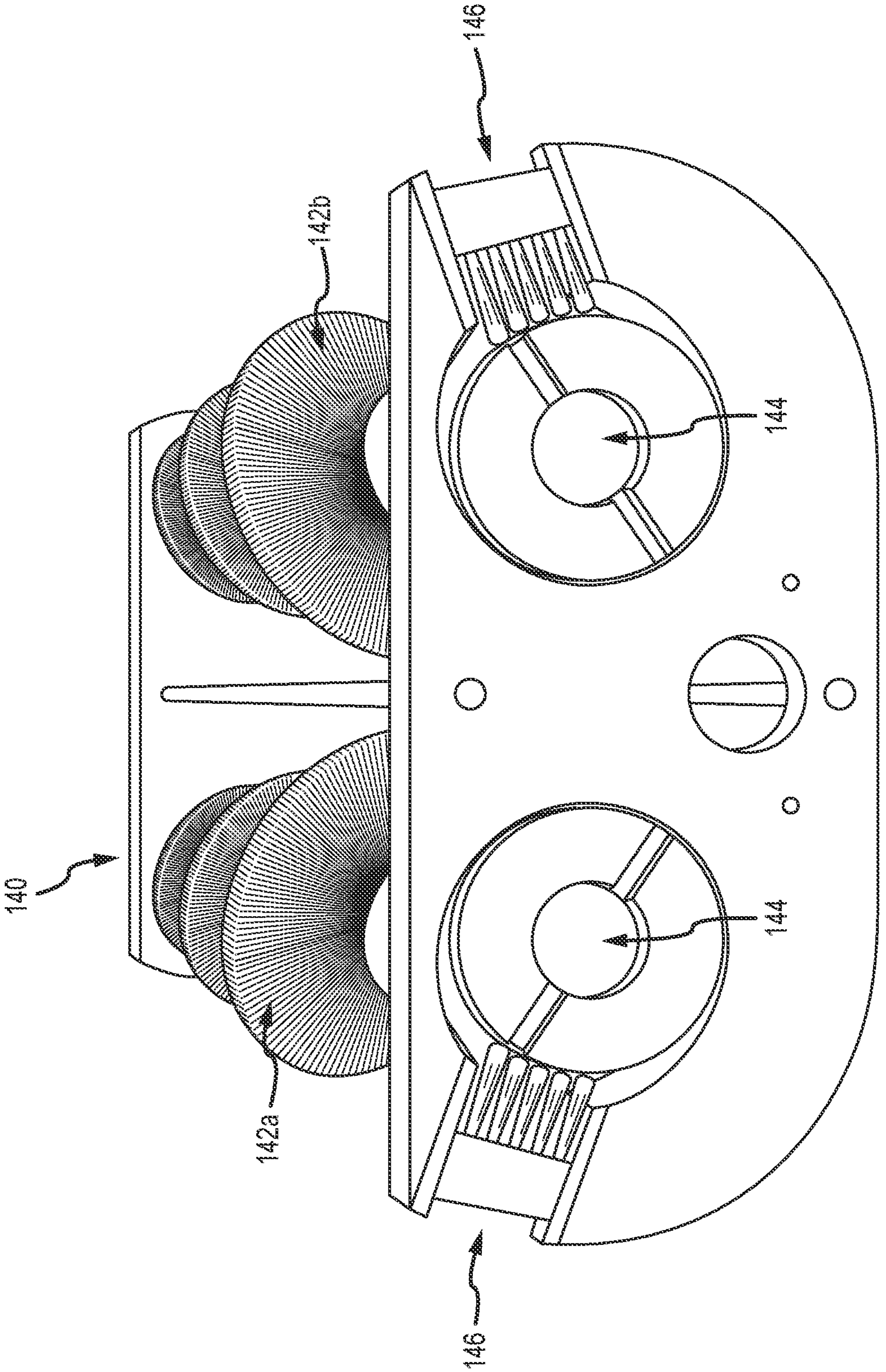
FIG. 25 is a perspective view of a rotatable cleaning device according to one embodiment of the present disclosure.

FIGS. 24-25 depict a brush assembly 140 according to one embodiment of the present disclosure. As show, the brush assembly 140 comprises first and second rollers 142*a*, 142*b* with bristles provided thereon. The rollers 142*a*, 142*b* are operable to agitate and dislodge debris and dirt from a floor surface (e.g. a carpet). The bristles are provided around a cylinder in a helical arrangement. Although various embodiments provided herein show and describe bristles that are provided in a helical arrangement, the present disclosure is not limited to such embodiments. It is contemplated, for example, that various linear bristle arrangements are provided. Stationary brushes and bearing protection mechanism of the present disclosure are not limited to use with any particular type of brush or bristle arrangement. The brush assembly 140 comprises a removable cartridge that is operable to and intended to be provided proximal to a vacuum port or pick-up orifice. Each of the rollers 142*a*, 142*b* comprise female receiving portions 144 (FIG. 25) for receiving rotary couplings provided on a cleaning machine and wherein the brush assembly 140 is selectively removable from the cleaning machine for cleaning, repair, replacement, etc. As shown in FIG. 25, the brush assembly 140 comprises bearing protector features in the form of brushes 146.

Figure 26:
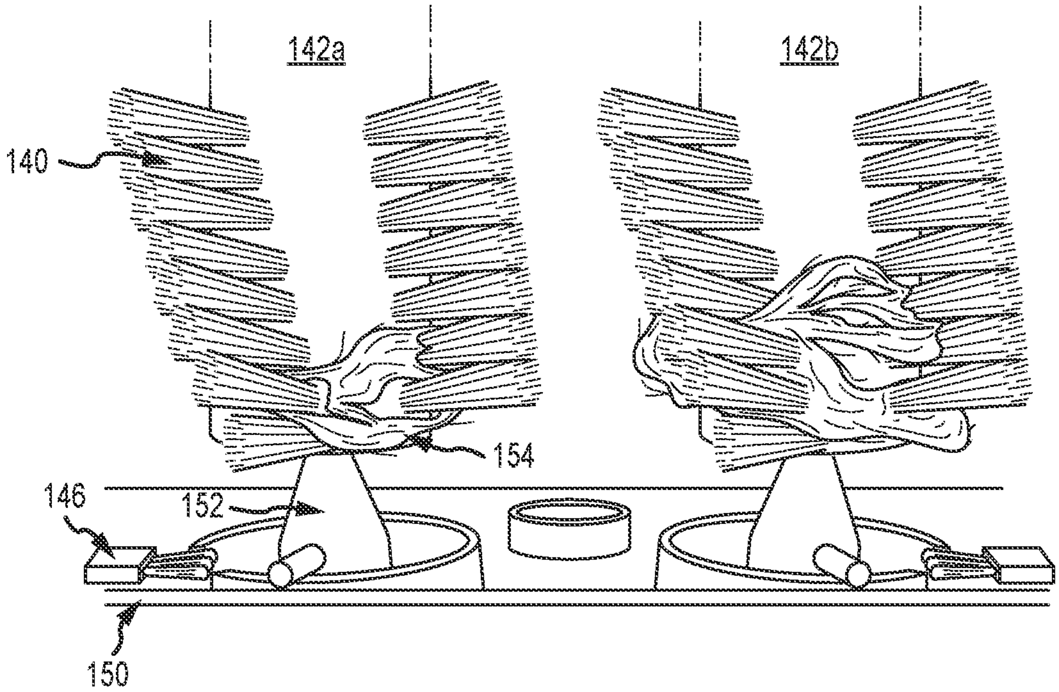
FIG. 26 is a bottom perspective view of components of a cleaning device after a certain amount of usage and according to one embodiment of the present disclosure.

FIG. 26 illustrates a brush assembly 140 and associated cleaning deck 150 after a certain amount of use in cleaning operations. As shown, the brush assembly 140 is connected to drive members 152 of the cleaning deck 150, wherein the drive members 152 provide a rotational support that is capable of rotating the brush during use. As shown in FIG. 26, debris 154 in the form of fibers and strands (e.g. hair strands) that are not drawn into a vacuum chamber are collected on the vacuum brush rollers. This debris 154 tends to migrate toward outer edges of the vacuum rollers and further enter bearing elements provided with the drive members 152. The infiltration of debris 154 into bearing elements can significantly degrade the functionality and lifespan of the bearings, and result in costly repair or replacement. Embodiments of the present disclosure comprise at least one stationary brush 146 provided proximal to a bearing element. The brush 146 is operable to contact and deflect debris 154 inwardly (i.e. inboard) and prevent or minimize debris 154 from migrating toward or into the bearings of the device. In some embodiments, the brush 146 comprises a selectively removeable brush that can be detached and replaced or cleaned.

Figure 27:
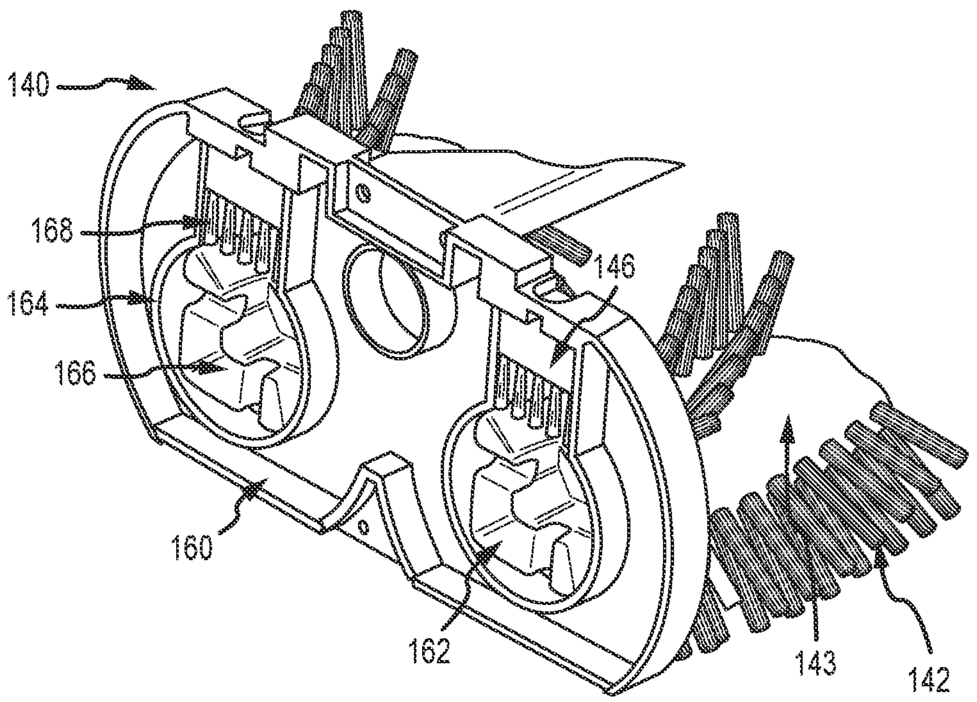
FIG. 27 is a perspective view of a rotatable cleaning device and bearing protector according to one embodiment of the present disclosure.

FIG. 27 is a perspective view of a brush assembly 140 according to one embodiment of the present disclosure. As shown, the brush assembly 140 comprises a helical bristle arrangement provided on a roller 143. A sidewall portion 160 is provided, and the roller 143 is rotatable relative to the sidewall. The roller comprises a female drive member 162 that selectively interconnects to a powered portion of a cleaning device to rotate the roller and bristles 142. As shown in FIG. 27, a stationary brush 146 is provided and is connected to the sidewall 160 of the assembly. The stationary brush 146 comprises bristles that are operable to deflect or otherwise prevent migration of debris from the bristles 142 and roller(s) 143 toward the drive member(s) and bearing(s) of the cleaning device (not shown in FIG. 27). In various embodiments, the bristles of the stationary brush 146 are provided in contact with at least one of the roller 143 and the female drive member 162. In alternative embodiments, the bristles of the stationary brush 146 are spaced apart from moving parts of the device by a small amount (e.g. between approximately 0.010 inches and 0.5 inches).

FIG. 27 shows a brush assembly 140 that is operable to receive first and second rollers 143. A single roller 143 is provided in FIG. 27 for illustrative purposes. However, the device 140 comprises a second receiving area with an aperture 164 provided in the sidewall 160. As shown, the aperture 164 comprises a first receiving portion 166 for receiving a terminal end of a roller 143 and in which the roller is rotatable. The aperture 164 further comprises a second receiving portion 168 for receiving a stationary brush 146. The second receiving portion 168 comprises a substantially rectilinear void for receiving a brush 146. It will be recognized, however, that the second receiving portion 168 can comprise different shapes to accommodate brushes of different shapes and no limitation with respect to the size and shape of the aperture 164, first receiving portion 166, or second receiving portion 168 are provided herein.

Figure 28:
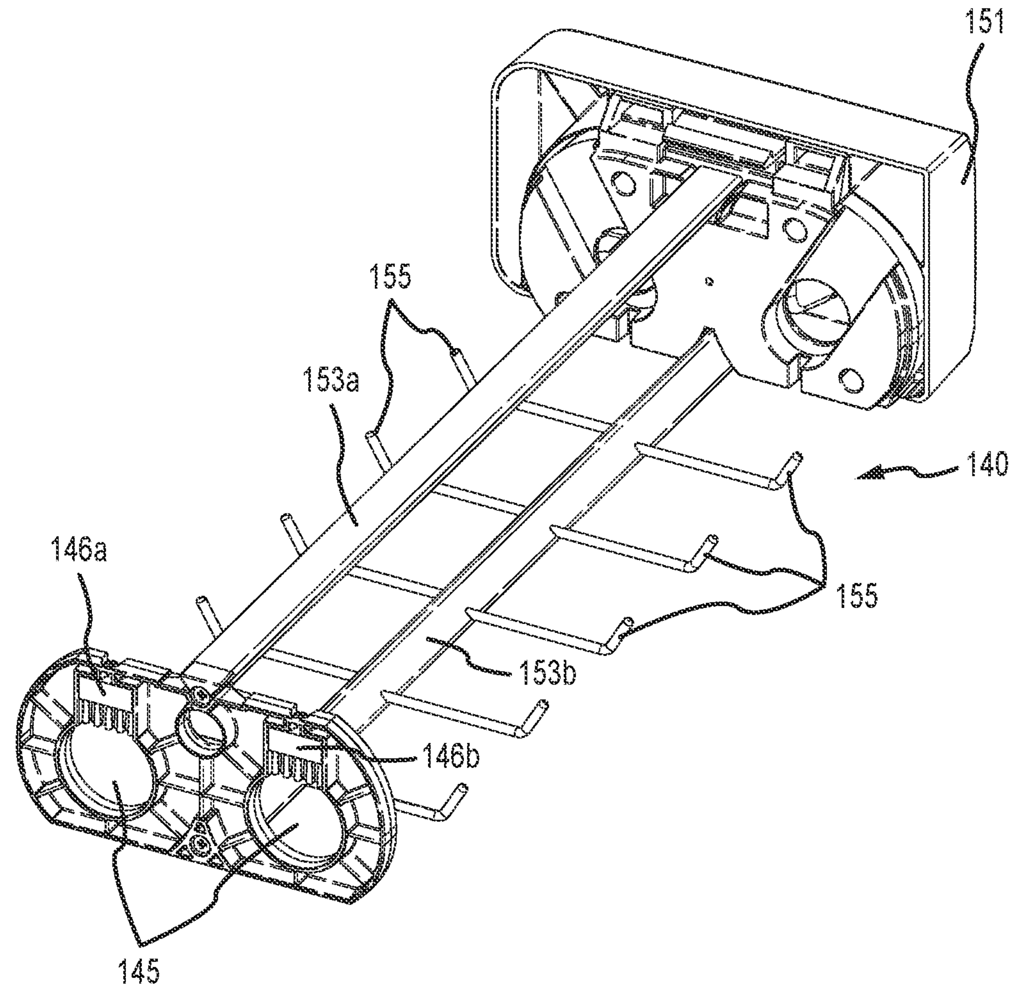
FIG. 28 is a perspective view of a brush assembly according to one embodiment of the present disclosure.

FIG. 28 is a perspective view of a brush assembly 140 according to one embodiment of the present disclosure. As shown, the brush assembly 140 comprises a cartridge member that is operable to receive roller brushes (not shown in FIG. 28) for use in cleaning operations. The assembly 140 is operable to connect to and be provided in communication with a cleaning deck of a cleaning machine including, but not limited to, a ride-on floor cleaning machine with a vacuum. The brush assembly 140 comprises a first end with apertures 145 for receiving first ends of roller brushes, and a second end comprising a housing 151 operable to receive second ends of roller brushes. The housing 151 is contemplated as comprising a drive member such as a gearing, belt(s) and/or a motor for driving and rotating roller brushes attached to the assembly 140. Frame members 153*a*, 153*b* are provided that extend between the first end and the second end.

As shown in FIG. 28, the assembly 140 comprises stationary brushes 146*a*, 146*b* operable to serve as protective cleaning devices. The stationary brushes 146*a*, 146*b* comprises selectively removable brushes with bristles that extend substantially perpendicular to the longitudinal axis of the first and/or second roller brushes. The stationary brushes 146*a*, 146*b* provide a barrier and passive cleaning mechanism to deflect and block dirt and debris that is dislodged by a normal cleaning action of the roller brushes and prevent such dirt and debris from entering bearings and rotatable assemblies (not shown in FIG. 28).

As further shown in FIG. 28, the assembly 140 comprises a plurality of guards 155. The guards 155 preferably comprise thin gauge guard members extending from a frame member 153*b*. The guard members 155 extend substantially perpendicular to the longitudinal axis of the roller brushes and comprise a curved or angled distal end to prevent the distal ends of the guard(s) from entering or becoming caught in a carpet. In the depicted embodiment, the distal ends of the guards 155 comprise angled ends with an angle or bend of about 45 degrees. In some embodiments, the guards comprise aluminum guards. The guards 155 are operable to serve as protective members and prevent or reduce the risk of carpets (particularly unsecured area rugs) from being drawn into the device by the roller brushes. The guards 155 are also operable to prevent larger pieces of debris from being drawn upwardly into the vacuum portions of the device.

While FIG. 28 depicts one embodiment of the present disclosure wherein an assembly 140 is provided and is operable to receive first and second roller brushes, it will be recognized that the present disclosure is not limited to devices having two roller brushes. Indeed, it is contemplated that devices and features of the present disclosure are provided with devices that comprise as few as one brush or with devices that comprise more than two brushes. Various features including but not limited to the stationary brushes 146 and the guards 155 are not limited to or required to be provided with a device having two roller brushes.

Figure 29:
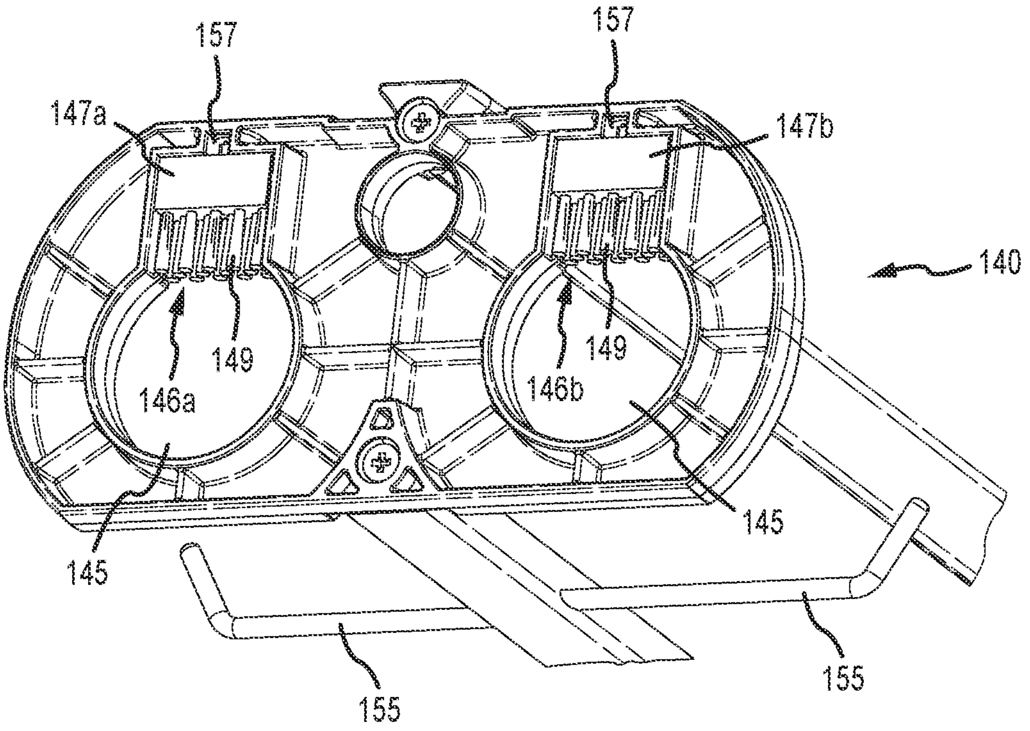
FIG. 29 is a perspective view of a brush assembly according to one embodiment of the present disclosure.

FIG. 29 is a detailed perspective view of the assembly 140 of FIG. 28. As shown, the stationary brushes 146*a*, 146*b* each comprise a base member 147*a*, 147*b* which preferably comprises a rigid plastic base member from which bristles 149 extend and from which the bristles are secured. Guard members 155 are shown for reference. As provided in FIG. 29, the stationary brushes 146*a*, 146*b* are provided adjacent to the apertures 145 in the assembly 140. The apertures are operable to receive distal ends of roller brushes which preferably connect to a rotatable bearing assembly. The stationary brushes 146*a*, 146*b* are provided as passive cleaning elements to deflect debris and protect bearing surfaces of a device by preventing or reducing the risk of debris from entering the bearing assembly. Additionally, the stationary brushes 146*a*, 146*b* comprise replaceable members that are selectively secured to the assembly 140. It is contemplated that the stationary brushes 146*a*, 146*b* are secured to the assembly by at least one fastener 157 that extends into the base 147 of the brush and through a portion of the assembly 140. Alternatively, the brushes may be secured by other means including, for example, a snap-fit, magnets, or elastic clips.

Figure 30:
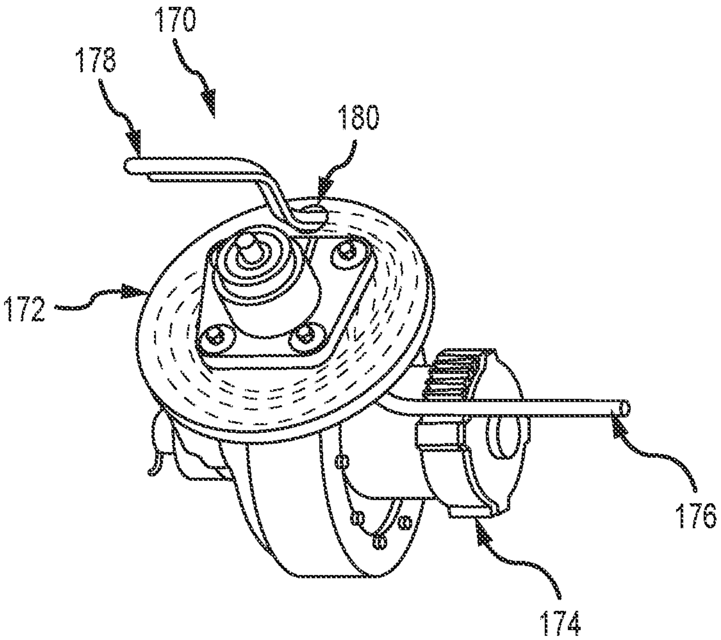
FIG. 30 is a perspective view of a cable management system according to one embodiment of the present disclosure.
Figure 31:
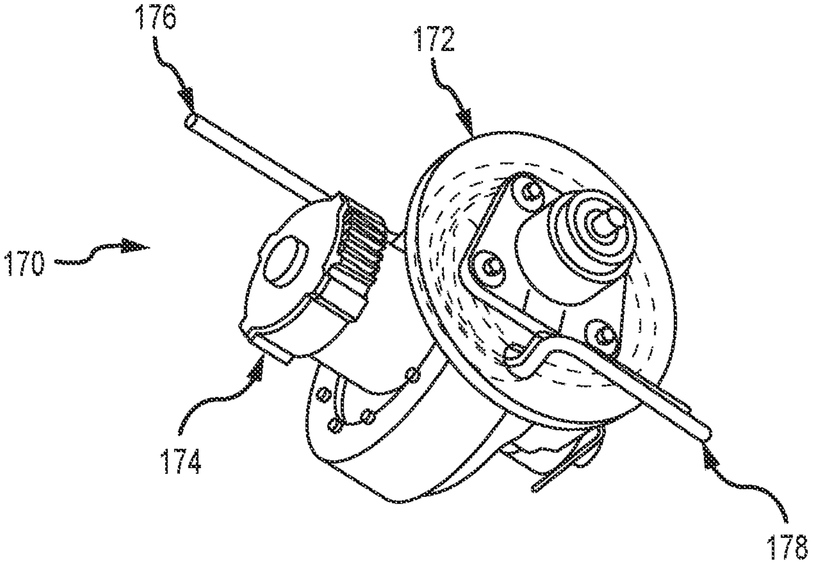
FIG. 31 is a perspective view of a cable management system according to one embodiment of the present disclosure.

FIGS. 30-31 are perspective views of a cable management device 170 according to one embodiment of the present disclosure. As shown, the device 170 comprises a disc-shaped cable housing member 172, which is securable to a cleaning device. In preferred embodiments, the cable housing member 172 is bolted or otherwise secured to a lower portion of a cleaning machine. An electric motor 174 is provided that is rotatable relative to the cable housing member 172. The electric motor 174 is preferably rotatable about an axis when the device 170 is installed and secured to a machine. As shown in FIGS. 30-31, a first cable 176 is operable to extend from the cable housing member 172 and provide power to the motor 174. A second cable 178 is provided that extends to one or more features or components provided on a device or machine upon which the device 170 is installed. As shown in FIG. 30, at least one of the upper and lower portions of the housing member 172 comprises an aperture 180 for receiving a wire or cable.

The motor 174 is rotatable relative to the housing member 172. As the motor 174 rotates, the first cable 176 is allowed to extend and retract from and to the housing member 172. The first cable 176 comprises some rigidity due its construction (e.g. copper wire and related housing) that resists a compressive force and allows the cable 176 to wrap or otherwise be stowed in a coil arrangement within the housing member 172. Accordingly, the motor 174 is allowed to pivot freely and as needed during turning and standard operation of an associated device, and associated wiring is stored and protected from various moving elements of the device.

The device 170 is operable to secure cables, protect the cables, and prevent loose cables from entering a field of view of Lidar sensors in embodiments that comprise such features. Although FIGS. 30-31 show and describe a device that receives electrical cables, it will be expressly recognized that the device 170 and features thereof are not limited to use with electrical cables or wiring. For example, the device 170 is contemplated as receiving and being operable to contain fluid hoses, vacuum hoses, exhaust hoses, and various other flexible elongate members.

Figure 32:
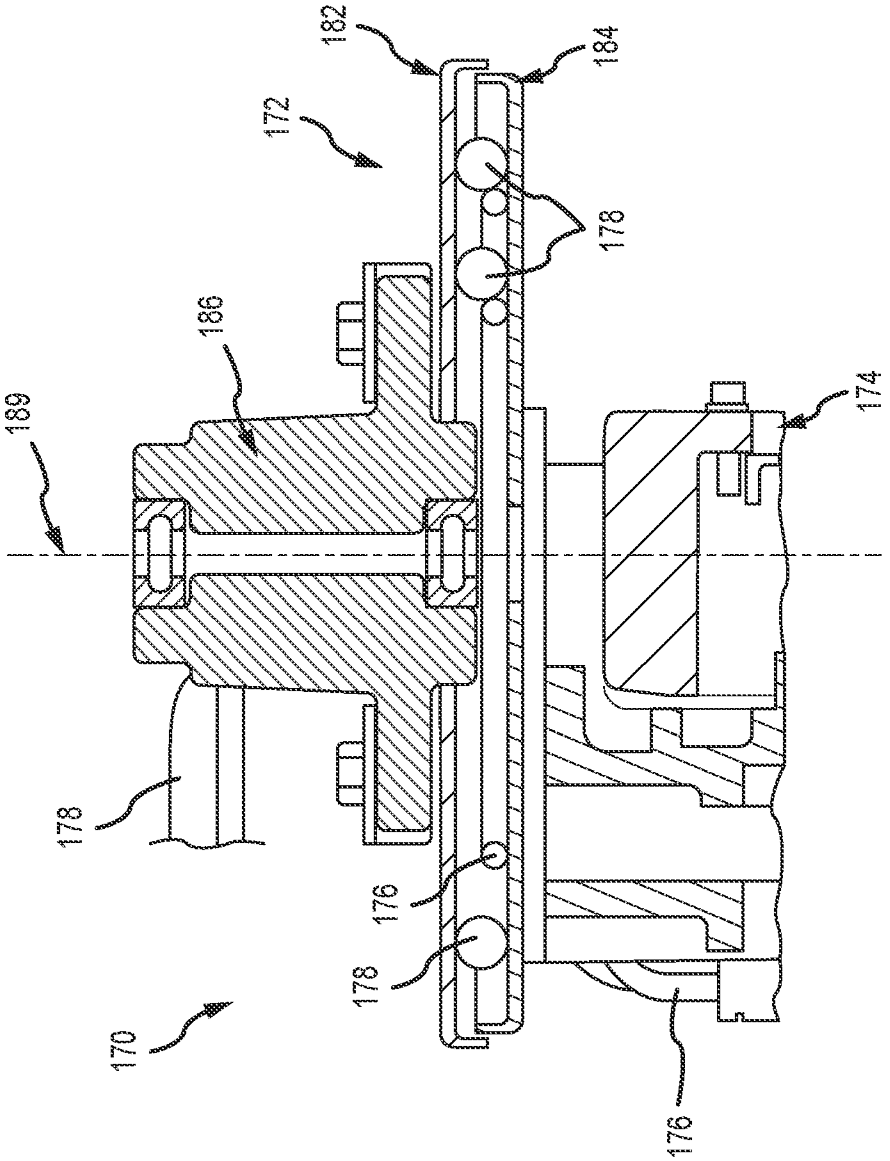
FIG. 32 is a cross-sectional elevation view of a cable management system according to one embodiment of the present disclosure.

FIG. 32 is a cross-sectional elevation view of the device 170. As shown, the device 170 comprises a housing 172, and the housing 172 comprises an upper plate 182 and a lower plate 184. An interior volume is provided within and between the plates 182, 184. The interior volume is operable to receive a length of wiring or cable. The upper plate 182 is secured to a mounting member 186. The upper plate 182 and mounting member 186 are fixed to a frame or chassis of a corresponding device (e.g. a floor cleaner). The lower plate 184 is fixed to and rotatable with the motor 174 about an axis 189.

As noted, the distal ends of wiring that extends through the device 172 are secured. The length of the wiring is therefore wrapped and unwrapped within the plate members 182, 184 as the motor 174 rotates about the axis 189. At least a portion of the length of the wiring is therefore housed and secured such that wiring does not become entangled on other components, does not interfere with various sensors, and is at least partially protected from water and cleaning solutions.

In preferred embodiments, the anchor points or inputs and outputs of the cables 176, 178 are fixed (e.g. secured by one or more cord grips or clamps). The upper and lower plates 182, 184 of the device 170 provide an internal volume for housing cables. In various embodiments, this internal volume comprises a substantially cylindrical or toroidal volume. While it is contemplated that the dimensions of this volume will vary based on the gauge of cable or hose that is intended to be received by the device, various embodiments of the present disclosure contemplate that a relatively tight tolerance is provided between the plates 182, 184 and the cable. In other words, the distance between the plates 182, 184 is only slightly larger than a thickness of a cable to be retained in the volume. In some embodiments, a gap of between approximately 0.40 inches and 0.750 inches, and more preferably of about 0.562 inches is provided for housing at least one cable or wire that is 0.50 inches in diameter. The spacing of the plates 182, 184 and containment of the wires aids in the functioning of the device 170 by constraining wiring and prevent the wires from moving, folding, rolling, and otherwise becoming entangled.

Figure 33:
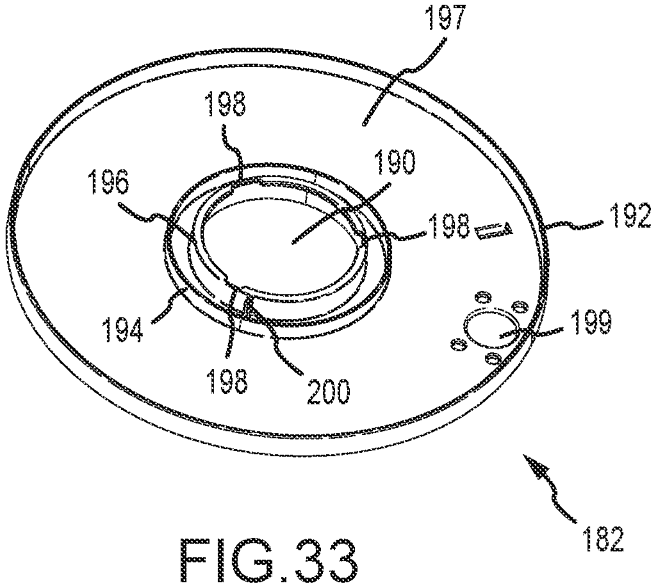
FIG. 33 is a perspective view of a portion of a cable management system according to one embodiment of the present disclosure.
Figure 34:
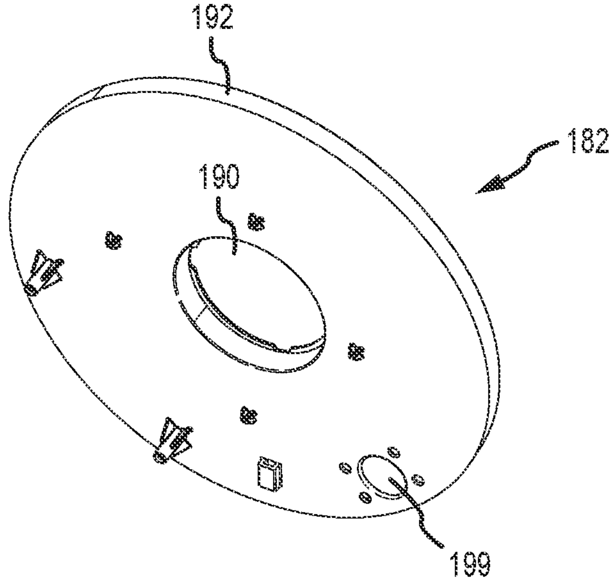
FIG. 34 is a perspective view of a portion of a cable management system according to one embodiment of the present disclosure.

FIG. 33 is a bottom perspective view of an upper plate 182 of a cable management device 172 according to one embodiment. FIG. 34 is a top perspective view of the device 172 according to the embodiment of FIG. 33. As shown, the device comprises an annular member with a central aperture 190 for receiving a motor (for example) and related mounting hardware. The device 172 comprises a lip 192 around its perimeter to form an at least partially enclosed volume when the device is assembled (see FIG. 32, for example). The internal area 197 of the device (at least when assembled) is operable to house and protect a cord, cable or conduit. A central axis extends through the central aperture 190. The upper plate 182 comprises a circular mounting member 196 and a circular flange 194. The circular mounting member 196 is operable to connect to the lower plate of FIGS. 35-36. A plurality of keyways 198 or notches to receive corresponding portions of the lower plate 184. A plurality of stop members 200 or guide members are also provided to limit a relative rotation of the upper and lower plates and assist in assembly of the same. The upper plate 182 further comprises an aperture 199 for receiving a cord, cable or similar feature. The aperture 199 allows a cable (not shown in FIGS. 33-34) to extend from and retract into the interior volume 197 of the device.

Figure 35:
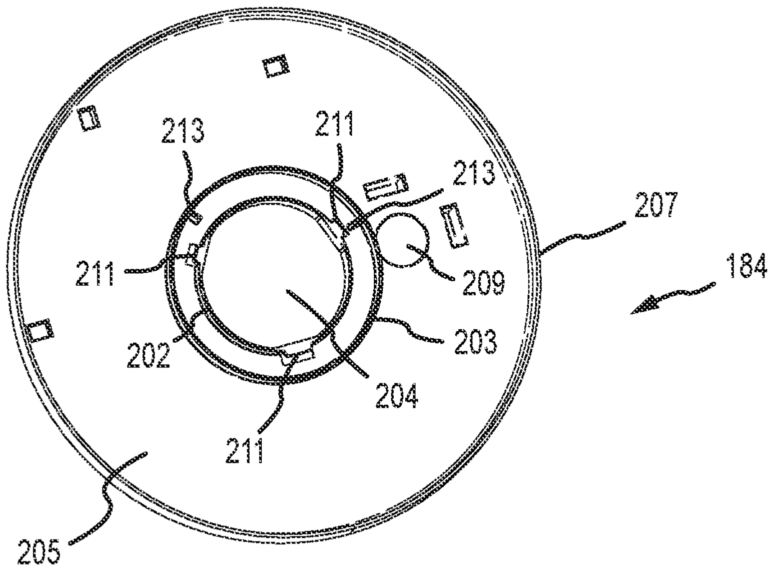
FIG. 35 is a perspective view of a portion of a cable management system according to one embodiment of the present disclosure.
Figure 36:
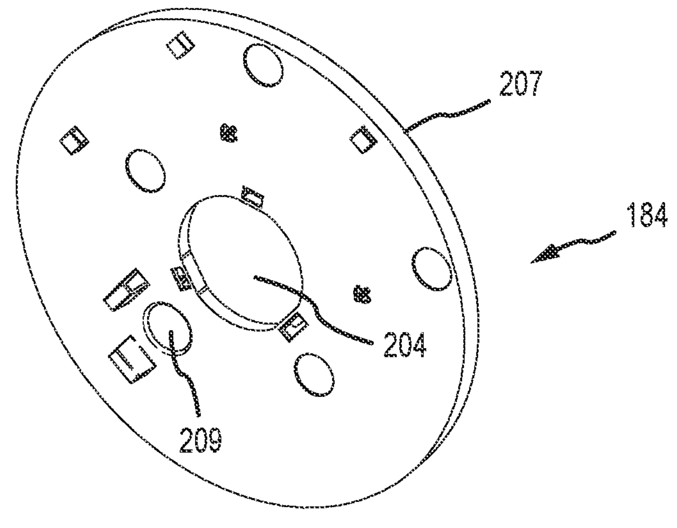
FIG. 36 is a perspective view of a portion of a cable management system according to one embodiment of the present disclosure.

FIGS. 35-36 are top and bottom perspective views of a lower plate 184, respectively. The lower plate 184 as shown in FIGS. 35-36 is sized and operable to mate with and connect to the upper plate 182 of FIGS. 33-34. Specifically, the outer diameter of the lower plate is smaller than the outer diameter of the upper plate, and the lip 207 of the lower plate is operable to nest or otherwise be provided within the circumference of the lip 192 of the upper plate. When assembled, the upper and lower plates are provided in a concentric arrangement with a cord storage area provided within the internal annular volume of the assembled structure (see FIG. 32, for example). The lower plate 184 comprises a mounting structure that is operable to connect to corresponding structure of the upper plate 182. As shown in FIG. 35, the central aperture 204 of the lower plate 184 comprises an annular connection member 202 with a plurality of teeth 211 or protrusions. The teeth 211 are operable to be inserted into the keyways 198 of the upper plate, and the plates are rotated to be secured in an assembled state. Stop members 213 are provided on a second annular ring 203. The stop members 213 of the lower plate 184 are operable to communicate with the stop members 200 of the upper plate 182 to limit rotation and to indicate when proper alignment and connection has been achieved. The lower plate 184 further comprises an aperture 209 for receiving a cord, cable, or similar member. As previously discussed, the apertures 199, 209 of the upper plate and lower plates are operable to receive different cords. In preferred embodiments, a first cord is fed through the first aperture 199 and a second cord is fed through the second aperture 209. The first and second cords are contemplated as comprising electrical cords to supply power to different components (e.g. a rotatable motor and a vacuum unit).

Although cable management devices of the present disclosure have been described in combination with and/or intended for use with floor cleaning devices, it will be recognized that cable management systems provided herein are not limited to use with any particular device or machine. Indeed, inventive aspects of the cable management system(s) exist that are independent of an intended use of the device. Such devices are contemplated as being useful with and provided on various devices including, but not limited to, floor cleaning devices, lawn mowing devices, various electric vehicles, power tools, etc.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A floor treatment and cleaning device comprising:
at least one cleaning device component;
a chassis member operable to support the at least one cleaning device component, the chassis comprising a first centerline that is equidistant from lateral sides of the device;
a drive wheel operable to provide locomotive functions to the device; and
a rear-access platform operable to receive a standing user, and wherein the platform comprises a second centerline and wherein the second centerline is laterally offset from the first centerline to position the platform and an associated user closer to one lateral side of the device for enhanced visibility and ergonomics,
wherein the platform is open at least towards a rear of the device and adapted to receive the user from the rear of the device.

2. The floor treatment and cleaning device of claim 1, wherein the chassis comprises a lip provided on at least one side of a user area, the lip being operable to contain a user.

3. The floor treatment and cleaning device of claim 1, wherein a storage compartment is provided adjacent to the platform.

4. The floor treatment and cleaning device of claim 1, wherein the drive wheel is offset from the first centerline.

5. The floor treatment and cleaning device of claim 1, wherein the drive wheel is rotatable about a vertical axis and operable to steer the device.

6. The floor treatment and cleaning device of claim 1, wherein the at least one cleaning device component comprises at least one of a roller brush, a pad, a vacuum, and a squeegee.

7. The floor treatment and cleaning device of claim 1, wherein the drive wheel is provided forward of two trailing wheels that are provided proximal to a rearward portion of the device.

8. A floor treatment and cleaning device comprising:
at least one cleaning device component;
a chassis member operable to support a standing user and the at least one cleaning device component, the chassis comprising a first centerline that bisects a width of the chassis;
a drive wheel operable to provide locomotive functions to the device;
a platform provided on a rear of the chassis and open to a rear of the chassis that is operable to receive a user in at least a standing position;
a steering wheel operable to control the cleaning device;
a second centerline extending through a center of at least one of the platform and the steering wheel, and wherein the second centerline is laterally offset from the first centerline; and
a cable management device secured to a lower portion of the device, the cable management device having an upper plate and a lower plate defining a volume to receive one or more cables,
wherein the platform and the steering wheel are provided closer to one lateral side of the device for enhanced visibility and ergonomics.

9. The floor treatment and cleaning device of claim 8, wherein the chassis comprises a lip provided on at least one side of a user area, the lip being operable to contain a user.

10. The floor treatment and cleaning device of claim 8, wherein a storage compartment is provided adjacent to the platform.

11. The floor treatment and cleaning device of claim 8, wherein the drive wheel is offset from the first centerline.

12. The floor treatment and cleaning device of claim 8, wherein the drive wheel is rotatable about a vertical axis and operable to steer the device.

13. The floor treatment and cleaning device of claim 8, wherein the at least one cleaning device component comprises at least one of a roller brush, a pad, a vacuum, and a squeegee.

14. The floor treatment and cleaning device of claim 8, wherein the drive wheel is provided forward of two trailing wheels that are provided proximal to a rearward portion of the device.

15. The floor treatment and cleaning device of claim 8, wherein the second centerline extends through the center of the platform and the center of the steering wheel.

16. A floor treatment and cleaning device comprising:

a chassis operable to support at least one cleaning device component, the chassis comprising a front, a back, a lower surface, a front surface adjacent the front, an upper surface, a rear surface located behind a center point of the chassis, a left surface, and a right surface; the chassis further comprising a centerline extending through a lateral midpoint of the left surface and the right surface;

a platform located partially between a portion of the right surface and the left surface and at least partially behind the rear surface, and a top surface adapted to receive the feet of an operator; and a cable management device secured to a lower portion of the device, the cable management device having an upper plate and a lower plate defining a volume to receive one or more cables and a motor operable to extend or retract the one or more cables, wherein the platform further comprises a midpoint that is offset relative to the centerline of the chassis and wherein the platform is provided closer to one side of the device than the other side for providing a user with enhanced visibility.

17. The floor treatment and cleaning device of claim 16, wherein the chassis comprises a lip provided on at least one side of a user area, the lip being operable to contain a user.

18. The floor treatment and cleaning device of claim 16, wherein a storage compartment is provided adjacent to the platform.

19. The floor treatment and cleaning device of claim 16, wherein the device comprises a drive wheel that is offset from the centerline of the chassis.

20. The floor treatment and cleaning device of claim 19, wherein the drive wheel is rotatable about a vertical axis and operable to steer the device.

* * * * *